(12) United States Patent
Tian et al.

(10) Patent No.: US 9,131,164 B2
(45) Date of Patent: Sep. 8, 2015

(54) PREPROCESSOR METHOD AND APPARATUS

(75) Inventors: Tao Tian, San Diego, CA (US); Fang Liu, San Diego, CA (US); Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1335 days.

(21) Appl. No.: 11/557,778

(22) Filed: Nov. 8, 2006

(65) Prior Publication Data

US 2008/0151101 A1    Jun. 26, 2008

Related U.S. Application Data

(63) Continuation-in-part of application No. 11/528,141, filed on Sep. 26, 2006.

(60) Provisional application No. 60/789,266, filed on Apr. 4, 2006.

(51) Int. Cl.
*H04N 7/01* (2006.01)
*H04N 11/20* (2006.01)
(Continued)

(52) U.S. Cl.
CPC .......... *H04N 7/26893* (2013.01); *H04N 5/145* (2013.01); *H04N 7/012* (2013.01); *H04N 7/0112* (2013.01); *H04N 11/046* (2013.01); *H04N 5/147* (2013.01)

(58) Field of Classification Search
USPC ................ 348/448, 441, 445–447, 451–452, 348/458–459, 384, 390, 625, 553–555, 348/699–700, 473; 375/240.12, 351
IPC .............................................. H04N 7/01,11/20
See application file for complete search history.

(56) References Cited

U.S. PATENT DOCUMENTS 5,289,276 A    2/1994    Siracusa et al.
5,404,174 A    4/1995    Sugahara
(Continued)

FOREIGN PATENT DOCUMENTS

CL    0133-2005    10/2005
CL    1043-2005    12/2005
(Continued)

OTHER PUBLICATIONS

Boyce, Jill M.: "Packet loss resilient transmission of MPEG video over the Internet" Signal Processing: Image Communication, Elsevier Science Publishers, Amsterdam, NL, vol. 15, No. 1-2, Sep. 1999, pp. 7-24, XP004180635.
(Continued)

*Primary Examiner* — Trang U Tran
(74) *Attorney, Agent, or Firm* — Arent Fox LLP

(57) ABSTRACT

The invention generally relates to multimedia data processing, and more particularly, to processing operations performed prior to or in conjunction with data compression processing. A method of processing multimedia data includes receiving interlaced video frames, obtaining metadata for the interlaced video frames, converting the interlaced video frames to progressive video using at least a portion of the metadata; and providing the progressive video and at least a portion of the metadata to an encoder for use in encoding the progressive video. The method can also include generating spatial information and bi-directional motion information, for the interlaced video frames, and generating progressive video based on the interlaced video frames using the spatial and bi-directional motion information.

24 Claims, 44 Drawing Sheets

(51) Int. Cl.
*H04N 19/85* (2014.01)
*H04N 5/14* (2006.01)
*H04N 11/04* (2006.01)

(56) References Cited

U.S. PATENT DOCUMENTS

| | | | |
|---|---|---|---|
| 5,508,752 A | 4/1996 | Kim et al. | |
| 5,565,920 A | 10/1996 | Lee et al. | |
| 5,598,428 A | 1/1997 | Sato | |
| 5,619,272 A | 4/1997 | Salmon et al. | |
| 5,642,294 A | 6/1997 | Taniguchi et al. | |
| 5,642,460 A | 6/1997 | Shimoda | |
| 5,654,805 A | 8/1997 | Boon | |
| 5,682,204 A | 10/1997 | Uz et al. | |
| 5,684,917 A | 11/1997 | Yanagihara et al. | |
| 5,686,962 A | 11/1997 | Chung et al. | |
| 5,699,119 A | 12/1997 | Chung et al. | |
| 5,745,645 A | 4/1998 | Nakamura et al. | |
| 5,754,233 A | 5/1998 | Takashima | |
| 5,771,357 A * | 6/1998 | Kato et al. | 709/247 |
| 5,790,179 A | 8/1998 | Shibata et al. | |
| 5,793,895 A | 8/1998 | Chang et al. | |
| 5,801,765 A | 9/1998 | Gotoh et al. | |
| 5,821,991 A | 10/1998 | Kwok | |
| 5,835,163 A | 11/1998 | Liou et al. | |
| 5,841,939 A | 11/1998 | Takahashi et al. | |
| 5,864,369 A | 1/1999 | Swan | |
| 5,929,902 A | 7/1999 | Kwok | |
| 5,960,148 A | 9/1999 | Miyazawa | |
| 5,978,029 A | 11/1999 | Boice et al. | |
| 5,991,502 A | 11/1999 | Kawakami et al. | |
| 6,012,091 A | 1/2000 | Boyce | |
| 6,014,493 A | 1/2000 | Shimoda | |
| 6,064,796 A | 5/2000 | Nakamura et al. | |
| 6,091,460 A | 7/2000 | Hatano et al. | |
| 6,115,499 A | 9/2000 | Wang et al. | |
| 6,157,674 A | 12/2000 | Oda et al. | |
| 6,175,593 B1 | 1/2001 | Kim et al. | |
| 6,229,925 B1 | 5/2001 | Alexandre et al. | |
| 6,317,518 B1 | 11/2001 | Enari | |
| 6,333,950 B1 | 12/2001 | Karasawa | |
| 6,363,114 B1 | 3/2002 | Kato | |
| 6,370,672 B1 | 4/2002 | Rick et al. | |
| 6,449,002 B1 | 9/2002 | Markman et al. | |
| 6,473,459 B1 | 10/2002 | Sugano et al. | |
| 6,490,320 B1 | 12/2002 | Vetro et al. | |
| 6,501,796 B1 | 12/2002 | Dusseux et al. | |
| 6,507,618 B1 | 1/2003 | Wee et al. | |
| 6,538,688 B1 | 3/2003 | Giles | |
| 6,539,220 B1 | 3/2003 | Sakai et al. | |
| 6,553,068 B1 | 4/2003 | Wake et al. | |
| 6,574,211 B2 | 6/2003 | Padovani et al. | |
| 6,580,829 B1 | 6/2003 | Hurst, Jr. et al. | |
| 6,600,836 B1 | 7/2003 | Thyagarajan et al. | |
| 6,718,121 B1 | 4/2004 | Shikunami | |
| 6,721,492 B1 | 4/2004 | Togashi | |
| 6,724,819 B1 | 4/2004 | Takaki et al. | |
| 6,744,474 B2 | 6/2004 | Markman | |
| 6,773,437 B2 | 8/2004 | Ogilvie et al. | |
| 6,784,942 B2 | 8/2004 | Selby et al. | |
| 6,791,602 B1 | 9/2004 | Sasaki et al. | |
| 6,798,834 B1 | 9/2004 | Murakami et al. | |
| 6,891,891 B2 | 5/2005 | Pau et al. | |
| 6,900,846 B2 | 5/2005 | Lee et al. | |
| 6,904,081 B2 | 6/2005 | Frank | |
| 6,909,745 B1 | 6/2005 | Puri et al. | |
| 6,928,151 B2 | 8/2005 | Yamada et al. | |
| 6,934,335 B2 | 8/2005 | Liu et al. | |
| 6,952,500 B2 | 10/2005 | Sheraizin et al. | |
| 6,959,044 B1 | 10/2005 | Jin et al. | |
| 6,970,506 B2 | 11/2005 | Kim et al. | |
| 6,985,635 B2 | 1/2006 | Chen et al. | |
| 6,987,728 B2 | 1/2006 | Deshpande | |
| 6,996,186 B2 | 2/2006 | Ngai et al. | |
| 7,009,656 B2 | 3/2006 | Thomson et al. | |
| 7,027,512 B2 | 4/2006 | Jeon | |
| 7,039,855 B2 | 5/2006 | Nikitin et al. | |
| 7,042,512 B2 | 5/2006 | Yang et al. | |
| 7,075,581 B1 | 7/2006 | Ozgen et al. | |
| 7,089,313 B2 | 8/2006 | Lee et al. | |
| 7,093,028 B1 | 8/2006 | Shao et al. | |
| 7,095,814 B2 | 8/2006 | Kyeong et al. | |
| 7,095,874 B2 | 8/2006 | Moskowitz et al. | |
| 7,123,816 B2 | 10/2006 | McGrath et al. | |
| 7,129,990 B2 | 10/2006 | Wredenhagen et al. | |
| 7,136,417 B2 | 11/2006 | Rodriguez | |
| 7,139,551 B2 | 11/2006 | Jamadagni | |
| 7,142,599 B2 | 11/2006 | Henocq | |
| 7,154,555 B2 | 12/2006 | Conklin | |
| 7,167,507 B2 | 1/2007 | Mailaender et al. | |
| 7,203,236 B2 | 4/2007 | Yamada | |
| 7,203,238 B2 | 4/2007 | Liu et al. | |
| 7,280,708 B2 | 10/2007 | Song et al. | |
| 7,339,980 B2 | 3/2008 | Grant et al. | |
| 7,356,073 B2 | 4/2008 | Heikkila | |
| 7,359,466 B2 | 4/2008 | Huang et al. | |
| 7,430,336 B2 | 9/2008 | Raveendran | |
| 7,433,982 B2 | 10/2008 | Peev et al. | |
| 7,443,448 B2 | 10/2008 | Yang et al. | |
| 7,474,701 B2 | 1/2009 | Boice et al. | |
| 7,479,978 B2 | 1/2009 | Cho et al. | |
| 7,483,581 B2 | 1/2009 | Raveendran et al. | |
| 7,486,736 B2 | 2/2009 | Zhidkov | |
| 7,528,887 B2 | 5/2009 | Wyman | |
| 7,529,426 B2 | 5/2009 | Neuman | |
| 7,557,861 B2 | 7/2009 | Wyman | |
| 7,634,260 B2 | 12/2009 | Chun | |
| 7,660,987 B2 | 2/2010 | Baylis et al. | |
| 7,676,106 B2 | 3/2010 | Panusopone et al. | |
| 7,705,913 B2 | 4/2010 | Jia et al. | |
| 7,738,716 B2 | 6/2010 | Song | |
| 7,840,112 B2 | 11/2010 | Rao | |
| 7,949,205 B2 | 5/2011 | De Haan et al. | |
| 8,060,720 B2 | 11/2011 | Uppala | |
| 2001/0001614 A1 | 5/2001 | Boice et al. | |
| 2001/0017888 A1 | 8/2001 | Bruls | |
| 2001/0055337 A1 | 12/2001 | Matsuzaki et al. | |
| 2002/0021485 A1 | 2/2002 | Pilossof | |
| 2002/0037051 A1 | 3/2002 | Takenaka | |
| 2002/0042730 A1 | 4/2002 | Homer | |
| 2002/0047936 A1 | 4/2002 | Tojo | |
| 2002/0054621 A1 | 5/2002 | Kyeong et al. | |
| 2002/0097791 A1 | 7/2002 | Hansen | |
| 2002/0146071 A1 | 10/2002 | Liu et al. | |
| 2002/0149703 A1 | 10/2002 | Adams et al. | |
| 2002/0154705 A1 | 10/2002 | Walton et al. | |
| 2002/0163964 A1 | 11/2002 | Nichols | |
| 2003/0021485 A1 | 1/2003 | Raveendran et al. | |
| 2003/0118097 A1 | 6/2003 | Chen et al. | |
| 2003/0142762 A1 | 7/2003 | Burke | |
| 2003/0185302 A1 | 10/2003 | Abrams | |
| 2003/0219160 A1 | 11/2003 | Song et al. | |
| 2004/0013196 A1 | 1/2004 | Takagi et al. | |
| 2004/0045038 A1 | 3/2004 | Duff et al. | |
| 2004/0073901 A1 | 4/2004 | Imamatsu | |
| 2004/0125877 A1 | 7/2004 | Chang et al. | |
| 2004/0136566 A1 | 7/2004 | Cho et al. | |
| 2004/0190609 A1 | 9/2004 | Watanabe | |
| 2004/0192274 A1 | 9/2004 | Vuori | |
| 2004/0264790 A1 | 12/2004 | Song et al. | |
| 2005/0022178 A1 | 1/2005 | Ghafoor et al. | |
| 2005/0062885 A1 | 3/2005 | Kadono et al. | |
| 2005/0063473 A1 | 3/2005 | Koyama et al. | |
| 2005/0063500 A1 | 3/2005 | Li et al. | |
| 2005/0076057 A1 | 4/2005 | Sharma et al. | |
| 2005/0078750 A1 | 4/2005 | Shen et al. | |
| 2005/0081482 A1 | 4/2005 | Lembo | |
| 2005/0134735 A1 | 6/2005 | Swartz | |
| 2005/0168634 A1 | 8/2005 | Wyman et al. | |
| 2005/0168656 A1 | 8/2005 | Wyman et al. | |
| 2005/0185719 A1 | 8/2005 | Hannuksela | |
| 2005/0192878 A1 | 9/2005 | Minear et al. | |
| 2005/0195889 A1 | 9/2005 | Grant et al. | |
| 2005/0195899 A1 | 9/2005 | Han | |

(56) References Cited

U.S. PATENT DOCUMENTS

| | | |
|---|---|---|
| 2005/0201478 A1 | 9/2005 | Claussen et al. |
| 2005/0222961 A1 | 10/2005 | Staib et al. |
| 2005/0231635 A1 | 10/2005 | Lin |
| 2005/0249282 A1 | 11/2005 | Landsiedel et al. |
| 2005/0254692 A1 | 11/2005 | Caldwell |
| 2005/0265461 A1 | 12/2005 | Raveendran |
| 2005/0276505 A1 | 12/2005 | Raveendran |
| 2005/0283687 A1 | 12/2005 | Sutivong et al. |
| 2006/0002340 A1 | 1/2006 | Criss et al. |
| 2006/0023788 A1 | 2/2006 | Otsuka et al. |
| 2006/0129646 A1 | 6/2006 | Rhee et al. |
| 2006/0133514 A1 | 6/2006 | Walker |
| 2006/0146934 A1 | 7/2006 | Caglar et al. |
| 2006/0153294 A1 | 7/2006 | Wang et al. |
| 2006/0159160 A1 | 7/2006 | Kim et al. |
| 2006/0166739 A1 | 7/2006 | Lin |
| 2006/0197879 A1 | 9/2006 | Covell et al. |
| 2006/0210184 A1 | 9/2006 | Song et al. |
| 2006/0215539 A1 | 9/2006 | Vrcelj et al. |
| 2006/0215761 A1 | 9/2006 | Shi et al. |
| 2006/0222078 A1 | 10/2006 | Raveendran |
| 2006/0230162 A1 | 10/2006 | Chen et al. |
| 2006/0233239 A1 | 10/2006 | Sethi et al. |
| 2006/0239347 A1 | 10/2006 | Koul |
| 2006/0244840 A1 | 11/2006 | Eshet et al. |
| 2006/0282737 A1 | 12/2006 | Shi et al. |
| 2007/0014354 A1 | 1/2007 | Murakami et al. |
| 2007/0074266 A1 | 3/2007 | Raveendran et al. |
| 2007/0081586 A1 | 4/2007 | Raveendran et al. |
| 2007/0081587 A1 | 4/2007 | Raveendran et al. |
| 2007/0081588 A1 | 4/2007 | Raveendran et al. |
| 2007/0097259 A1 | 5/2007 | MacInnis et al. |
| 2007/0124443 A1 | 5/2007 | Nanda et al. |
| 2007/0124459 A1 | 5/2007 | Kasama |
| 2007/0160128 A1 | 7/2007 | Tian et al. |
| 2007/0160142 A1* | 7/2007 | Abrams .................. 375/240.12 |
| 2007/0171280 A1 | 7/2007 | Tian et al. |
| 2007/0171972 A1 | 7/2007 | Tian et al. |
| 2007/0171986 A1 | 7/2007 | Hannuksela |
| 2007/0206117 A1 | 9/2007 | Tian et al. |
| 2007/0208557 A1 | 9/2007 | Li et al. |
| 2007/0252894 A1 | 11/2007 | Satou et al. |
| 2009/0074070 A1 | 3/2009 | Yin et al. |
| 2009/0092944 A1 | 4/2009 | Pirker |
| 2009/0122186 A1* | 5/2009 | Rodriguez et al. ............ 348/446 |
| 2009/0168880 A1 | 7/2009 | Jeon et al. |
| 2009/0244840 A1 | 10/2009 | Takawa et al. |
| 2010/0020886 A1* | 1/2010 | Raveendran et al. .... 375/240.27 |
| 2010/0171814 A1* | 7/2010 | Routhier et al. ................ 348/46 |
| 2013/0308707 A1 | 11/2013 | Raveendran et al. |

FOREIGN PATENT DOCUMENTS

| | | |
|---|---|---|
| CL | 1045-2005 | 12/2005 |
| CL | 1473-2005 | 1/2006 |
| CL | 542-2006 | 8/2006 |
| CL | 0543-2006 | 9/2006 |
| CL | 539-2006 | 11/2006 |
| CL | 540-2006 | 11/2006 |
| CL | 544-2006 | 2/2007 |
| CL | 0205-2001 | 12/2008 |
| CN | 1328747 A | 12/2001 |
| CN | 1355995 A | 6/2002 |
| CN | 1372769 A | 10/2002 |
| CN | 1383327 A | 12/2002 |
| CN | 1395800 A | 2/2003 |
| CN | 1436423 A | 8/2003 |
| CN | 1520185 A | 8/2004 |
| CN | 1623332 A | 6/2005 |
| CN | 1647540 A | 7/2005 |
| CN | 1669314 A | 9/2005 |
| EP | 0547460 A1 | 6/1993 |
| EP | 0626789 A2 | 11/1994 |
| EP | 0 644 695 A2 | 3/1995 |
| EP | 0690617 A2 | 1/1996 |
| EP | 0946054 A1 | 9/1999 |
| EP | 1 005 227 A2 | 5/2000 |
| EP | 1022667 A2 | 7/2000 |
| EP | 1164792 A2 | 12/2001 |
| EP | 1168731 A1 | 1/2002 |
| EP | 1195992 A1 | 4/2002 |
| EP | 1209624 A1 | 5/2002 |
| EP | 1265373 A2 | 12/2002 |
| EP | 1289182 A2 | 3/2003 |
| EP | 1505488 A1 | 2/2005 |
| EP | 1547016 A1 | 6/2005 |
| EP | 1615447 A1 | 1/2006 |
| EP | 1657835 A1 | 5/2006 |
| FR | 2646047 A1 | 10/1990 |
| JP | 3189292 | 8/1991 |
| JP | 5064175 A | 3/1993 |
| JP | H05344492 A | 12/1993 |
| JP | H0622298 A | 1/1994 |
| JP | H06339115 A | 12/1994 |
| JP | H07135657 A | 5/1995 |
| JP | 07222145 A | 8/1995 |
| JP | H07203433 A | 8/1995 |
| JP | 7298272 A | 11/1995 |
| JP | 7312756 A | 11/1995 |
| JP | 8046969 A | 2/1996 |
| JP | 08-102938 | 4/1996 |
| JP | 8130716 A | 5/1996 |
| JP | 08-214210 | 8/1996 |
| JP | 8251594 A | 9/1996 |
| JP | 09-018782 | 1/1997 |
| JP | H09503890 A | 4/1997 |
| JP | 09-284770 | 10/1997 |
| JP | 10013826 A | 1/1998 |
| JP | 10302396 A | 11/1998 |
| JP | 10313463 A | 11/1998 |
| JP | H114260 A | 1/1999 |
| JP | 11243547 A | 9/1999 |
| JP | 11316843 A | 11/1999 |
| JP | 2000032474 A | 1/2000 |
| JP | 2000059774 A | 2/2000 |
| JP | 2000115778(A) | 4/2000 |
| JP | 2000209553 A | 7/2000 |
| JP | 2000-295626 | 10/2000 |
| JP | 2000287173 A | 10/2000 |
| JP | 2000350217 A | 12/2000 |
| JP | 2001045494 A | 2/2001 |
| JP | 2001169251 A | 6/2001 |
| JP | 3189292 B2 | 7/2001 |
| JP | 2001204026 A | 7/2001 |
| JP | 2001251629 A | 9/2001 |
| JP | 2001346207 A | 12/2001 |
| JP | 2001346214 A | 12/2001 |
| JP | 2002010259 A | 1/2002 |
| JP | 2002044668 A | 2/2002 |
| JP | 2002051336 A | 2/2002 |
| JP | 2002064817 A | 2/2002 |
| JP | 2002077833 A | 3/2002 |
| JP | 2002101416 A | 4/2002 |
| JP | 2002125227 A | 4/2002 |
| JP | 2002252834 A | 9/2002 |
| JP | 2002543714 T | 12/2002 |
| JP | 2003037844 A | 2/2003 |
| JP | 2003110474 A | 4/2003 |
| JP | 2003111079 A | 4/2003 |
| JP | 2003209837 A | 7/2003 |
| JP | 2003209848 A | 7/2003 |
| JP | 2003224847 A | 8/2003 |
| JP | 2003319341 A | 11/2003 |
| JP | 2003348583 A | 12/2003 |
| JP | 2004023288 A | 1/2004 |
| JP | 2004140488 A | 5/2004 |
| JP | 2004248124 A | 9/2004 |
| JP | 2005123732 A | 5/2005 |
| JP | 2005517342 A | 6/2005 |
| JP | 2006074684 A | 3/2006 |
| JP | 2007520126 T | 7/2007 |
| JP | 2008500935 A | 1/2008 |
| KR | 1020010099660 A | 11/2001 |

(56) References Cited

FOREIGN PATENT DOCUMENTS

| | | |
|---|---|---|
| KR | 20020010171 A | 2/2002 |
| KR | 20020070199 A | 9/2002 |
| KR | 20030029507 A | 4/2003 |
| KR | 100389893 B1 | 6/2003 |
| KR | 20030073254 A | 9/2003 |
| KR | 200446320 | 6/2004 |
| KR | 20050089721 A | 9/2005 |
| KR | 20060011281 A | 2/2006 |
| TW | 536918 B | 6/2003 |
| WO | WO9535628 A1 | 12/1995 |
| WO | WO9739577 | 10/1997 |
| WO | 9932993 A1 | 7/1999 |
| WO | WO9943157 | 8/1999 |
| WO | WO0019726 A1 | 4/2000 |
| WO | WO0067486 A1 | 11/2000 |
| WO | WO 01/56298 A1 | 8/2001 |
| WO | 0166631 A1 | 9/2001 |
| WO | WO 01/69936 A2 | 9/2001 |
| WO | 0178389 A1 | 10/2001 |
| WO | WO0178398 A1 | 10/2001 |
| WO | WO0225925 | 3/2002 |
| WO | WO0243398 | 5/2002 |
| WO | WO02087255 | 10/2002 |
| WO | 03052695 A2 | 6/2003 |
| WO | 03067778 A1 | 8/2003 |
| WO | WO2004008747 A2 | 1/2004 |
| WO | WO2004008757 A1 | 1/2004 |
| WO | WO2004019273 | 3/2004 |
| WO | WO2004049722 A1 | 6/2004 |
| WO | WO2004054270 | 6/2004 |
| WO | WO2004057460 A2 | 7/2004 |
| WO | WO2004070953 A2 | 8/2004 |
| WO | WO2004114667 A1 | 12/2004 |
| WO | WO20040114672 | 12/2004 |
| WO | WO2005006764 A1 | 1/2005 |
| WO | WO 2005/069917 A2 | 8/2005 |
| WO | WO2005074147 A1 | 8/2005 |
| WO | WO2005081482 A1 | 9/2005 |
| WO | WO 2005/107266 A1 | 11/2005 |
| WO | WO 2005/109900 A1 | 11/2005 |
| WO | 2006099082 A2 | 9/2006 |
| WO | WO 2006/099242 A1 | 9/2006 |
| WO | WO2007047755 | 4/2007 |

OTHER PUBLICATIONS

European Search Report—EP10179387, Search Authority—Munich Patent Office, Jan. 27, 2011.
European Search Report—EP10181339, Search Authority—Munich Patent Office, Jan. 24, 2011.
Taiwanese Search report—096110382—TIPO—Aug. 16, 2010.
Wiegand, T. et al., "Draft ITU-R recommendation and final draft international standard of Joint Video Specification" Joint Video Team (JVT) of ISO/IEC MPEG & ITU-T VCEG. 8th Meeting: Geneva, Switzerland. May 27, 2003.
"MPEG Digital Video-Coding Standards," IEEE Signal Processing Magazine, IEEE Service Center, Piscataway, NJ, vol. 14, No. 5, Sep. 1997, pp. 82-100, XP011089789.
C. Huang et al.: "A Robust Scene-Change Detection method for Video Segmentation," IEEE Transactions on Circuits and Systems for Video Technology, vol. 11, No. 12, p. 1281-1288, Dec. 2001.
D. Lelescu et al.: "Statistical Sequential Analysis for Real-Time Video Scene Change Detection on Compressed Multimedia Bitstream," IEEE Transactions on Multimedia, vol. 5, No. 1, p. 106-117, March 2003.
D.L. Donoho et al.: "Ideal spatial adaptation by wavelet shrinkage," Biometrika, vol. 8, pp. 1-30, 1994.
F.M. Wang et al.: "Time recursive Deinterlacing for IDTV and Pyramid Coding," Signal Processing: Image Communications 2, pp. 1306-1309, 1990.
G.D. Haan et al.: "De-interlacing of video data," IEEE Transactions on Consumer Electronics, vol. 43, No. 3, pp. 1-7, 1997.
Girod et al., "Scalable codec architectures for Internet video-on-demand," Signals, Systems & Computers, 1997 Conference Record of the Thirty-First Asilomar Conference on Pacific Grove, CA, USA Nov. 2-5, 1997, Los Alamitos, CA, USA, IEEE Comput Soc. US. vo.
K. Jung et al.: "Deinterlacing using Edge based Motion Estimation," IEEE MWSCS, pp. 892-895, 1995.
Lee J, "A fast frame type selection technique for very low bit rate coding using MPEG-1" Real-Time Imaging, Academic Press Limited, GB, vol. 5, No. 2, Apr. 1999, pp. 83-94, XP004429625.
Liang, Y. & Tan, Y.P., "A new content-based hybrid video transcoding method," 2001 International Conference on Image Processing, Oct. 7-10, 2001, vol. 4, pp. 429-432.
P. Haavisto et al.: "Scan rate up-conversions using adaptive weighted median filtering," Signal Processing of HDTV II, Elsevier Science Publishers, pp. 703-710, 1990.
R. Simonetti et al.: "Deinterlacing of HDTV Images for Multimedia Applications," Signal Processing of HDTV IV, Elsevier Science Publishers, pp. 765-772, 1993.
R4-030797, "An Advanced Receiver Proposal for MIMO," TSG-RAN WG4 #28, Lucent Technologies, Sophia-Antipolis, Aug. 18-22, 2003, pp. 1-8.
S. Lee et al.: "Fast Scene Change Detection using Direct Feature Extraction from MPEG Compressed Videos," IEEE Transactions on Multimedia, vol. 2, No. 4, pp. 240-254, Dec. 2000.
S. Pei et al.: "Effective Wipe Detection in MPEG Compressed Video Using Macroblock Type Information," IEEE Transactions on Multimedia, vol. 4, No. 3, pp. 309-319, Sep. 2002.
S.P. Ghael et al.: "Improved Wavelet denoising via empirical Wiener filtering," Proceedings of SPIE, vol. 3169, pp. 1-11, Jul. 1997.
SMPTE RP 27. 3-1989 "SMPTE Recommended Practice Specifications for Safe Action and Safe Title Areas Test Pattern for Television Systems" Society of Motion Picture and Television Engineers, pp. 1-3 Approved Mar. 29, 1989.
International Search Report and Written Opinion—PCT/US2007/063929, International Search Authority—European Patent Office—Jul. 17, 2007.
M. V. D. Schaar, H. Radha, "A hybrid Temporal-SNR Fine-Granular Scalability for Internet Video" IEEE Trans. on Circuits and Systems for Video Tech., vol. 11, No. 3, pp. 318-331, Mar. 2001.
Puri et al. "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849, XP004607150.
Mihaela Van Der Schaar et al., "A Hybrid Temporal-SNR Fine-Granular Scalability for Internet Video," IEEE Transactions on Circuits and Systems for Video Technology, IEEE Service Center, Piscataway, NJ, vol. 11, No. 3, Mar. 2001.
Kwon et al., "Overview of H.264/MPEG-4 part 10," Journal of Visual Communication and Image Representation, Academic Press, Inc., vol. 17, No. 2, Apr. 2006, pp. 186-216.
Rusert et al., "Enhanced interframe wavelet video coding considering the interrelation of spatio-temporal transform and motion compensation," Signal Processing. Image Communication, Elsevier Science Publishers, Amsterdam, NL, vol. 19, No. 7, Aug. 2004, pp. 617-635.
De Haan Gerard et al., "Deinterlacing—An Overview," Proceeding of the IEEE, vol. 86, No. 9, Sep. 1998, pp. 1839-1857.
"Third Generation Partnership Project 2", May 17, 2004, Qualcomm.
Mailaender, L., et al., "Linear MIMO equalization for CDMA downlink signals with code reuse", Wireless Communications, IEEE Transactions on, Sep. 2005,vol. 4, Issue 5, pp. 2423-2434.
Translation of Office Action in Chinese application 200780010753.9 corresponding to U.S. Appl. No. 11/557,778, citing US5864369 and CN1372769 dated Jan. 27, 2011.
Translation of Office Action in Japan application 2008-533639 corresponding to U.S. Appl. No. 11/528,307, citing JP7298272 and JP2000350217 dated Jan. 18, 2011.
Translation of Office Action dated Jan. 28, 2011 in Taiwanese application 096110382.
Fablet R., et al., "Motion Recognition Using Nonparametric Image Motion Models Estimated From Temporal and Multiscale Co-Occurence Statistics", IEEE Transaction on Pattern analysis and machine Intelligence, vol. 25, No. 12, pp. 1619-1624, Dec. 2003.

(56) References Cited

OTHER PUBLICATIONS

Peh C.H., et al., "Synergizing Spatial and Temporal Texture", IEEE Transaction on Image Processing, vol. 11, No. 10, pp. 1179-1191, Oct. 2002.

Translation of Decision of Rejection for Japanese Application No. 2012-162714 dated Sep. 2, 2014, pp. 1-2.

Supplementary European Search Report—EP06773184—Search Authority—Munich—Jun. 28, 2012.

* cited by examiner

SYSTEM OVERVIEW

Tracking the Lower Envelope Values of $L_P$

FIG. 22

PREPROCESSOR METHOD AND APPARATUS

CLAIM OF PRIORITY UNDER 35 U.S.C. §119

The present Application for Patent claims priority to Provisional Application No. 60/789,266 entitled "PREPROCESSOR FOR MULTIMEDIA DATA" filed Apr. 4, 2006, all of which are assigned to the assignee hereof and hereby expressly incorporated by reference, herein.

CLAIM OF PRIORITY UNDER 35 U.S.C. §120

The present Application for Patent is a continuation in part of patent application Ser. No. 11/528,141 entitled "CONTENT DRIVEN TRANSCODER THAT ORCHESTRATES MULTIMEDIA TRANSCODING USING CONTENT INFORMATION" filed Sep. 26, 2006, now U.S. Pat. No. 8,879,856, and assigned to the assignee hereof and hereby expressly incorporated by reference herein.

REFERENCE TO CO-PENDING APPLICATIONS FOR PATENT

The present Application for Patent is related to U.S. patent application Ser. No. 11/373,577 entitled "CONTENT CLASSIFICATION FOR MULTIMEDIA PROCESSING" filed on Mar. 10, 2006, assigned to the assignee hereof and hereby expressly incorporated by reference herein.

BACKGROUND

1. Field

The invention generally relates to multimedia data processing, and more particularly, to processing operations performed prior to or in conjunction with data compression processing.

2. Background

SUMMARY

Each of the inventive apparatuses and methods described herein has several aspects, no single one of which is solely responsible for its desirable attributes. Without limiting the scope of this invention, its more prominent features will now be discussed briefly. After considering this discussion, and particularly after reading the section entitled "Detailed Description" one will understand how the features of this invention provides improvements for multimedia data processing apparatuses and methods.

In one aspect, a method of processing multimedia data comprises receiving interlaced video frames, converting the interlaced video frames to progressive video, generating metadata associated with the progressive video, and providing the progressive video and at least a portion of the metadata to an encoder for use in encoding the progressive video. The method can further include encoding the progressive video using the metadata. In some aspects, the interlaced video frames comprise NTSC video. Converting the video frames can include deinterlacing the interlaced video frames. In some aspects, the metadata can include bandwidth information, bi-directional motion information, a bandwidth ratio, a complexity value such as a temporal or a spatial complexity value or both, luminance information, and the spatial information can include luminance and/or chrominance information. The method can also include generating spatial information and bi-directional motion information for the interlaced video frames and generating the progressive video based on the interlaced video frames using the spatial and bi-directional motion information. In some aspects converting the interlaced video frames comprises inverse telecining 3/2 pulldown video frames, and/or resizing the progressive video. The method can further comprise partitioning the progressive video to determine group of picture information, where the partitioning can include shot detection of the progressive video. In some aspects, the method also includes progressive video with a denoising filter.

In another aspect, an apparatus for processing multimedia data can include a receiver configured to receive interlaced video frames, a deinterlacer configured to convert the interlaced video frames to progressive video, and a partitioner configured to generate metadata associated with the progressive video and provide the progressive video and the metadata to an encoder for use in encoding the progressive video. In some aspects, the apparatus can further include an encoder configured to receive the progressive video from the communications module and encode the progressive video using the provided metadata. The deinterlacer can be configured to perform spatio-temporal deinterlacing and/or inverse telecining. The partitioner can be configured to perform shot detection and generate compression information based on the shot detection. In some aspects the partitioner can be configured to generate bandwidth information. The apparatus can also include a resampler configured to resize a progressive frame. The metadata can include bandwidth information, bi-directional motion information, a bandwidth ratio, luminance information, a spatial complexity value related to content, and/or a temporal complexity value related to content. In some aspects, the deinterlacer is configured to generate spatial information and bi-directional motion information for the interlaced video frames and progressive video based on the interlaced video frames using spatial and bi-directional motion information.

Another aspect comprises an apparatus for processing multimedia data includes means for receiving interlaced video frames, means for converting the interlaced video frames to progressive video, means for generating metadata associated with the progressive video, and means for providing the progressive video and at least a portion of the metadata to an encoder for use in encoding the progressive video. In some aspects the converting means comprises an inverse teleciner and/or a spatio-temporal deinterlacer. In some aspects, the generating means is configured to perform shot detection and generate compression information based on the shot detection. In some aspects the generating means is configured to generate bandwidth information. In some aspects, the generating includes means for resampling to resize a progressive frame.

Another aspect comprises a machine readable medium comprising instructions for processing multimedia data that upon execution cause a machine to receive interlaced video frames, convert the interlaced video frames to progressive video, generate metadata associated with the progressive video, and provide the progressive video and at least a portion of the metadata to an encoder for use in encoding the progressive video.

Another aspect includes a processor comprising a configuration to receive interlaced video, convert the interlaced, video to progressive video, generate metadata associated with the progressive video, and provide the progressive video and at least a portion of the metadata to an encoder for use in encoding the progressive video. The conversion of the interlaced video can include a performing spatio-temporal de interlacing. In some aspects, the conversion of the interlaced video comprises performing inverse telecine. In some aspects, generation of metadata includes generating compression information based on detecting shot changes. In some aspects, generation of metadata includes determining compression information of the progressive video. In some aspects, the configuration includes a configuration to resample video to generate a resized a progressive frame. In some aspects, the metadata can include bandwidth information, bi-directional motion information, complexity information such as temporal or spatial complexity information based on content, and/or compression information.

BRIEF DESCRIPTION OF THE DRAWINGS

FIG. 22 is a diagram illustrating one aspect of an aperture for determining slow-motion areas of multimedia data;

DETAILED DESCRIPTION

The following description includes details to provide a thorough understanding of the examples. However, it is understood by one of ordinary skill in the art that the examples may be practiced even if every detail of a process or device in an example or aspect is not described or illustrated herein. For example, electrical components may be shown in block diagrams that do not illustrate every electrical connection or every electrical element of the component in order not to obscure the examples in unnecessary detail. In other instances, such components, other structures and techniques may be shown in detail to farther explain the examples.

Described herein are certain inventive aspects and aspects for preprocessors and preprocessor operations methods that improve the performance of existing preprocessing and encoding systems. Such preprocessors can process metadata and video in preparation for encodings including performing deinterlacing, inverse telecining, filtering, identifying shot types, processing and generating metadata, and generating bandwidth information. References herein to "one aspect," "an aspect," some aspects," or "certain aspects" mean that one or more of a particular feature, structure, or characteristic described in connection with the aspect can be included in at least one aspect of a preprocessor system. The appearances of such phrases in various places in the specification are not necessarily all referring to the same aspect, nor are separate or alternative aspects mutually exclusive of other aspects. Moreover, various features are described which may be exhibited by some aspects and not by others. Similarly, various steps are described which may be steps for some aspects but not other aspects.

"Multimedia data" or "multimedia" as used herein is a broad term that includes video data (which can include audio data), audio data, or both video data and audio data. "Video data" or "video" as used herein as a broad term, which refers to an image or one or more series or sequences of images containing text, image, and/or audio data, and can be used to refer to multimedia data or the terms may be used interchangeably, unless otherwise specified.

Figure 1:
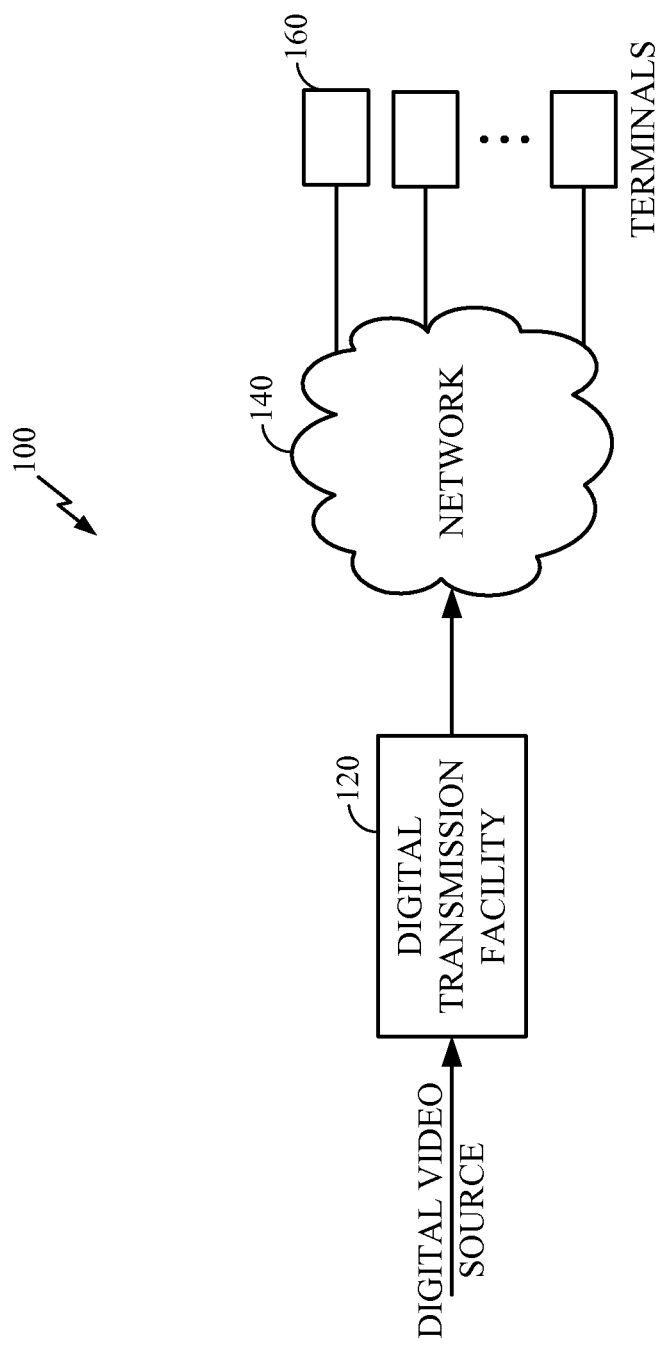
FIG. 1 is a block diagram of a communications system for delivering streaming multimedia data.

FIG. 1 is a block diagram of a communications system 100 for delivering streaming multimedia. Such system finds application in the transmission of digital compressed video to a multiplicity of terminals as shown in FIG. 1. A digital video source can be, for example, a digital cable or satellite feed or an analog source that is digitized. The video source is processed in a transmission facility 120 where it is encoded and modulated onto a earner for transmission through a network 140 to one or more terminals 160. The terminals 160 decode the received video and typically display at least a portion the video. The network 140 refers to any type of communication network, wired or wireless, suitable for the transmission of encoded data. For example, the network 140 can be a cell phone network, wired or wireless local area network (LAN) or a wide area network (WAN), or the Internet. The terminals 160 can be any type of communication device capable of receiving and displaying data, including, but not limited to, cell phones, PDA's, in-home or commercial video display equipment, computers (portable, laptop, handheld, PC's, and larger server-based computer systems), and personal entertainment devices capable of using multimedia data.

Figure 2:
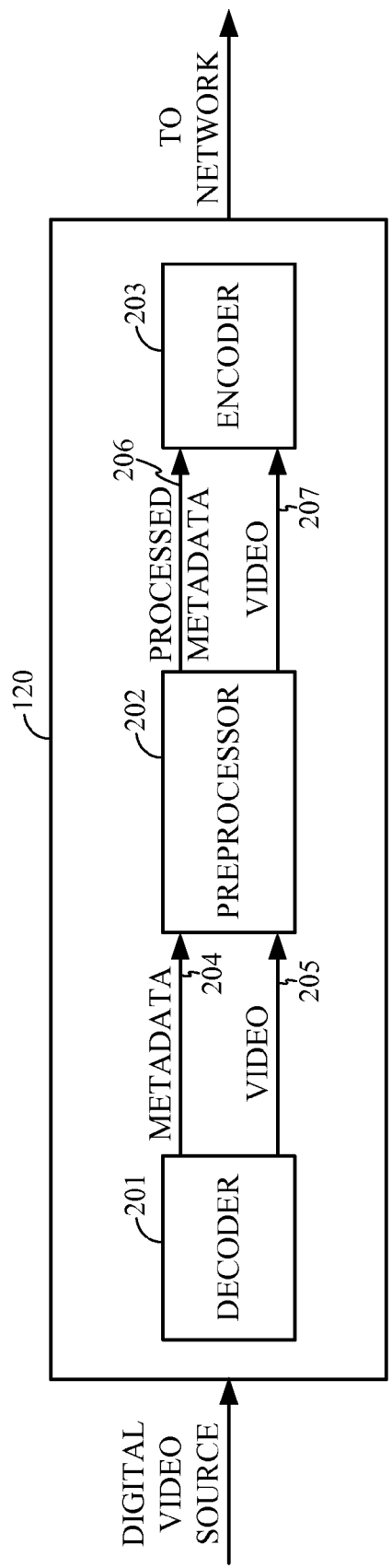
FIG. 2 is a block diagram of a digital transmission facility that includes a preprocessor.

FIGS. 2 and 3 illustrate sample aspects of a preprocessor 202. In FIG. 2, preprocessor 202 is in a digital transmission facility 120. A decoder 201 decodes encoded data from a digital video source and provides metadata 204 and video 205 to the preprocessor 202. The preprocessor 202 is configured to perform certain types of processing on the video 205 and the metadata 204 and provide processed metadata 206 (e.g., base layer reference frames, enhancement layer reference frames, bandwidth information, content information) and video 207 to an encoder 203. Such preprocessing of multimedia data can improve the visual clarity, anti-aliasing, and compression efficiency of the data. Generally, the preprocessor 202 receives video sequences provided by the decoder 201 and converts the video sequences into progressive video sequences for further processing (e.g., encoding) by aft encoder. In some aspects, the preprocessor 202 can be configured for numerous operations, including inverse telecine, deinterlacing, filtering (e.g., artifact removal, de-ringing, deblocking, and de-noising), resizing (e.g., spatial resolution down-sampling from standard definition to Quarter Video Graphics Array (QVGA)), and GOP structure generation (e.g., calculating complexity map generation, scene change detection, and fade/flash detection).

Figure 3A:
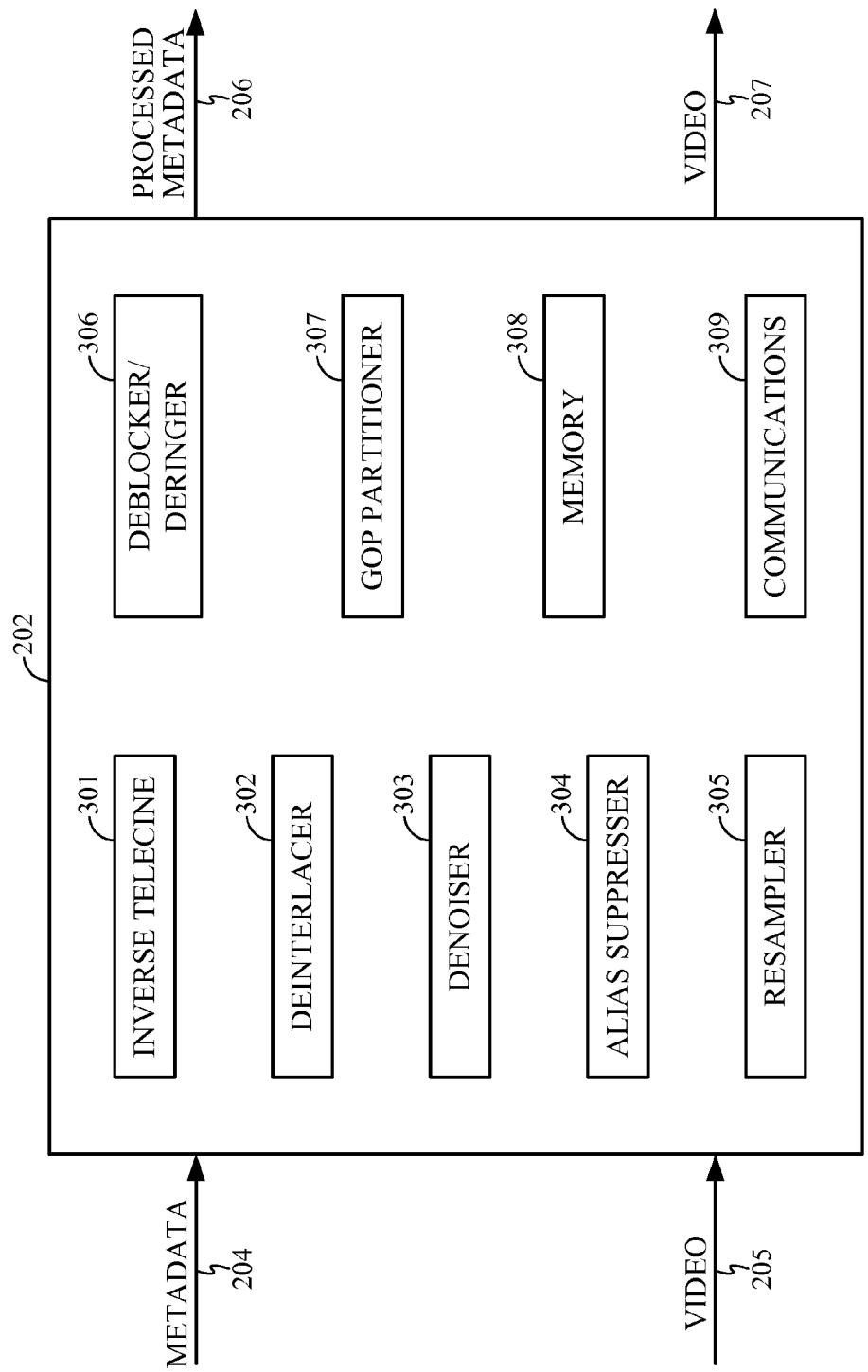
FIG. 3A is a block diagram of an illustrative aspect of a preprocessor.

FIG. 3A illustrates a preprocessor 202 that is configured with modules or components (collectively referred to here as "modules") to perform its preprocessing operations on received metadata 204 and video 205, and then provide processed metadata 206 and progressive video 207 for further processing (e.g., loan encoder). The modules can be implemented in hardware, software, firmware, or a combination thereof. The preprocessor 202 can include various modules, including one or more or the modules illustrated, which include inverse telecine 301, deinterlacer 302, denoiser 303, alias suppressor 304, resampler 303, deblocker/derringer 306, and a GOP partitioner 307, all described further below. The preprocessor 202 can also include other appropriate modules that may be used to process the video and metadata, including memory 308 and a communications module 309. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In die alternative, the storage medium may be integral to the processor. The processor and the storage medium may reside in an ASIC. The ASIC may reside in a user terminal. In the alternative, the processor and the storage medium may reside as discrete components in a user terminal.

Figure 3B:
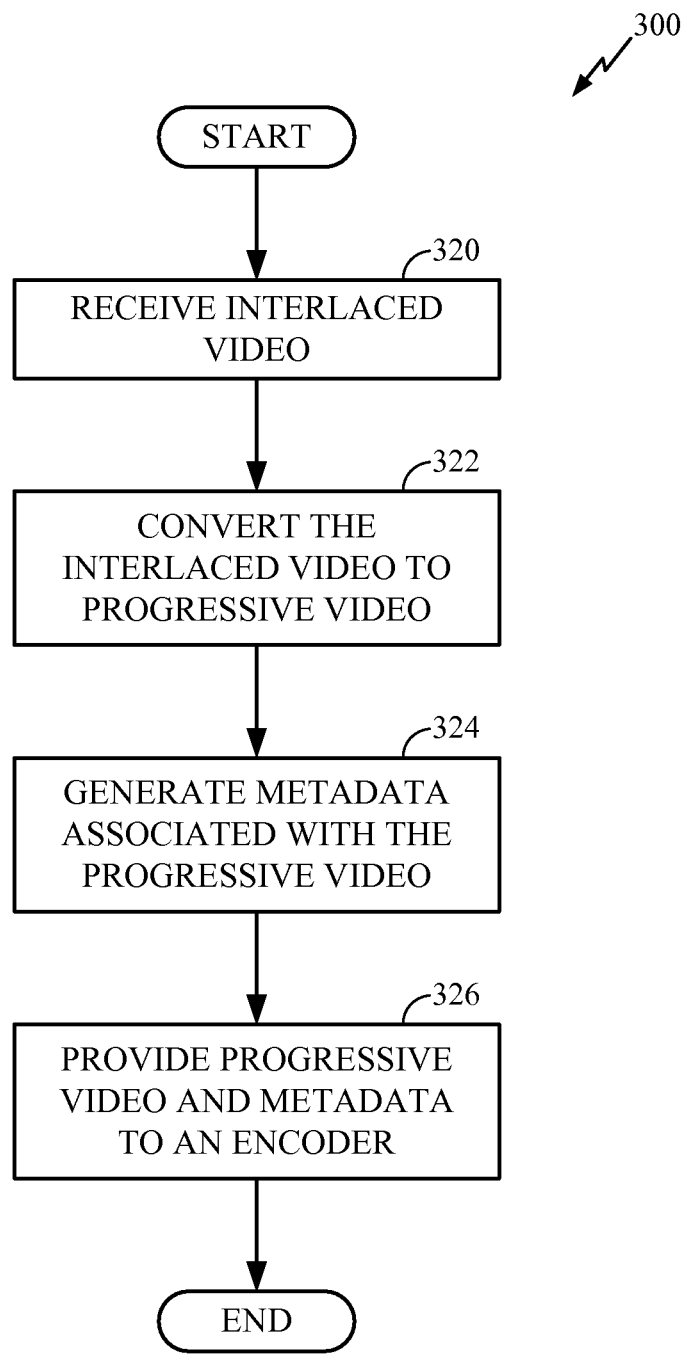
FIG. 3B is a flow diagram that illustrates a process for processing multimedia data.

FIG. 3B is a flow diagram that illustrates a process 300 for processing of multimedia data. Process 300 starts and proceeds to block 320 where interlaced video is received. Preprocessor 202 illustrated in FIG. 2 and FIG. 3 can perform this step. In some aspects, a decoder (e.g., decoder 201 FIG. 2) can receive the interlaced data and the provide it to preprocessor 202. In some aspects, a data receiving module 330 shown in FIG. 3C which is a portion of a preprocessor 202 can perform this step. Process 300 then proceeds to block 322 where interlaced video is converted to progressive video. Preprocessor 202 in FIG. 2 and FIG. 3A, and module 332 of FIG. 3C can perform this step. If the interlaced video has been telecined, block 322 processing can include performing inverse telecining to generate progressive video. Process 300 then proceeds to block 324 to generate metadata associated with the progressive video. The GOP Partitioner 307 in FIG. 3A and a module 334 in FIG. 3C can perform such processing. Process 300 then proceeds to block 326 where the progressive video and at least a portion of the metadata are provided to an encoder for encoding (e.g., compression). Preprocessor 202 shows in FIG. 2 and FIG. 3A, and module 336 in FIG. 3C can perform this step. After providing the progressive video and associated metadata to another component for encoding, process 300 can end.

Figure 3C:
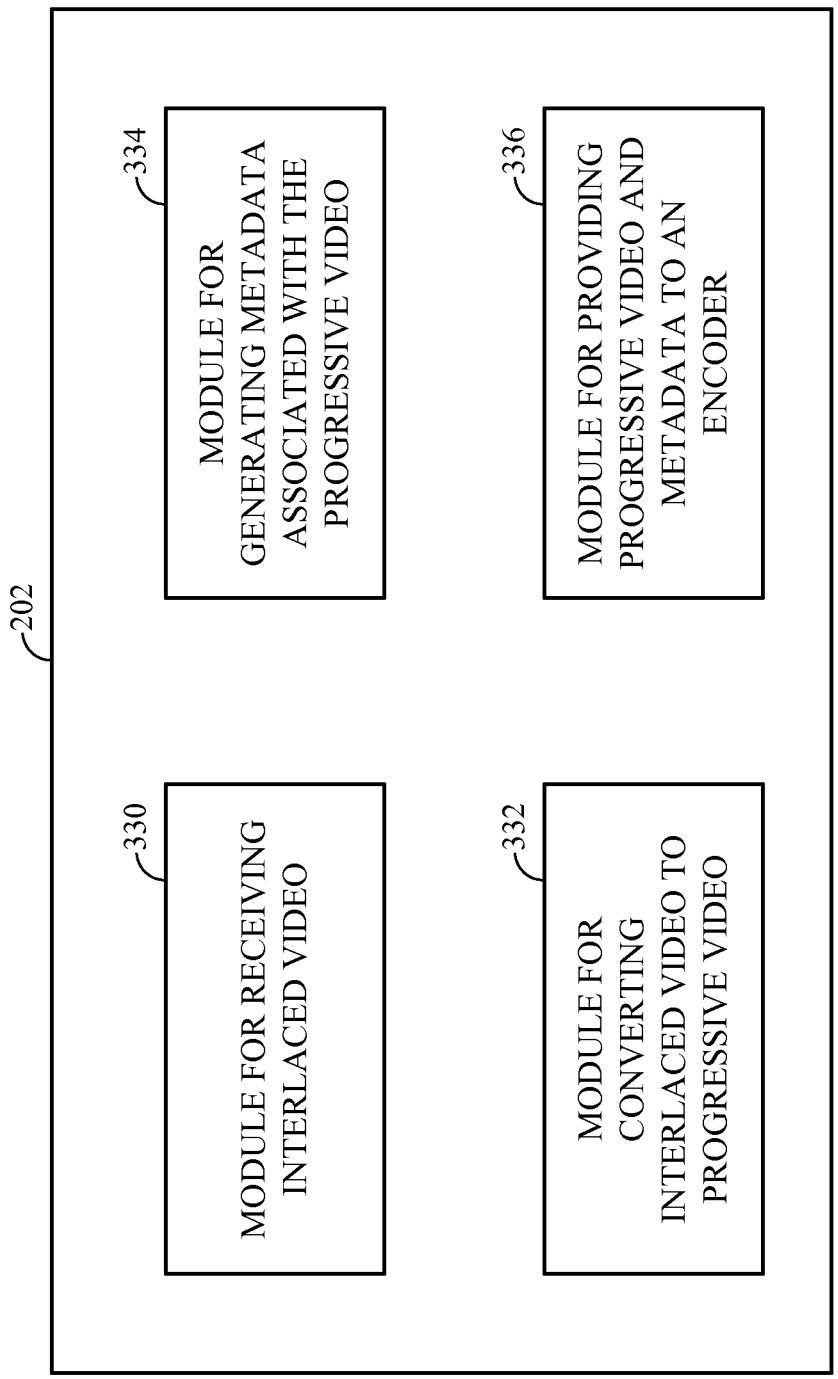
FIG. 3C is a block diagram illustrating means for processing multimedia data.

FIG. 3C is a block diagram illustrating means for processing multimedia data. Shown here such means are incorporated in a preprocessor 202. The preprocessor 202 includes means for receiving video such as module 330. The preprocessor 202 also includes means for converting interlaced data to progressive video such as module 332. Such means can include, for example, a spatial-temporal deinterlacer and/or an inverse teleciner. The preprocessor 202 also includes means for generating metadata associated with the progressive video such as module 334. Such means can include the GOP partitioner 307 (FIG. 3A) which can generate various types of metadata as described herein. The preprocessor 202 can also include means for providing the progressive video and metadata to an encoder for encoding as illustrated by module 336. Such means can include a communications module 309 illustrated in FIG. 3A in some aspects. As will be appreciated by one skilled in the art, such means can be implemented in many standard ways.

The preprocessor 202 can use obtained metadata (e.g., obtained from the decoder 201 or from another source) for one or more of the preprocessing operations. Metadata can include information relating to, describing, or classifying the content of the multimedia data ("consent information"). In particular the metadata can include a content classification. In some aspects, the metadata does not include content information desired for encoding operations. In such cases, the preprocessor 202 can be configured to determine content information and use the content information for preprocessing operations and/or provides the content information to other components, e.g., the decoder 203. In some aspects, the preprocessor 202 can use such content information to influence GOP partitioning, determine appropriate type of filtering, and/or determine encoding parameters that are communicated to an encoder.

Figure 4:
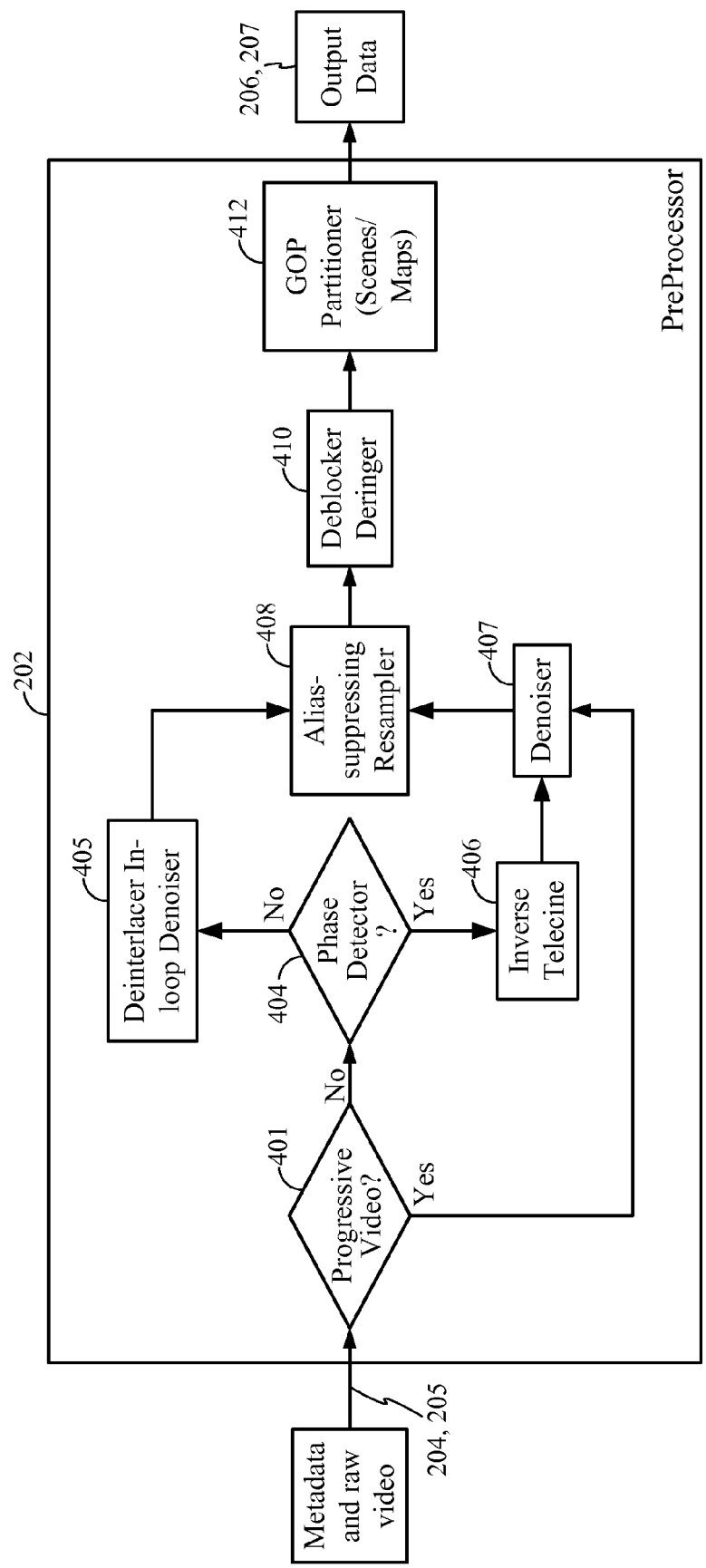
FIG. 4 is a block diagram illustrating operations of an exemplary preprocessor.

FIG. 4 shows an illustrative example of process blocks that can be included in the preprocessor, and illustrates processing that can be performed by the preprocessor 202. In this example, the preprocessor 202 receives metadata and video 204, 205 and provides output data 206, 207 comprising (processed) metadata and video to the encoder 228. Typically, there are three types of video that is received by the preprocessor. First, the received video can be progressive video and deinterlacing does not have to be performed. Second, the video data can be telecined video, interlaced video converted from 24 fps movie sequences, in which case the video. Third, the video can be non-telecined interlaced video. Preprocessor 226 can process these types of video as described below.

At block 401, the preprocessor 202 determines if the received video 204, 205 is progressive video. In some cases, this can be determined from the metadata if the metadata contains such information, or by processing of the video itself. For example, an inverse telecine process, described below, can determine if the received video 205 is progressive video. If it is, the process proceeds to block 407 where filtering operations are performed on the video to reduce noise, such as white Gaussian noise. If the video is not progressive video, at block 401 the process proceeds to block 404 to a phase detector.

Phase detector 604 distinguishes between video that originated in a telecine and that which began in a standard broadcast format. If the decision is made that the video was telecined (the YES decision path exiting phase detector 404), the telecined video is returned to its original format in inverse telecine 406. Redundant fields are identified and eliminated and fields derived from the same video frame are rewoven into a complete image. Since the sequence of reconstructed film images were photographically recorded at regular intervals of 1/24 of a second, the motion estimation process performed in a GOP petitioner 412 or a decoder is more accurate using the inverse telecined images rather than the telecined data, which has an irregular time base.

In one aspect, the phase detector 404 makes certain decisions after receipt of a video frame. These decisions include: (i) whether the present video from a telecine output and the 3:2 pull down phase is one of the five phases $P_0, P_1, P_2, P_3$, and $P_4$ shown in FIG. 5; and (ii) the video was generated as conventional NTSC. That decision is denoted as phase $P_5$. These decisions appear as outputs of phase detector 404 shown in FIG. 4. The path from phase detector 404 labeled "YES" actuates the inverse telecine 406, indicating that it has been provided with the correct pull down phase so that it can sort out the fields that were formed from the same photographic image and combine them. The path from phase detector 404 labeled "NO" similarly actuates the deinterlacer 405 to separate an apparent NTSC frame into fields for optimal processing. Inverse telecine is further described in co-pending U.S. patent application Ser. No. 11/550,752 entitled "Inverse Telecine Algorithm Based on State Machine" which is owned by the assignee hereof and incorporated by reference herein in its entirety.

The phase detector 404 can continuously analyze video frames because different types of video may be received at any time. As an exemplary, video conforming to the NTSC Standard may be inserted into the video as a commercial. After inverse telecine, the resulting progressive video is sent to a denoiser (filter) 407 which can be used to reduce white Gaussian noise.

When conventional NTSC video is recognized (the NO path from phase detector 401), it is transmitted to deinterlacer 405 for compression. The deinterlacer 405 transforms the interlaced fields to progressive video, and denoising operations can then be performed on the progressive video.

After the appropriate inverse telecine or deinterlacing processing, at block 408 the progressive video is processed for alias, suppressing and resampling (e.g., resizing).

After resampling, the progressive video then proceeds to block 410 where deblocker and deringing operations are performed. Two types of artifacts, "blocking" and "ringing," commonly occur in video compression applications. Blocking artifacts occur because compression algorithms divide each frame into blocks (e.g., 8×8 blocks). Each block is reconstructed with some small errors, and the errors at the edges of a block often contrast with the errors at the edges of neighboring blocks, making block boundaries visible. In contrast, ringing artifacts appear as distortions around the edges of image features. Ringing artifacts occur because the encoder discards too much information in quantizing the high-frequency DCT coefficients. In some illustrative examples, both deblocking and deringing can use low-pass FIR (finite impulse response) filters to hide these visible artifacts.

After deblocking and deringing, the progressive video is processed by a GOP partitioner 412. GOP positioning can include detecting shot changes, generating complexity maps (e.g., temporal, spatial bandwidth maps), and adaptive GOP partitioning. Shot detection relates to determining when a frame in a group of pictures (GOP) exhibits data that indicates a scene change has occurred. Scene change detection can be used for a video encoder to determine a proper GOP length and insert I-frames based on the GOP length, instead of insetting an I-frame at a fixed interval. The preprocessor 202 can also be configured to generate a bandwidth map which can be used for encoding the multimedia data. In some aspects, a content classification module located external to the preprocessor generates the bandwidth map instead. Adaptive GOP partitioning the can adaptively change the composition of a group of pictures coded together. Illustrative examples of is the operations shown in FIG. 4 are described below.

Inverse Telecine

Inverse telecine processing is described below and an illustrative example of inverse telecine is provided in reference to FIGS. 4-16. Video compression gives best results when the properties of the source are known and used to select the ideally matching form of processing. Off-the-air video, for example, can originate in several ways. Broadcast video that is conventionally generated—in video cameras, broadcast studios etc.—conforms in the United States to the NTSC standard. According to the standard, each frame is made up of two fields. One field consists of the odd lines, the other, the even lines. This may be referred to as an "interlaced" format. While the frames are generated at approximately 30 frames/sec, the fields are records of the television camera's image that are 1/60 sec apart. Film on the other hand is shot at 24 frames/sec, each frame consisting of a complete image. This may be referred to as a "progressive" format. For transmission in NTSC equipment, "progressive" video is converted into "interlaced" video format via a telecine process. In one aspect, further discussed below, the system advantageously determines when video has been telecined and performs an appropriate transform to regenerate the original progressive frames.

Figure 5:
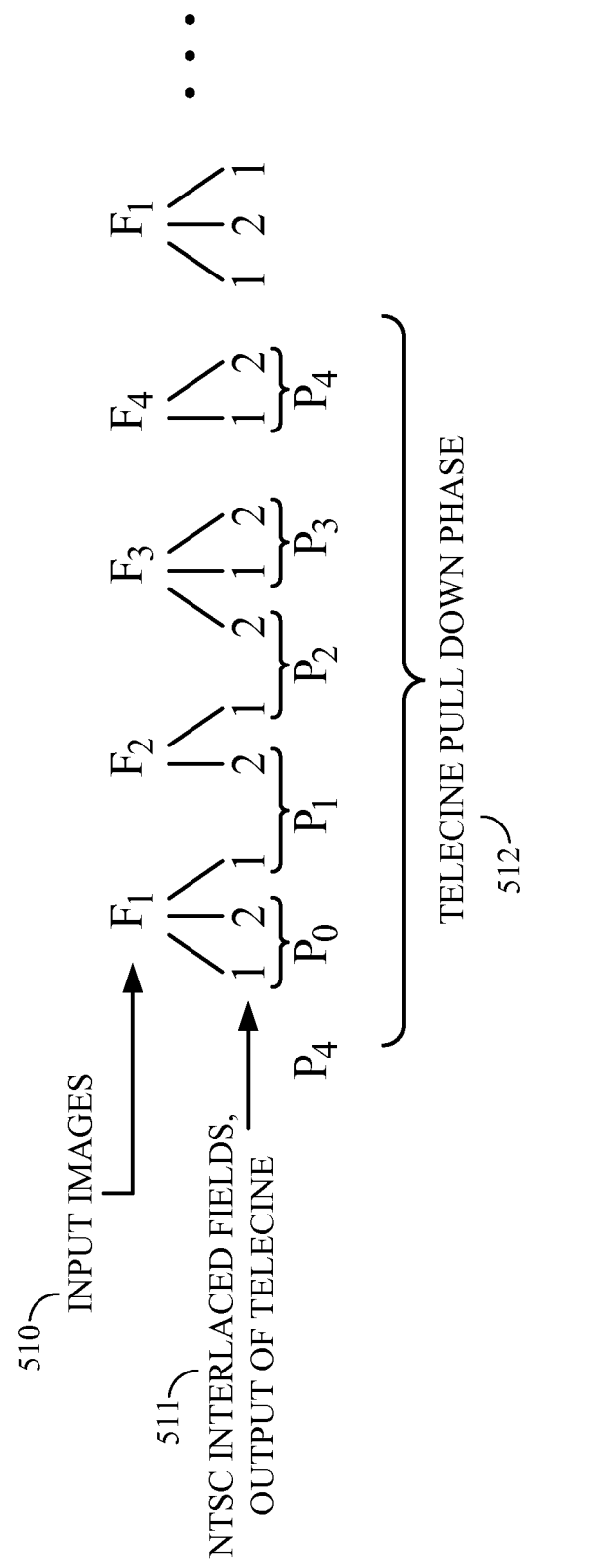
FIG. 5 is a diagram of phase decisions in an inverse telecine process.

FIG. 5 shows the effect of telecining progressive frames that were converted to interlaced video. $F_1$, $F_2$, $F_3$, and $F_4$ are progressive images 510 that are the input to a telecine. The numbers "1" and "2" below the respective frames are indications of either odd or even fields. It is noted that some fields are repeated in view of disparities amongst the frame rates. FIG. 5 also shows pull-down phases $P_0$, $P_1$, $P_2$, $P_3$, and $P_4$. The phase $P_0$ is marked by the first of two NTSC compatible frames 511 which have identical first fields. The following four frames correspond to phases $P_1$, $P_2$, $P_3$, and $P_4$. Note that the frames marked by $P_2$ and $P_3$ have identical second fields. Because film frame $F_1$ is scanned three times, two identical successive output NTSC compatible first fields 511 are formed. All NBC fields derived from Film frame $F_1$ are taken from the same film image and therefore are taken at the same instant of time. Other NTSC frames derived from the film may have adjacent fields 1/24 sec apart.

The phase detector 404 illustrated in FIG. 4 makes certain decisions after receipt of a video frame. These decisions include: (i) whether the present video from a telecine output and the 3:2 pull down phase is one of the five phases $P_0$, $P_1$, $P_2$, $P_3$, and $P_4$ shown in definition 512 of FIG. 5; and (ii) the video was generated as conventional NTSC—that decision is denoted as phase $P_5$.

These decisions appear as outputs of phase detector 401 shown in FIG. 4. The path from phase detector 401 labeled "YES" actuates the inverse telecine 406, indicating that it has been provided with the correct pull down phase so that it can sort out the fields that were formed from the same photographic image and combine them. The path from phase detector 401 labeled "NO" similarly actuates the deinterlacer block 405 to separate an apparent NTSC frame into fields for optimal processing.

Figure 6:
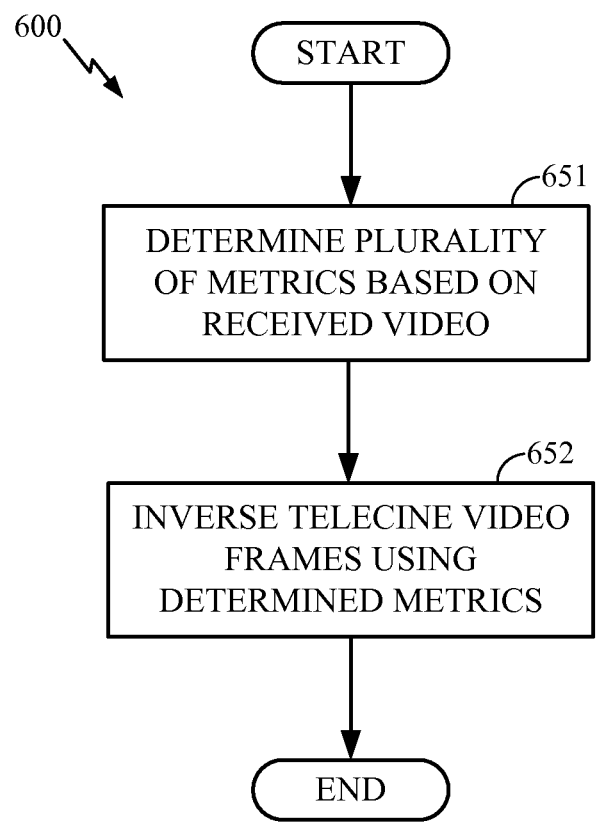
FIG. 6 is a flow diagram illustrating a process of inverting telecined video.

FIG. 6 is a flowchart illustrating a process 600 of inverse telecining a video stream. In one aspect, the process 600 is performed by the inverse telecine 301 of FIG. 3. Starting at a step 631, the inverse telecine 301 determines a plurality of metrics based upon the received video. In this aspect, four metrics are formed which are sums of differences between fields drawn from the same frame or adjacent frames. The four metrics are further assembled into a Euclidian measure of distance between the four metrics derived from the received data and the most likely values of these metrics for each of the six hypothesized phases. The Euclidean sums are called branch information; for each received frame there are six such quantities. Each hypothesized phase has a successor phase which, in the case of the possible pull down phases, changes with each received frame.

Figure 7:
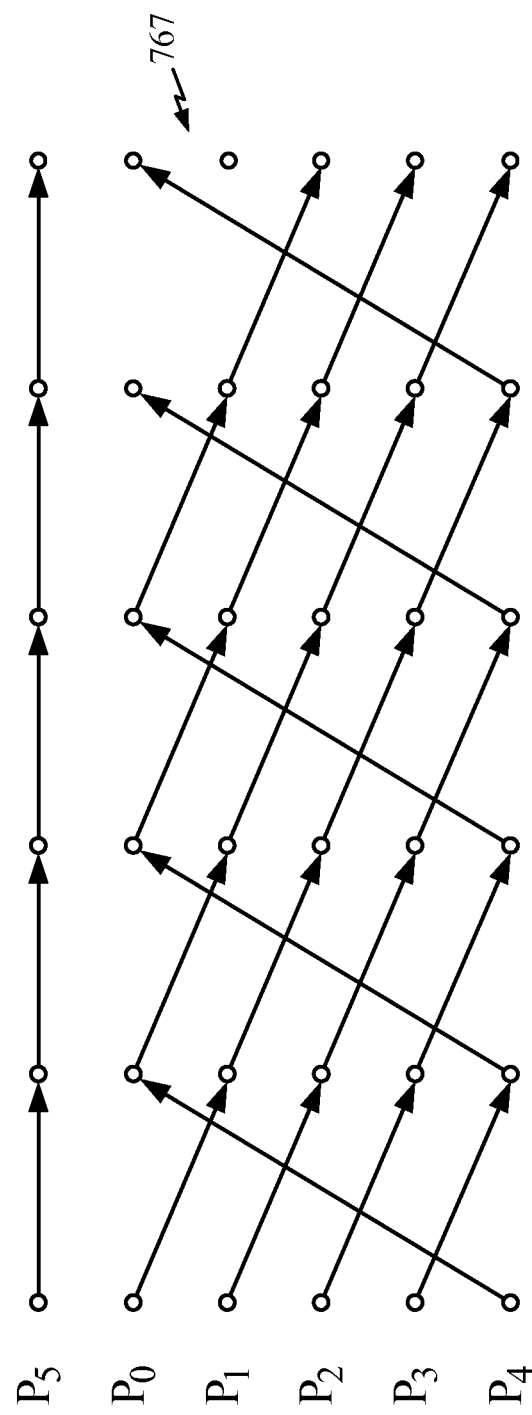
FIG. 7 is an illustration of a trellis showing phase transitions.

The possible paths of transitions are shown in FIG. 7 and denoted by 767. There are six such paths. The decision process maintains six measures equivalent to the sum of Euclidean distances for each path of hypothesized phases. To make the procedure responsive to changed conditions each Euclidean distance in the sum is diminished as it gets older. The phase track whose sum of Euclidean distances is smallest is deemed to be the operative one. The current phase of this track is called the "applicable phase," Inverse telecining based on the phase selected, so long as it is not $P_5$, can now take place. If $P_5$ is selected then the current frame is deinterlaced using the deinterlacer at block 405 (FIG. 4). In summary, the applicable phase is either utilized as the current pull down phase, or as an indicator to command the deinterlace of a frame that has been estimated to have a valid NTSC format.

For every frame received from the video input, a new value for each of four metrics is computed. These are defined as:

$$SAD_{FS} = \Sigma |\text{Current Field One Value}(i,j) - \text{Previous Field One Value}(i,j)| \quad (1)$$

$$SAD_{SS} = \Sigma |\text{Current Field Two Value}(i,j) - \text{Previous Field Two Value}(i,j)| \quad (2)$$

$$SAD_{PO} = \Sigma |\text{Current Field One Value}(i,j) - \text{Previous Field Two Value}(i,j)| \quad (3)$$

$$SAD_{CO} = \Sigma |\text{Current Field One Value}(i,j) - \text{Current Field Two Value}(i,j)| \quad (4)$$

Figure 8:
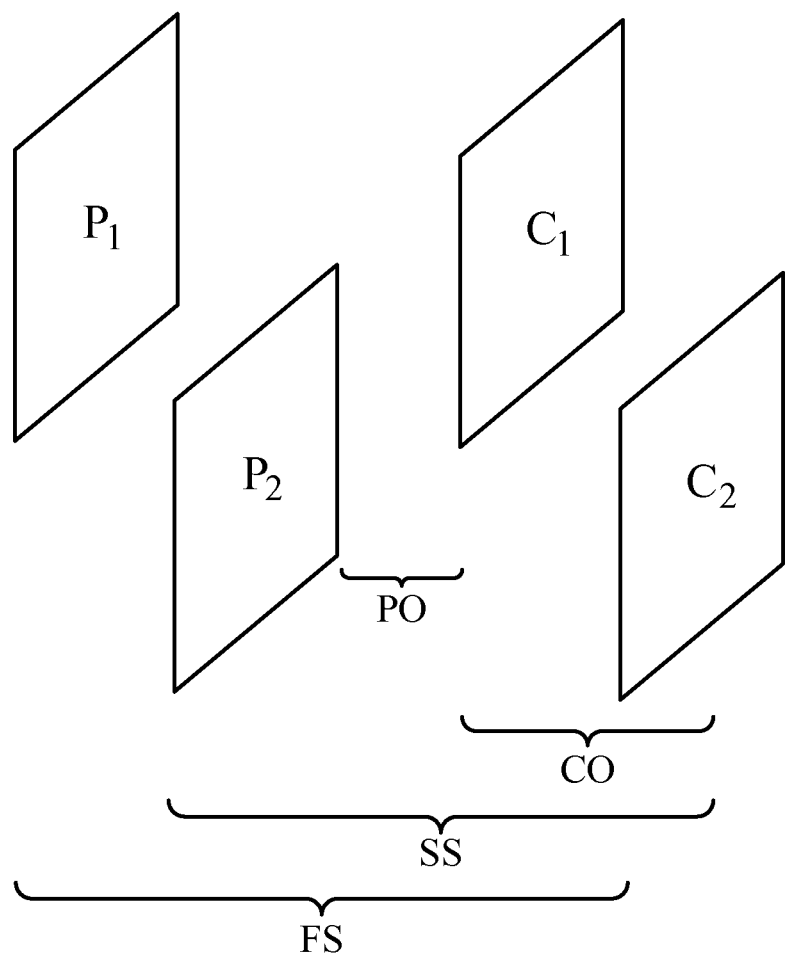
FIG. 8 is a guide to identify the respective frames that are used to create a plurality of matrices.

The term SAD is an abbreviation of the term "summed absolute differences." The fields which are differenced to form the metrics are graphically shown m FIG. 8. The subscript refers to the field number; the letter denotes either Previous (=P) or Current (=C). The brackets in FIG. 8 refers to the pair-wise differencing of the fields. $SAD_{FS}$ refers to differences between the field one of the current frame, labeled $C_1$, and field one of the previous frame, labeled $P_1$, which are spanned by a bracket labeled FS in definition provided in FIG. 8; $SAD_{SS}$ refers to differences between the field two of the current frame, labeled $C_2$, and field two of the previous frame, labeled $P_2$, which are both spanned by a bracket labeled SS; $SAD_{CO}$ refers to differences between field 2 of the current frame labeled $C_2$ and field one of the current frame, labeled $C_1$, which is spanned by a bracket labeled CO; and $SAD_{PO}$ refers to differences between field one of the current frame and field 2 of the previous frame, which are both spanned by a bracket labeled PO.

The computational load to evaluate each SAD is described below. There are approximately 480 active horizontal lines in conventional NTSC. For the resolution to be the same in the horizontal direction, with a 4:3 aspect ratio, there should be 480×4/3=640 equivalent vertical lines, or degrees of freedom. The video format of 640×480 pixels is one of the formats accepted by the Advanced Television Standards Committee. Thus, every 1/30 of a second, the duration of a frame, 640×480=307,200 new pixels are generated. New data is generated at a rate of 9.2×10⁶ pixels/sec, implying that the hardware or software running this system processes data at approximately a 10 MB rate or more. This is one of the high speed portions of the system. It can be implemented by hardware, software, firmware, middleware, microcode, or any combination thereof. The SAD calculator could be a standalone component, incorporated as hardware, firmware, middleware in a component of another device, or be implemented in microcode or software that is executed on the processor, or a combination thereof. When implemented in software, firmware, middleware or microcode, the program code or code segments that perform the calculation may be stored in a machine readable medium such as a storage medium. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Figure 9:
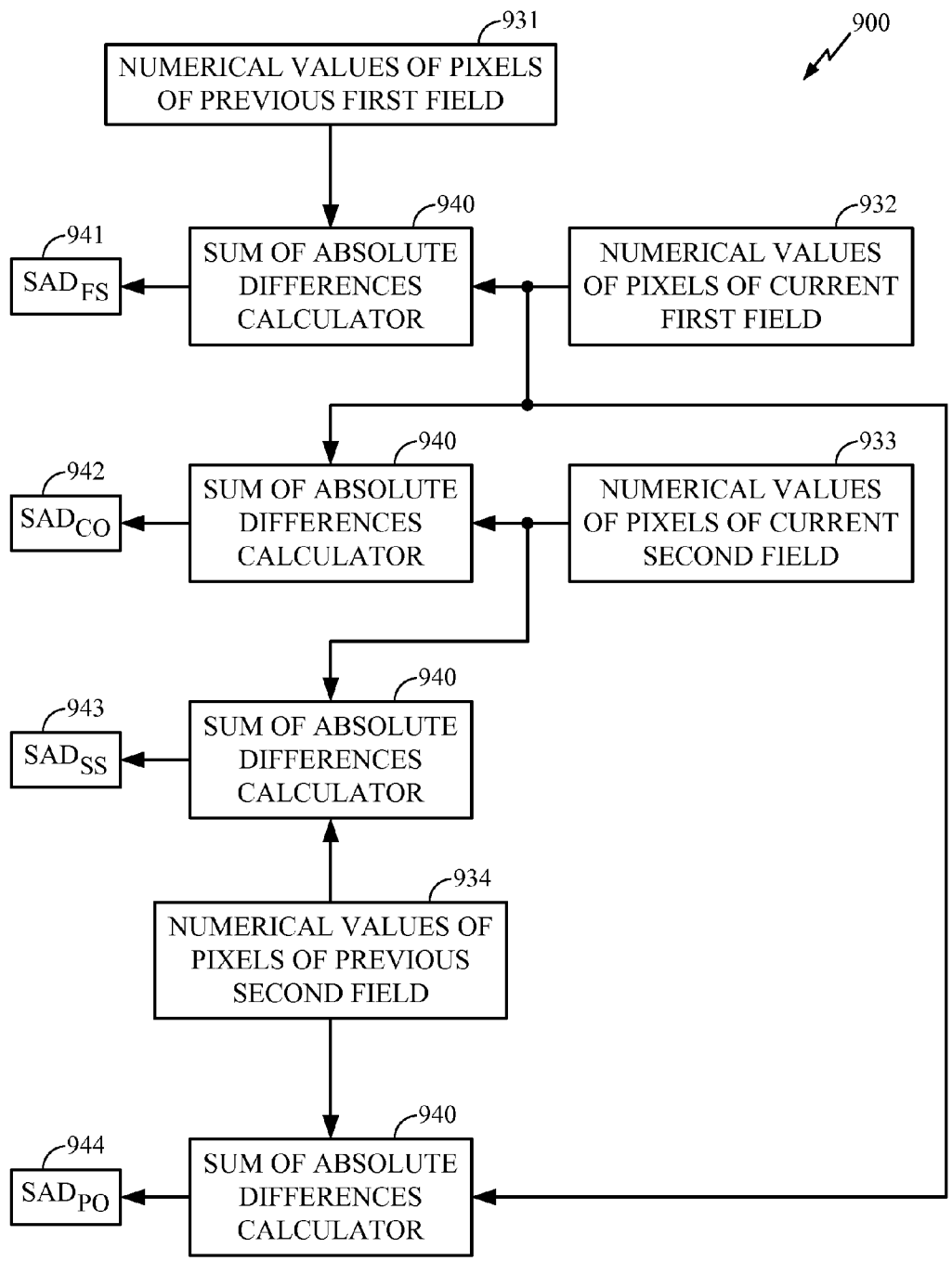
FIG. 9 is a flow diagram illustrating how the metrics of FIG. 8 are created.

Flowchart 900 in FIG. 9 makes explicit the relationships in FIG. 8 and is a graphical representation of Equations 1-4. It shows storage locations 941, 942, 943, and 944 into which are kept the most recent values of $SAD_{FS}$, $SAD_{CO}$, $SAD_{SS}$ and $SAD_{PO}$ respectively. These are each generated by four sum of absolute differences calculators 940, which process the luminance values of previous first field data 931, luminance values of current first field data 932, luminance values of current second field data 933 and luminance values of the previous second field data 934. In the summations that define the metrics, the term "value(i,j)" is meant to be the value of the luminance at position i,j, the summation being over all active pixels, though summing over the a meaningful subset of active pixels is not excluded.

Figure 10:
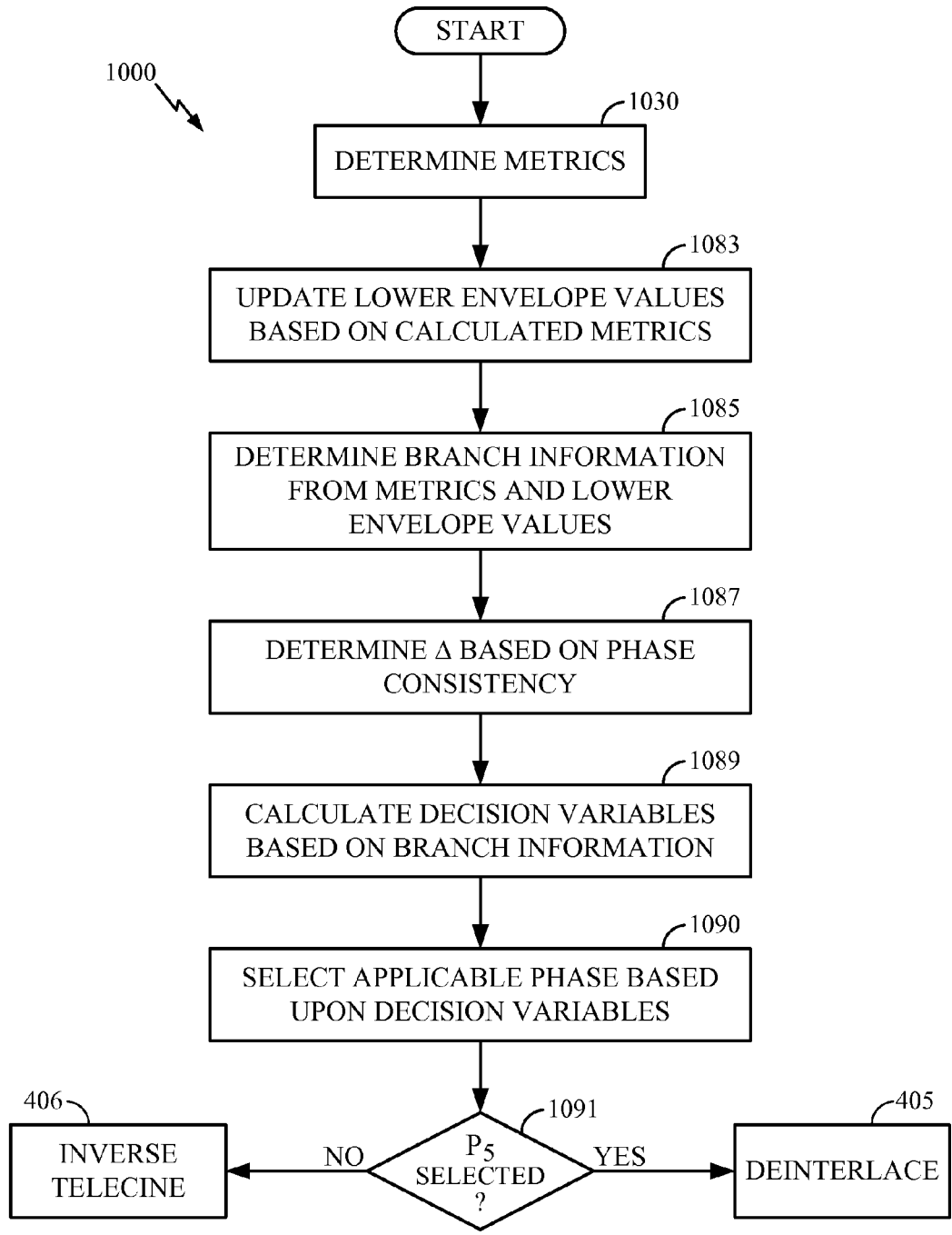
FIG. 10 is a flow diagram which shows the processing of the metrics to arrive at air estimated phase.

Flowchart 100 in FIG. 10 is a detailed flowchart illustrating the process for detecting telecined video and inverting it to recover to the original scanned film image. In step 1030 the metrics defined in FIG. 9 are evaluated. Continuing to step 1083, lower envelope values of the four metrics are found. A lower envelope of a SAD metric is a dynamically determined quantity that is the highest numerical floor below which the SAD does not penetrate. Continuing to step 1085 branch information quantities defined below in Equations 5-10 are determined, which can use the previously determined metrics, the lower envelope values and an experimentally determined constant A. Since the successive values of the phase may be inconsistent, a quantity $\Delta$ is determined to reduce this apparent instability in step 1087. The phase is deemed consistent when the sequence of phase decisions is, consistent with the model of the problem shown in FIG. 7. Following that step, the process proceeds to step 1089 to calculate the decision variables using the current value of $\Delta$. Decision variables calculator 1089 evaluates decision variables using all the information generated in the blocks of 1080 that led to it. Steps 1030, 1083, 1085, 1087, and 1089 are an expansion of metrics determination 651 in FIG. 6. From these variables, the applicable phase is found by phase selector 1090. Decision step 1091 uses the applicable phase to either invert the telecined video or deinterlace it as shown. It is a more explicit statement of the operation of phase detector 404 in FIG. 4. In one aspect the processing of FIG. 10 is performed by the phase detector 404 of FIG. 4. Starting at step 1030, detector 404 determines a plurality of metrics by the process described above with reference to FIG. 8, and continues through steps 1083, 1085, 1087, 1089, 1090, and 1091.

Flowchart 1000 illustrates a process for estimating the current phase. The flowchart at a step 1083 describes the use of the determined metrics and lower envelope values to compute branch information. The branch information may be recognized as the Euclidean distances discussed earlier. Exemplary equations that may be used to generate the branch information are Equations 5-10 below. The Branch Info quantities are computed in block 1209 of FIG. 12.

The processed video data can be stored in a storage medium which can include, for example, a chip configured storage medium (e.g., ROM, RAM) or a disc-type storage medium (e.g., magnetic or optical) connected to processor. In some aspects, the inverse telecine 406 and the deinterlacer 405 can each contain part or all of the storage medium. The branch information quantities are defined by the following equations.

$$\text{Branch Info}(0) = (SAD_{FS} - H_S)^2 + (SAD_{SS} - H_S)^2 + (SAD_{PO} - H_P)^2 + (SAD_{CO} - L_C)^2 \quad (5)$$

$$\text{Branch Info}(1) = (SAD_{FS} - L_S)^2 + (SAD_{SS} - H_S)^2 + (SAD_{PO} - L_P)^2 + (SAD_{C_O} - H_C)^2 \quad (6)$$

$$\text{Branch Info}(2) = (SAD_{FS} - H_S)^2 + (SAD_{SS} - H_S)^2 + (SAD_{PO} - L_P)^2 + (SAD_{C_O} - H_C)^2 \quad (7)$$

$$\text{Branch Info}(3) = (SAD_{FS} - H_S)^2 + (SAD_{SS} - L_S)^2 + (SAD_{PO} - L_P)^2 + (SAD_{CO} - L_C)^2 \quad (8)$$

$$\text{Branch Info}(4) = (SAD_{FS} - H_S)^2 + (SAD_{SS} - H_S)^2 + (SAD_{PO} - H_P)^2 + (SAD_{CO} - L_C)^2 \quad (9)$$

$$\text{Branch Info}(5) = (SAD_{FS} - L_S)^2 + (SAD_{SS} - L_S)^2 + (SAD_{PO} - L_P)^2 + (SAD_{CO} - L_C)^2 \quad (10)$$

Figure 12:
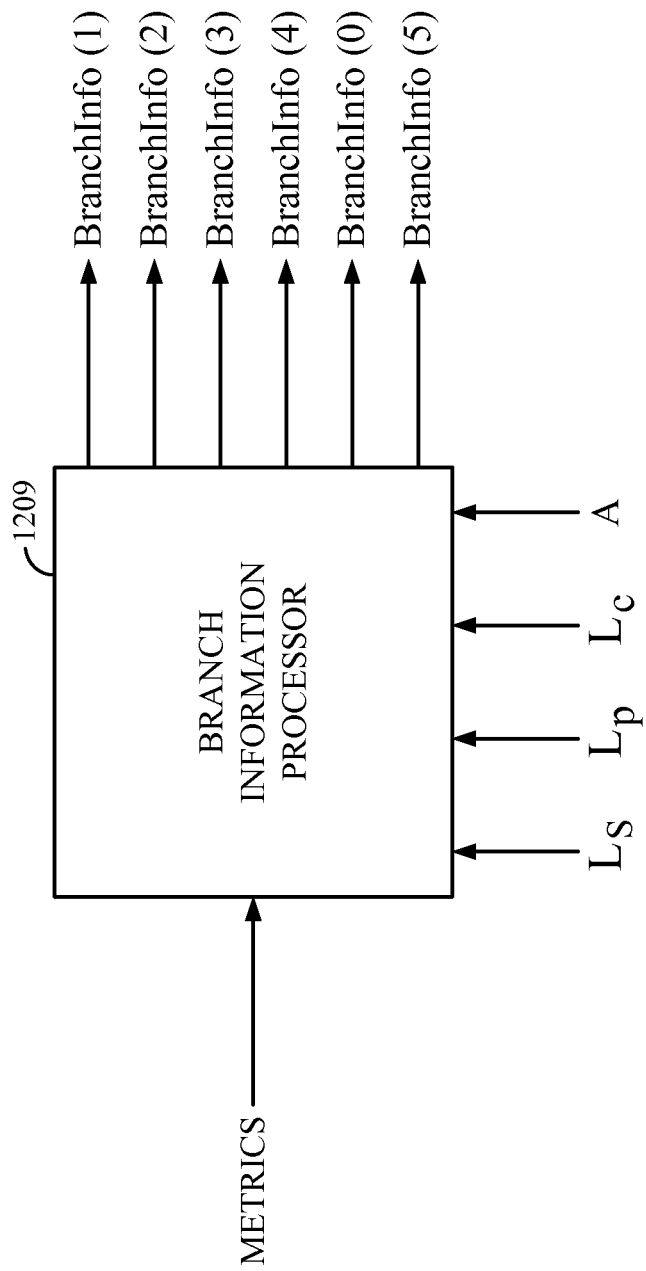
FIG. 12 is a block diagram depicting variables that are used to evaluate the branch information.

The fine detail of the branch computation is shown in branch information calculator 1209 in FIG. 12. As shown in calculator 1209 developing the branch information uses the quantities $L_S$, the lower envelope value of $SAD_{FS}$ and $SAD_{SS}$, $L_P$, the lower envelope value of $SAD_{PO}$, and $L_C$, the lower envelope value of $SAD_{CO}$. The lower envelopes are used as distance offsets in the branch information calculations, either alone or in conjunction with a predetermined constant A to create $H_S$, $H_P$ and $H_C$. Their values are kept up to date in lower envelope trackers described below. The H offsets are defined to be:

$$H_S = L_S + A \quad (11)$$

$$H_{PO} = L_P + A \quad (12)$$

$$H_C = L_C + A \quad (13)$$

Figure 13A:
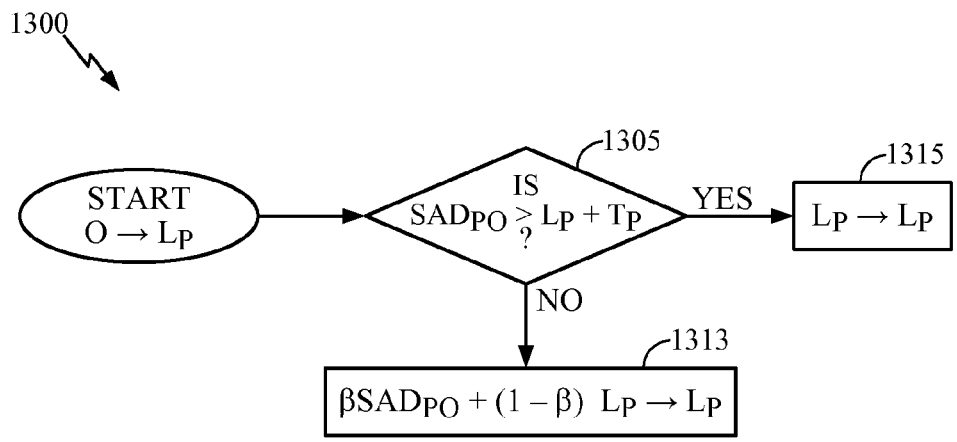
FIGS. 13A, 13B and 13C are flow diagrams showing how lower envelopes are computed.
Figure 13B:
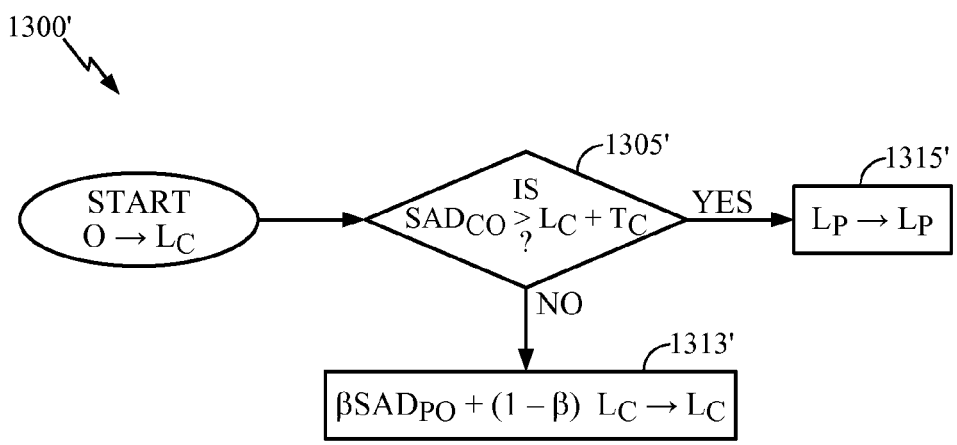
Figure 13C:
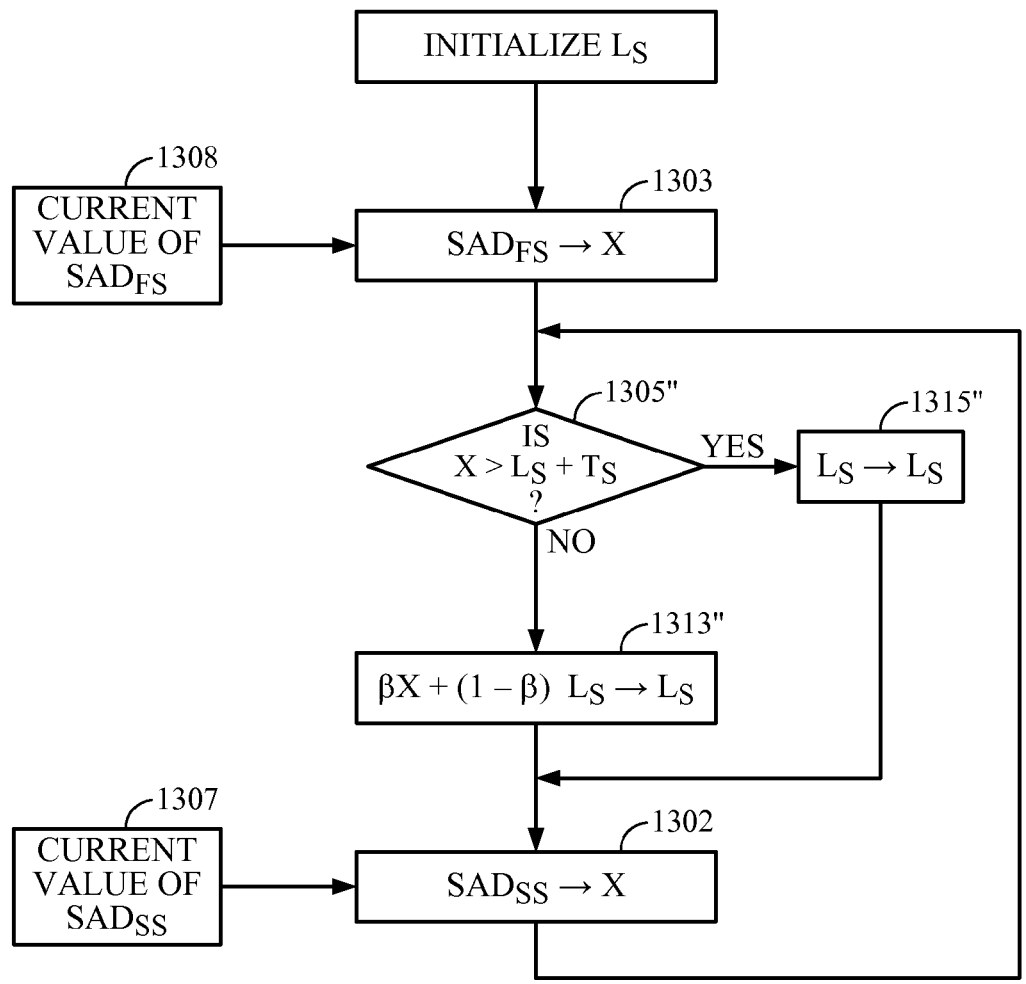
Figure 14:
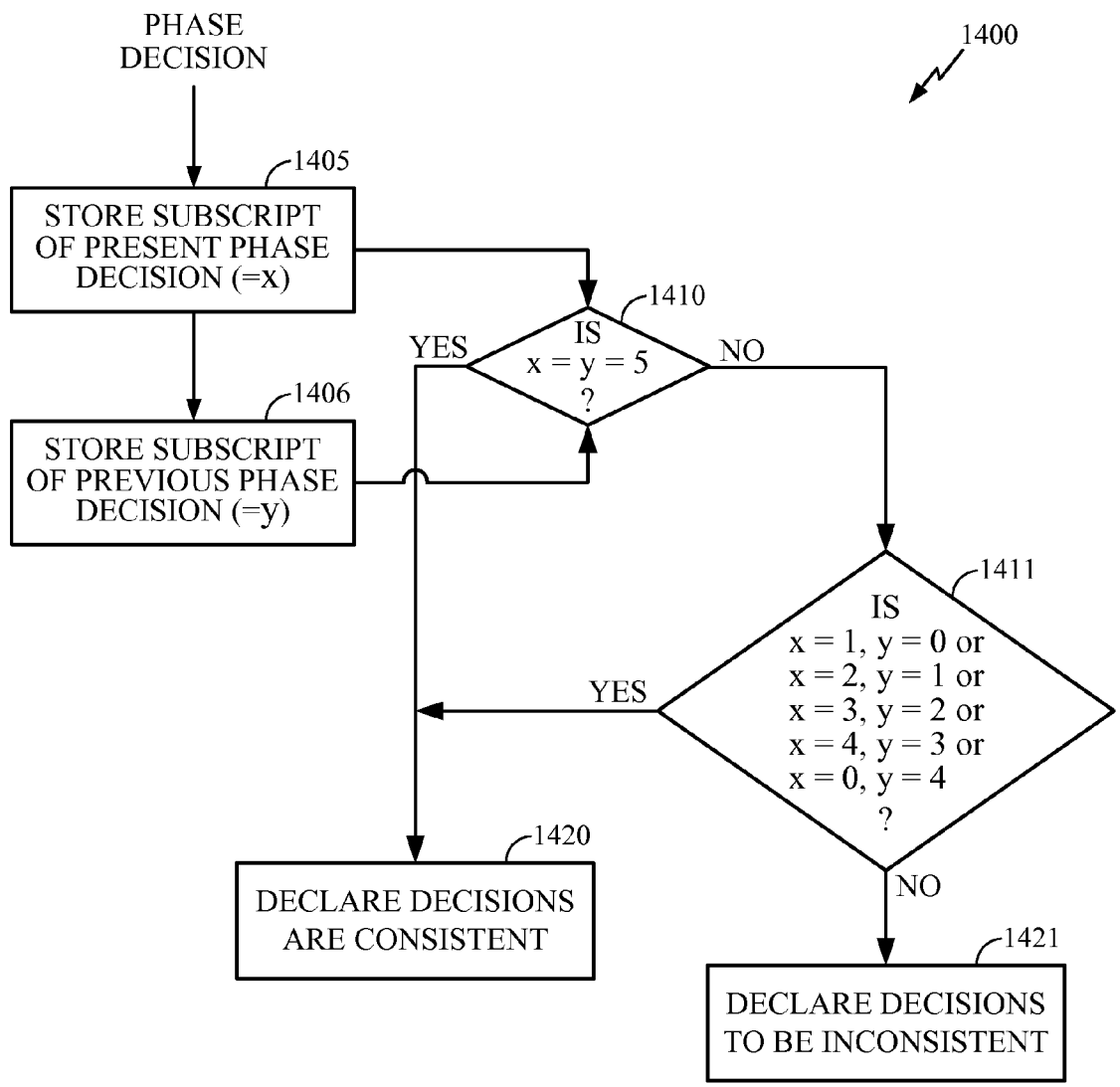
FIG. 14 is a flow diagram showing the operation of a consistency detector.

A process of tracking the values of $L_S$, $L_P$, and $L_C$ is presented in FIGS. 13A, 13B, and 13C. Consider, for example, the tracking algorithm for $L_P$ 1300 shown at the top of FIG. 11A. The metric $SAD_{PO}$ is compared with the current value of $L_P$ plus a threshold $T_P$ in comparator 1305. If it exceeds it, the current value of $L_P$ is unchanged as shown in block 1315. If it does not, the new value of $L_P$ becomes a linear combination of $SAD_{PO}$ and $L_P$ as seen in block 1313. In another aspect for block 1315 the new value of $L_P$ is $L_P + T_P$.

The quantities $L_S$ and $L_C$ in FIGS. 13B and 13C are similarly computed. Processing blocks in FIGS. 13A, 13B, and 13C which have the same function are numbered identically but given primes (' or ") to show that they operate on a different set of variables. For example, when a linear combination of the $SAD_{PO}$ and $L_C$ are formed, that operation is shown in block 1313'. As is the case for $L_P$, another aspect for 1315' would replace $L_C$ by $L_C + T_C$.

In the case of $L_S$, however, the algorithm in FIG. 13B processes $SAD_{FS}$ and $SAD_{SS}$ alternately, in turn labeling each X, since this lower envelope applies to both variables. The alternation of $SAD_{FS}$ and $SAD_{SS}$ values takes place when the current value of $SAD_{FS}$ in block 1308 is read into the location for X in block 1303, followed by the current value of $SAD_{SS}$ in 1307 being read into the location for X in block 1302. As is the case for $L_P$, another aspect for 1315" would replace $L_S$ by $L_S + T_S$. The quantity A and the threshold values used in testing the current lower envelope values are predetermined by experiment.

Figure 11:
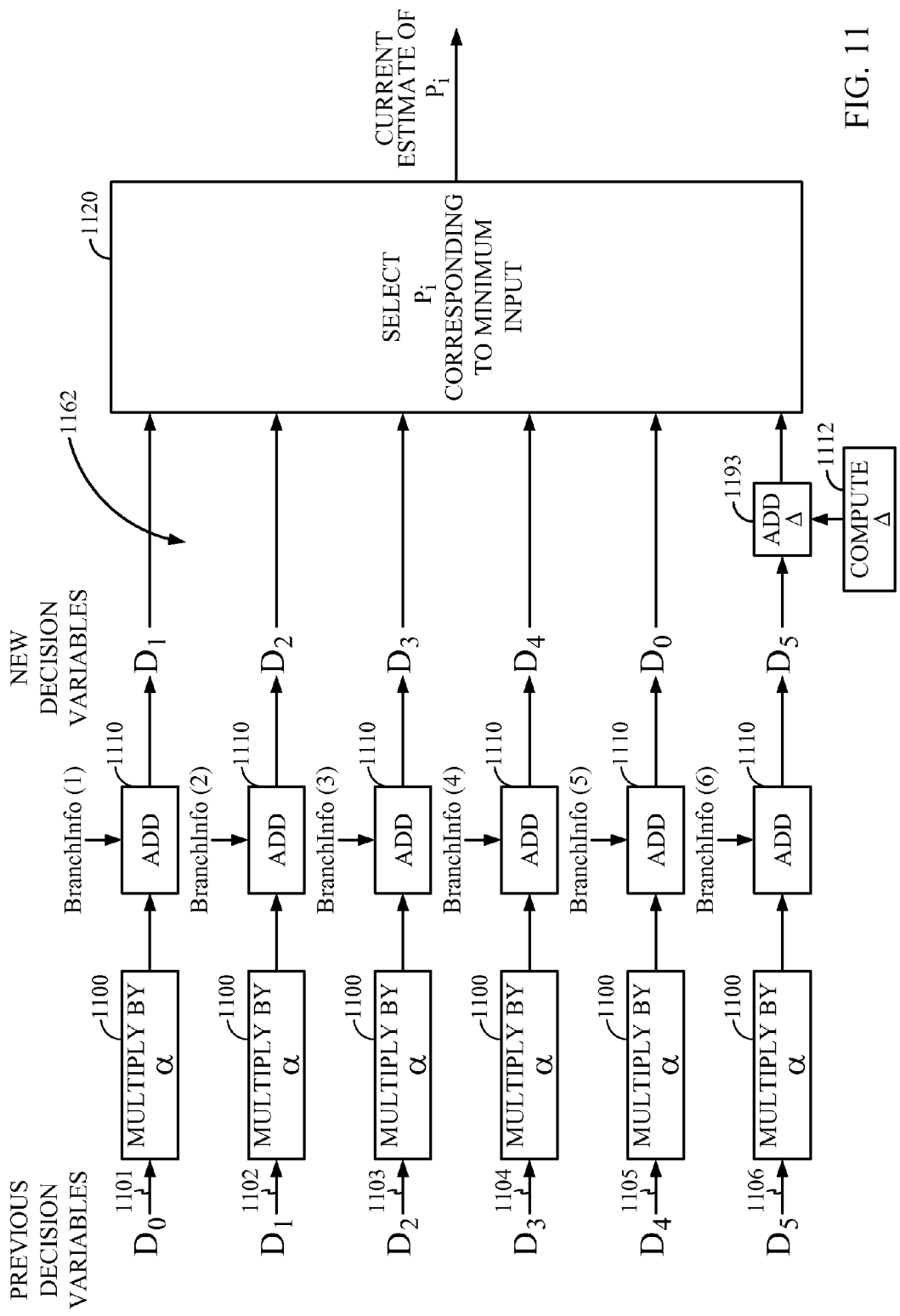
FIG. 11 is a dataflow diagram illustrating a system for generating decision variables.

FIG. 11 is a flowchart illustrating an exemplary, process for performing step 1089 of FIG. 10. FIG. 11 generally shows a process for updating the decision variables. There the six decision variables (corresponding to the six possible decisions) are updated with new information derived from the metrics. The decision variables are found as follows:

$$D_0 = \alpha D_4 + \text{Branch Info}(0) \quad (14)$$

$$D_1 = \alpha D_0 + \text{Branch Info}(1) \quad (15)$$

$$D_2 = \alpha D_1 + \text{Branch Info}(2) \quad (16)$$

$$D_3 = \alpha D_2 + \text{Branch Info}(3) \quad (17)$$

$$D_4 = \alpha D_3 + \text{Branch Info}(4) \quad (18)$$

$$D_5 = \alpha D_5 + \text{Branch Info}(5) \quad (19)$$

The quantity α is less than unity and limits the dependence of the decision variables on their past values; use of α is equivalent to diminishing the effect of each Euclidean distance as its data ages. In flowchart 1162 the decision variables to be updated are listed on the left as available on lines 1101, 1102, 1103, 1104, 1105, and 1106. Each of the decision variables on one of the phase transition paths is then multiplied by α, a number less than one in one of the blocks 1100; then the attenuated value of the old decision variable is added to the current value of the branch info variable indexed by the next phase on the phase transition path that the attenuated decision variable was on. This takes place in block 1110. Variable $D_5$ is offset by a quantity Δ in block 1193; Δ is computed in block 1112. As described below, the quantity is chosen to reduce an inconsistency in the sequence of phases determined by this system. The smallest decision variable is found in block 1120.

In summary, new information specific to each decision is added to the appropriate decision variable's previous value that has been multiplied by α, to get the current decision variable's value. A new decision can be made when new metrics are in hand; therefore this technique is capable of making a new decision upon receipt of fields 1 and 2 of every frame. These decision variables are the sums of Euclidean distances referred to earlier.

The applicable phase is selected to be the one having the subscript of the smallest decision variable. A decision based on the decision variables is made explicitly in block 1090 of FIG. 10. Certain decisions are allowed in decision space. As described in block 1091, these decisions are: (i) The applicable phase in not $P_5$—inverse telecine the video and (ii) the applicable phase is $P_5$—deinterlace the video.

There may be occasional errors in a coherent string of decisions, because the metrics are drawn from video, which is inherently variable. This technique detects phase sequences that are inconsistent with FIG. 7. Its operation is outlined in FIG. 14. The algorithm 1400 stores the subscript of the present phase decision (=x) in block 1403 and the subscript of the previous phase decision (=y) in block 1406. In block 1410, if x=y=5 is tested; in block 1411 the following values are tested:

if $x=1, y=0$; or $x=2, y=1$; or $x=3, y=2$; or $x=4, y=3$; or $x=0, y=4$.

If either of the two tests is affirmative, the decisions are declared to be consistent in block 1420. If neither test is affirmative, an offset, shown in block 1193 of FIG. 11 is computed in FIG. 15 and added to $D_5$, the decision variable associated with $P_5$.

Figure 15:
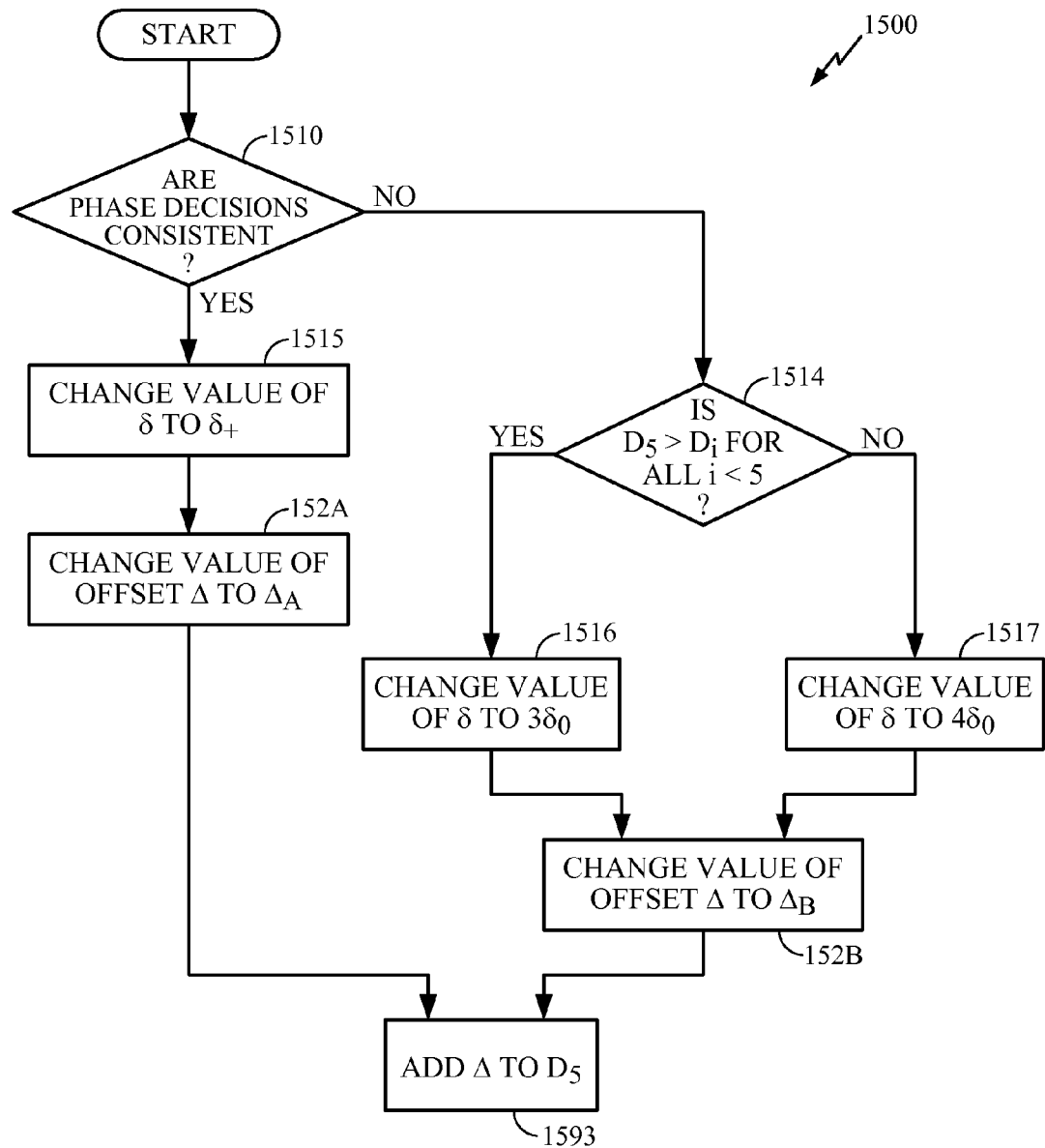
FIG. 15 is a flow diagram showing a process of computing an offset to a decision variable that is used to compensate for inconsistency in phase decisions.

The modification to $D_5$ also appears in FIG. 15 as part of process 1500, which provides corrective action to inconsistencies in a sequence of phases. Suppose the consistency test in block 1510 in flowchart 1500 has failed. Proceeding along the "No" branch that leads from block 1510, the next test in block 1514 is whether $D_5 > D_i$ for all i<5, or alternatively is at least one of the variables, $D_i$, for i<5, bigger than $D_5$. If the first case is valid, a parameter δ, whose initial value is $δ_0$, is changed to $3δ_0$ in block 1516. If the second, case is valid, then δ is changed to $4δ_0$ in block 1517. In block 152B, the value of Δ is updated to be $Δ_B$, where $$Δ_B = \max(Δ-δ, -40δ_0) \quad (20)$$

Returning again to block 15210, assume that the string of decisions is judged to be consistent. The parameter δ is changed to $δ_+$ in block 15215, defined by $$δ_+ = \max(2δ, 16δ_0) \quad (21)$$

The new value of δ is inserted into $Δ_A$, the updating relationship for Δ in block 152A. This is $$Δ_A = \max(Δ+δ, 40δ_0) \quad (22)$$

Then the updated value of Δ is added to decision variable $D_5$ in block 1593.

Figure 16:
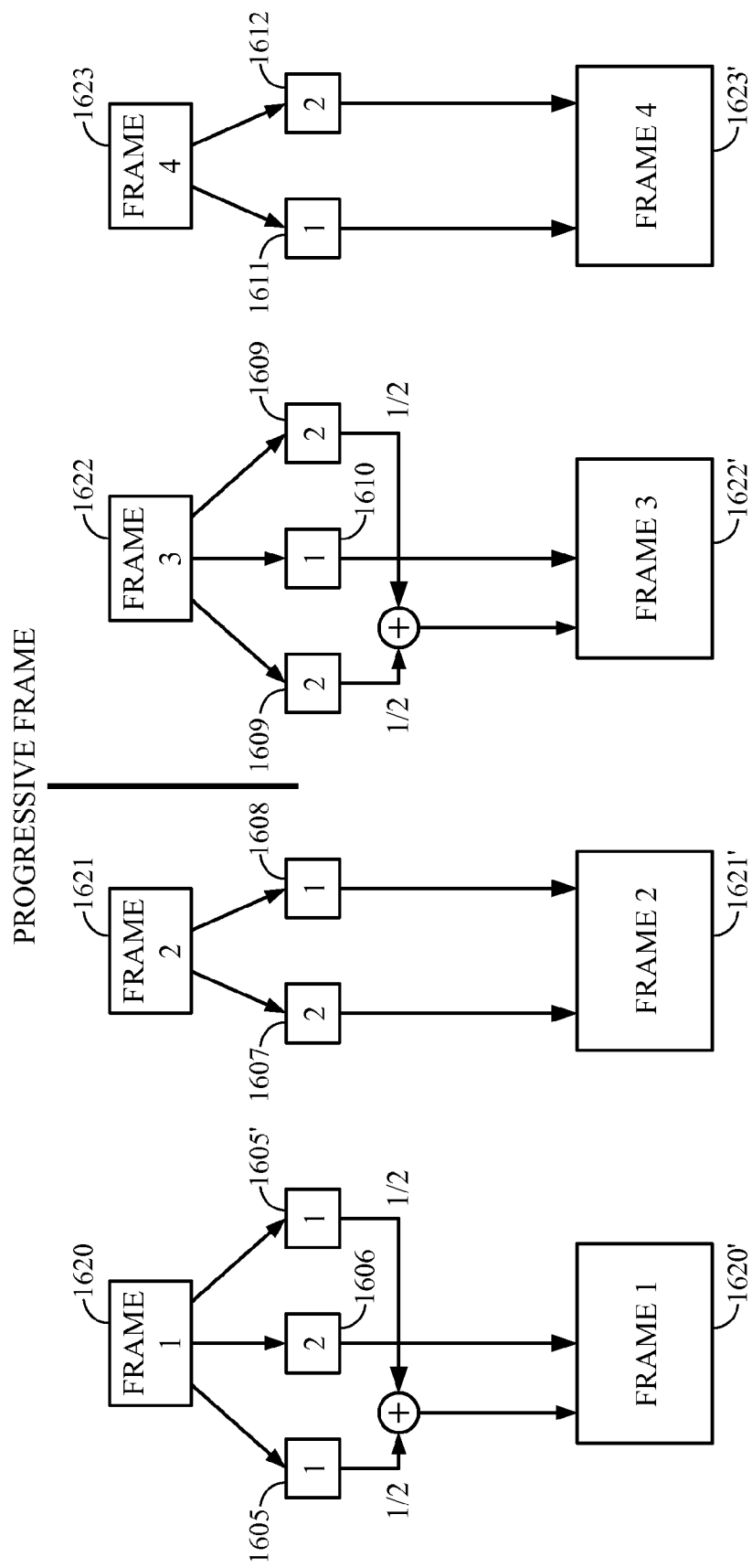
FIG. 16 presents the operation of inverse telecine after the pull down phase has been estimated.

FIG. 16 shows how the inverse telecine process proceeds once the pull down phase is determined. With this information, fields 1605 and 1605' are identified as representing the same field of video. The two fields are averaged together, and combined with field 1606 to reconstruct frame 1620. The reconstructed frame is 1620'. A similar process would reconstruct frame 1622. Fields derived from frames 1621 and 1623 are not duplicated. These frames are reconstructed by reweaving their first and second fields together.

In the aspect described above, every time a new frame is received four new values of metrics are found and a six fold set of hypotheses is tested using newly computed decision variables. Other processing structures could be adapted to compute the decision variables. A Viterbi decoder adds the metrics of the branches that make up the paths together to form the path metric. The decision variables defined here are formed by a similar rule: each is the "leaky" sum of new information variables. (In a leaky summation the previous value of a decision variable is multiplied by a number less than unity before new information data is added to it.) A Viterbi decoder structure could be modified to support the operation of this procedure.

While the present aspect is described in terms of processing conventional video in which a new frame appears every 1/30 second, it is noted that this process may be applied to frames which are recorded and processed backwards in time. The decision space remains the same, but there are minor changes that reflect the time reversal of the sequence of input frames. For example, a string of coherent telecine decisions from the time-reversed mode (shown here)

$P_4 P_3 P_2 P_1 P_0$ would also be reversed in time.

Using this variation on the first aspect would allow the decision process two tries—one going forward in time, the other backward—at making a successful decision. While the two tries are not independent, they are different in that each try would process the metrics in a different order.

This idea could be applied in conjunction with a buffer maintained to store future video frames that may require additional processing. If a video segment is found to give unacceptably inconsistent results in the forward direction of processing, the procedure would draw future frames from the buffer and attempt to get over the difficult stretch of video by processing frames in the reverse direction.

The processing of video described in this patent can also be applied to, video in the PAL format.

Deinterlacer

"Deinterlacer" as used herein is a broad term that can be used to describe a deinterlacing system, device, or process (including for example, software, firmware, or hardware configured to perform a process) that processes, in whole or in significant part, interlaced multimedia data to form progressive multimedia data.

Broadcast video that is conventionally generated—in video cameras, broadcast, studios etc.—conforms in the United States to the NTSC standard. A common way to compress video is to interlace it. In interlaced data each frame is made up of one of two fields. One field consists of the odd lines of the frame, the other, the even lines. While the frames are generated at approximately 30 frames/sec, the fields are records of the television camera's image that are 1/60 sec apart. Each frame of an interlaced video signal shows every other horizontal line of the image. As the frames are projected on the screen, the video signal alternates between showing even and odd lines. When this is done fast enough, e.g., around 60 frames per second, the video image looks smooth to the human eye.

Interlacing has been used for decades in analog television broadcasts that are based on the NTSC (U.S.) and PAL (Europe) formats. Because only half tire image is sent with each frame, interlaced video uses roughly half the bandwidth than it would sending the entire picture. The eventual display format of the video internal to the terminals 16 is not necessarily NTSC compatible and cannot readily display interlaced data. Instead, modern pixel-based displays (e.g., LCD, DLP, LCOS, plasma, etc.) are progressive scan and display progressively scanned video sources (whereas many older video devices use the older interlaced scan technology). Examples of some commonly used deinterlacing algorithms are described in "Scan rate up-conversion using adaptive weighted median filtering," P. Haavisto, J. Juhola, and Y. Neuvo, *Signal Processing of HDTV II*, pp. 703-710, 1990, and "Deinterlacing of HDTV Images for Multimedia Applications," R. Simonetti, S. Carrato, G. Ramponi, and A. Polo Filisan, in *Signal Processing of HDTV IV*, pp. 765-772, 1993.

Described below are examples of deinterlacing aspects for systems and methods that that can be used, solely or in combination, to improve the performance of deinterlacing and which can be used in the deinterlacer 405 (FIG. 4). Such aspects can include deinterlacing a selected frame using spatio-temporal filtering to determine a first provisional deinterlaced frame, using bi-directional motion estimation and motion compensation to determine a second provisional deinterlaced frame from the selected frame, and then combining the first and second provisional frames to form a final progressive frame. The spatio-temporal filtering can use a weighted median filter ("Wmed"), filter that can include a horizontal edge detector that prevents blurring horizontal or near horizontal edges. Spatio-temporal filtering of previous and subsequent neighboring fields to a "current" field produces an intensity motion-level map that categorizes portions of a selected frame into different motion levels, for example, static, slow-motion, and fast motion.

In some aspects, the intensity map is produced by Wmed filtering using a filtering aperture that includes pixels from five neighboring fields (two previous fields, the current field, and two next fields). The Wmed filtering can determine forward, backward, and bidirectional static area detection which can effectively handle scene changes and objects appearing and disappearing. In various aspects, a Wmed filter can be utilized across one or more fields of the same parity in an inter-field filtering mode, and switched to an intra-field filtering mode by tweaking threshold criteria. In some aspects, motion estimation and compensation uses luma (intensity or brightness of the pixels) and chroma data (color information of the pixels) to improve deinterlacing regions of the selected frame where the brightness level is almost uniform but the color differs. A denoising filter can be used to increase the accuracy of motion estimation. The denoising filter can be applied to Wmed deinterlaced provisional frames to remove alias artifacts generated by Wmed filtering. The deinterlacing methods and systems described below produce good deinterlacing results and have a relatively low computational complexity that allow fast running deinterlacing implementations, making such implementations suitable for a wide variety of deinterlacing applications, including systems that are used to provide data to cell phones, computers and other types of electronic or communication devices utilizing a display.

The aspects of a deinterlacer and deinterlacing methods are described herein with reference to various components, modules and/or steps that are used to deinterlace multimedia data.

Figure 17:
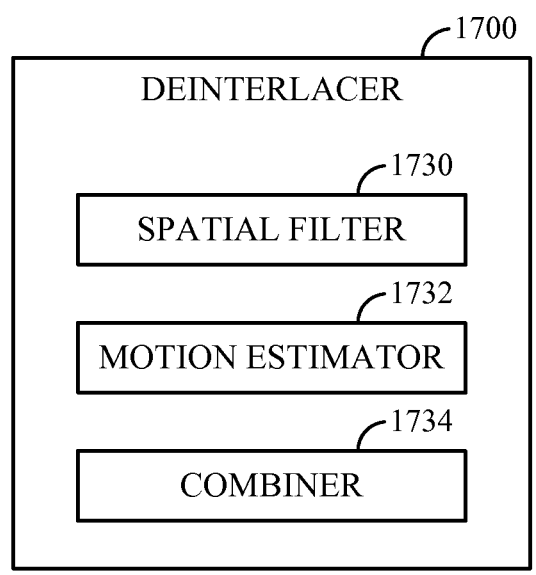
FIG. 17 is a block diagram of a deinterlacer device.

FIG. 17 is a block diagram illustrating one aspect of a deinterlacer 1700 that can be used as the deinterlacer 405 in FIG. 4. The deinterlacer 1700 includes a spatial filter 1730 that spatially and temporally ("spatio-temporal") filters at least a portion of the interlaced data and generates spatio-temporal information. For example, Wmed can be used in the spatial filter 1730. In some aspects the deinterlacer 1700 also includes a denoising filter (not shown), for example, a Weiner filter or a wavelet shrinkage filter. The deinterlacer 1700 also includes a motion estimator 1732 which provides motion estimates and compensation of a selected frame of interlaced data and generates motion information. A combiner 1734 receives and combines the spatio-temporal information and the motion information to form a progressive frame.

Figure 18:
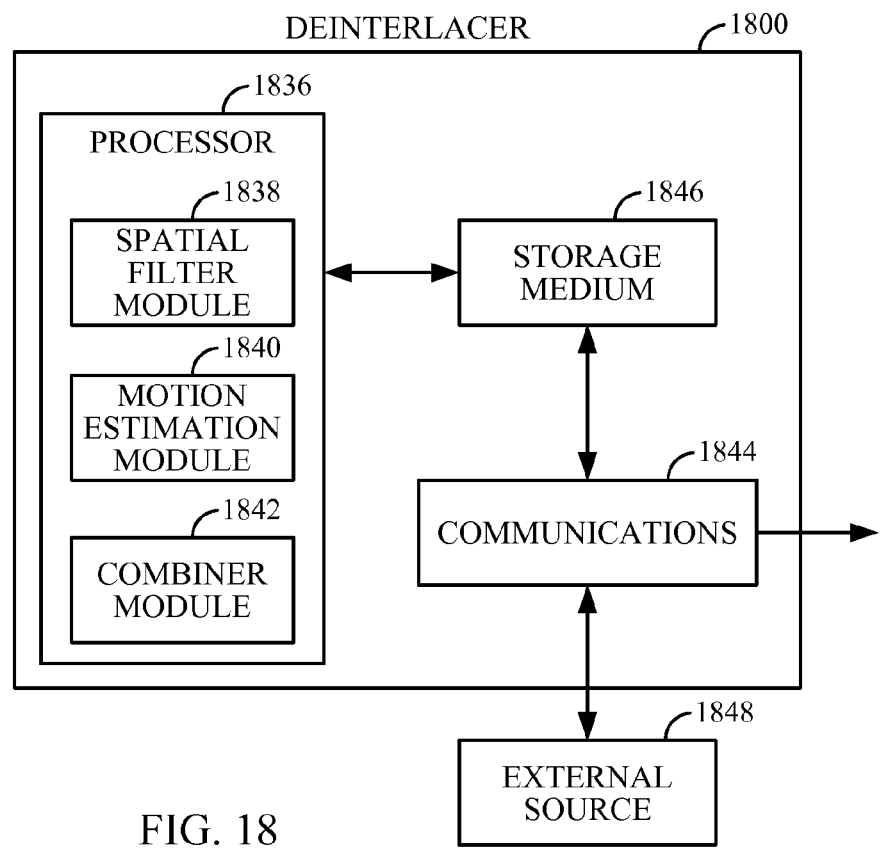
FIG. 18 is a block diagram of another deinterlacer device.

FIG. 18 is a block diagram of another deinterlacer 1800. A processor 1836 in the deinterlacer 1800 includes a spatial filter module 1838, a motion estimation module 1840, and a combiner module 1842. Interlaced multimedia data from an external source 48 can be provided to a communications module 44 in the deinterlacer 1800. The deinterlacer, and components or steps thereof, can be implemented by hardware, software, firmware, middleware, microcode, or any combination thereof. For example, a deinterlacer may be a standalone component, incorporated as hardware, firmware, middleware in a component of another device, or be implemented in microcode or software that is executed on the processor, or a combination thereof. When implemented in software, firmware, middleware or microcode, the program code or code segments that perform the deinterlacer tasks may be stored in a machine readable medium such as a storage medium. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The received interlaced data can be stored in the deinterlacer 1800 in a storage medium 1846 which can include, for example, a chip configured storage medium (e.g., ROM, RAM) or a disc-type storage medium (e.g., magnetic or optical) connected to the processor 1836. In some aspects, the processor 1836 can contain part or all of the storage medium. The processor 1836 is configured to process the interlaced multimedia data to form progressive frames which are then provided to another device or process.

Traditional analog video devices like televisions render video in an interlaced manner, i.e., such devices transmit even-numbered scan lines (even field), and odd-numbered scan lines (odd field). From the signal sampling point of view, this is equivalent to a spatio-temporal subsampling in a pattern described by:

$$F(x, y, n) = \begin{cases} \Theta(x, y, n), & \text{if } y \bmod 2 = 0 \text{ for even fields,} \\ \Theta(x, y, n), & \text{if } y \bmod 2 = 1 \text{ for odd fields,} \\ \text{Erasure,} & \text{otherwise,} \end{cases} \quad (23)$$

where $\Theta$ stands for the original frame picture, F stands for the interlaced field, and (x, y, n) represents the horizontal, vertical, and temporal position of a pixel respectively.

Without loss of generality, it can be assumed n=0 is an even field throughout this disclosure so that Equation 23 above is simplified as $$F(x, y, n) = \begin{cases} \Theta(x, y, n), & \text{if } y \bmod 2 = n \bmod 2, \\ \text{Erasure,} & \text{otherwise,} \end{cases} \quad (24)$$

Figure 19:
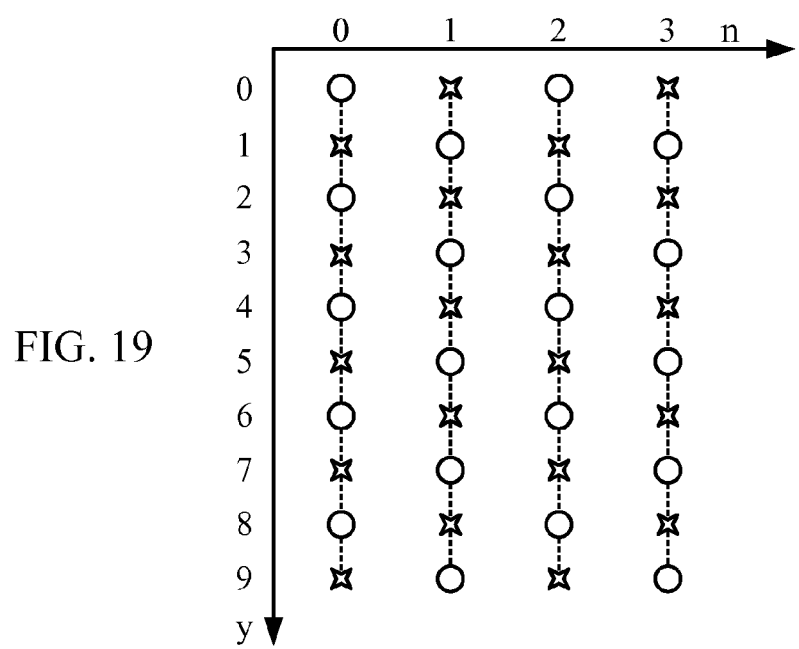
FIG. 19 is drawing of a subsampling pattern of an interlaced picture.

Since decimation is not conducted in the horizontal dimension, the sub-sampling pattern can be depicted in the next n~y coordinate. In FIG. 19, both circles and stars represent positions where the original foil-frame picture has a sample pixel. The interfacing process decimates the star pixels, while leaving the circle pixels intact. It should be noted that we index vertical positions starting from zero, therefore the even field is the top field, and the odd field is the bottom field.

The goal of a deinterlacer is to transform interlaced video (a sequence of fields) into non-interlaced progressive frames (a sequence of frames). In other words, interpolate even and odd fields to "recover" or generate full-frame pictures. This can be represented by Equation 25:

$$F_a(x, y, n) = \begin{cases} F(x, y, n), & y \bmod 2 = n \bmod 2, \\ F_i(x, y, n), & \text{otherwise,} \end{cases} \quad (25)$$

where $F_i$ represent deinterlacing results for missing pixels.

Figure 20:
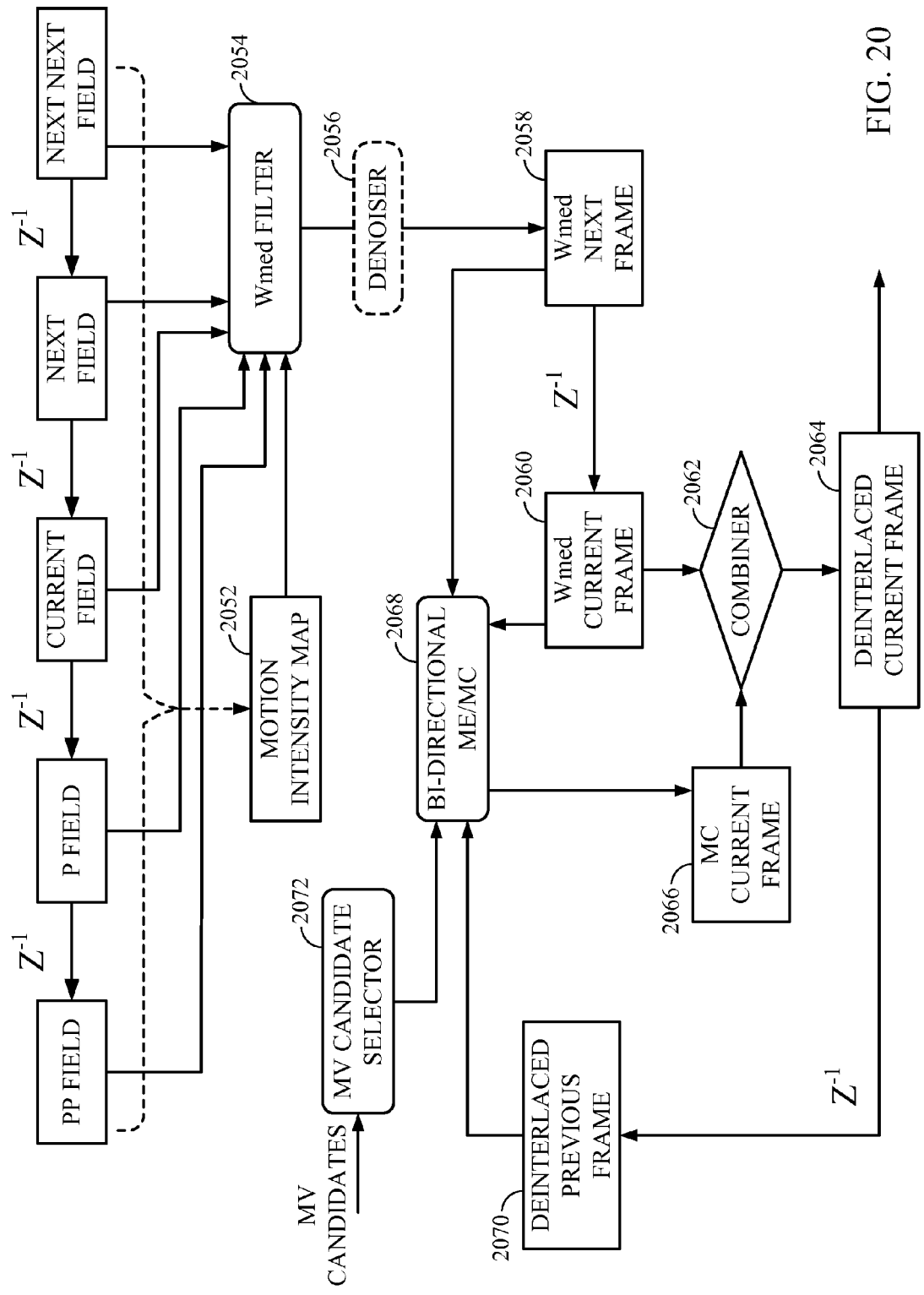
FIG. 20 is a block diagram of a deinterlacer device that uses Wmed filtering motion estimation to generate a deinterlaced frame.

FIG. 20 is a block diagram illustrating certain aspects of an aspect of a deinterlacer that uses Wmed filtering and motion estimation to generate a progressive frame from interlaced multimedia data. The upper part of FIG. 20 shows a motion intensity map 2052 that can be generated using information from a current field, two previous fields (PP Field and P Field), and two subsequent fields (Next Field and Next Next field). The motion intensity map 2052 categorizes, or partitions, the current frame into two or more different motion levels, and can be generated by spatio-temporal filtering, described in further detail hereinbelow. In some aspects, the motion intensity map 2052 is generated to identify static areas, slow-motion areas, and fast-motion areas, as described in reference to Equations 4-8 below. A spatio-temporal filter, e.g., Wmed filter 2054, filters the interlaced multimedia data using criteria based on the motion intensity map, and produces a spatio-temporal provisional deinterlaced frame. In some aspects, the Wmed filtering process involves a horizontal a neighborhood of [−1, 1], a vertical neighborhood of [−3, 3], and a temporal neighborhood of five adjacent fields, which are represented by the five fields (PP Field, P Field, Current Field, Next Field, Next Next Field) illustrated in FIG. 20, with $Z^{-1}$ representing a delay of one field. Relative to the Current Field, the Next Field and the P Field are non-parity fields and the PP Field and the Next Next Field are parity fields. The "neighborhood" used for spatio-temporal filtering refers to the spatial and temporal location of fields and pixels actually used during the filtering operation, and can be illustrated as an "aperture" as shown, for example, in FIGS. 21 and 22.

The deinterlacer can also include a denoiser (denoising filter) 2056. The denoiser 2056 is configured to filter the spatio-temporal provisional deinterlaced frame generated by the Wmed filter 2056. Denoising the spatio-temporal provisional deinterlaced frame makes the subsequent motion search process more accurate especially if the source interlaced multimedia data sequence is contaminated by white noise. It can also at least partly remove alias between even and odd rows in a Wmed picture. The denoiser 2056 can be implemented as a variety of filters including a wavelet shrinkage and wavelet Wiener filter based denoiser which are also described further hereinbelow.

The bottom part of FIG. 20 illustrates an aspect for determining motion information (e.g., motion vector candidates, motion estimation, motion compensation) of interlaced multimedia data. In particular, FIG. 20 illustrates a motion estimation and motion compensation scheme that is used to generate a motion compensated provisional progressive frame of the selected frame, and then combined with the Wmed provisional frame to form a resulting "final" progressive frame, shown as deinterlaced current frame 2064. In some aspects, motion vector ("MV") candidates (or estimates) of the interlaced multimedia data are provided to the deinterlacer from external motion estimators and used to provide a starting point for bi-directional motion estimator and compensator ("ME/MC") 2068. In some aspects, a MV candidate selector 2072 uses previously determined MV's for neighboring blocks for MV candidates of the blocks being processed, such as the MVs of previous processed blocks, for example blocks in a deinterlaced previous frame 2070. The motion compensation can be done bi-directional, based on the previous deinterlaced frame 70 and a next (e.g., future) Wmed frame 2058. A current Wmed frame 2060 and a motion compensated ("MC") current frame 2066 are merged, or combined, by a combiner 2062. A resulting deinterlaced current frame 2064, now a progressive frame, is provided back to the ME/MC 2068 to be used as a deinterlaced previous frame 2070 and also communicated external to the deinterlacer for further processing, e.g., compression and transmission to a display terminal. The various aspects shown in FIG. 20 are described in more detail below.

Figure 25:
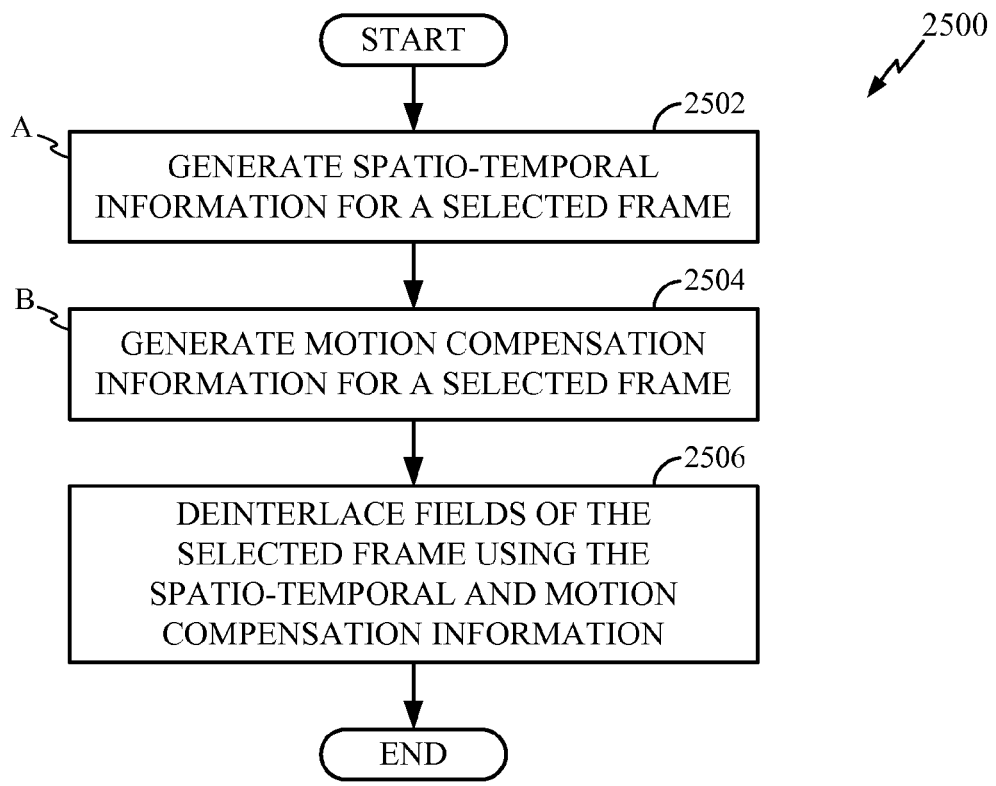
FIG. 25 is a flow diagram illustrating a method of deinterlacing multimedia data.
Figure 26:
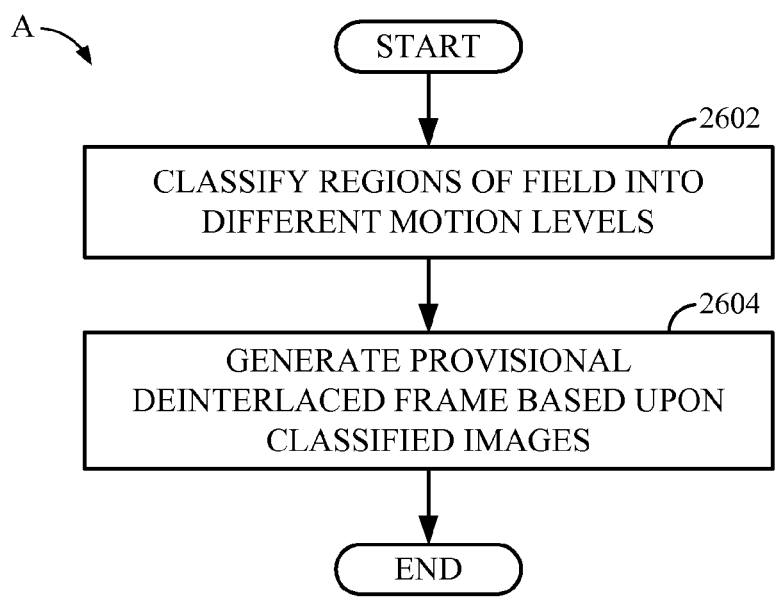
FIG. 26 is a flow diagram illustrating a method of generating a deinterlaced frame using spatio-temporal information.
Figure 27:
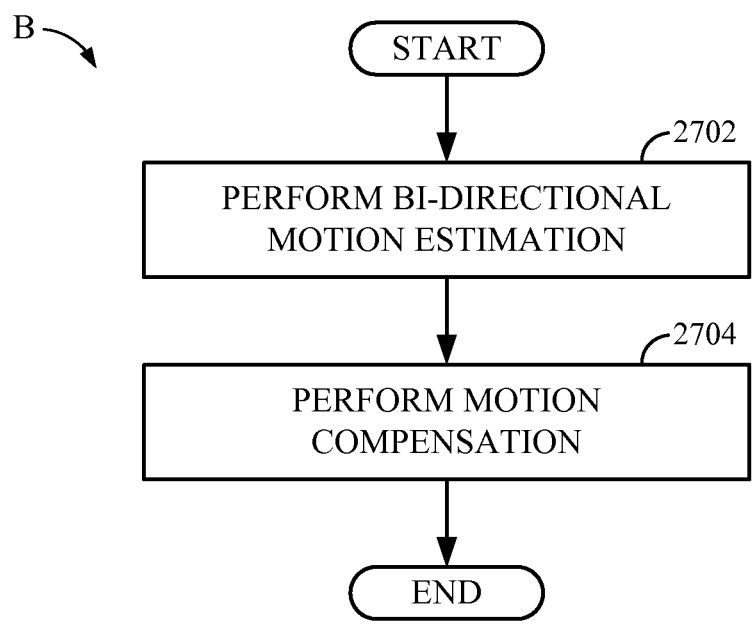
FIG. 27 is a flow diagram illustrating a method of performing motion compensation for deinterlacing.

FIG. 25 illustrates a process 2500 for processing multimedia data to produce a sequence of progressive frames from a sequence of interlaced frames. In one aspect, a progressive frame is produced by the deinterlacer 405 illustrated in FIG. 4. At block 2502, process 2500 (process "A") generates spatio-temporal information for a selected frame. Spatio-temporal information can include information used to categorize the motion levels of the multimedia data and generate a motion intensity map, and includes the Wmed provisional deinterlaced frame and information used to generate the frame (e.g., information used in Equations 26-33). This process can be performed by die Wmed filter 2054, as illustrated in the upper portion of FIG. 20, and its associated processing, which is described in further detail below. In process A, illustrated in FIG. 26, regions are classified into fields of different motion levels at block 2602, as further described below.

Next, at block 2504 (process "B"), process 2500 generates motion compensation information for a selected frame. In one aspect, the bi-directional motion estimator/motion compensator 2068, illustrated in the lower portion of FIG. 20, can perform this process. The process 2500 then proceeds to block 2506 where it deinterlaces fields of the selected frame based on the spatio-temporal information and the motion compensation information to form a progressive frame associated with the selected frame. This can be performed by the combiner 2062 illustrated in the lower portion of FIG. 20.

Motion Intensity Map

For each frame, a motion intensity 2052 map can be determined by processing pixels in a current field to determine areas of different "motion." An illustrative aspect of determining a three category motion intensity map is described below with reference to FIGS. 21-24. The motion intensity map designates areas of each frame as static areas, slow-motion areas, and fast motion areas based on comparing pixels in same-parity fields and different parity fields.

Static Areas

Determining static areas of the motion map can comprise processing pixels in a neighborhood of adjacent fields to determine if luminance differences of certain pixel(s) meet certain criteria. In some aspects, determining static areas of the motion map comprises processing pixels in a neighborhood of five adjacent fields (a Current Field (C), two fields temporally before the current field, and two frames temporally after the Current Field) to determine if luminance differences of certain pixel(s) meet certain thresholds. These five fields are illustrated in FIG. 20 with $Z^{-1}$ representing a delay of one field. In other words, the five adjacent would typically be displayed in such a sequence with a $Z^{-1}$ time delay.

Figure 21:
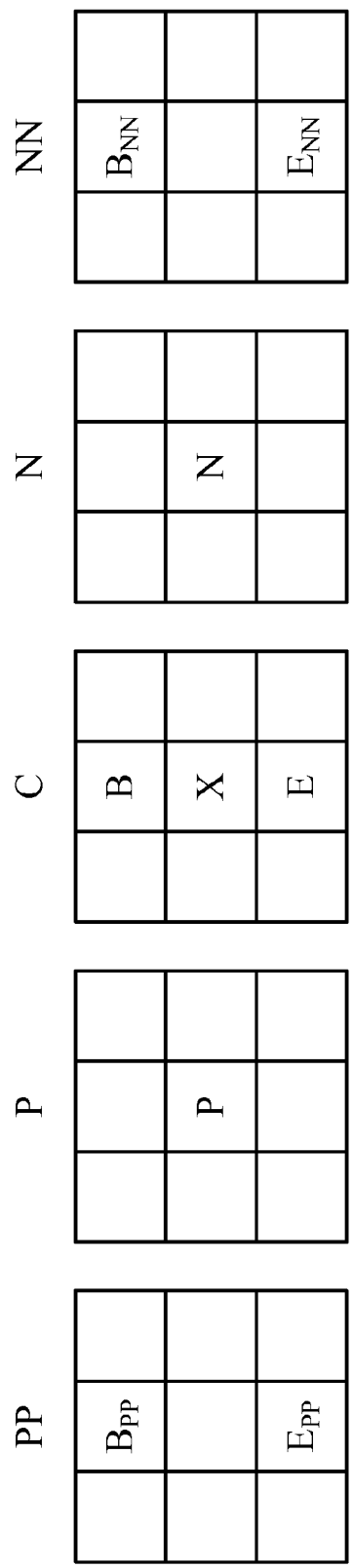
FIG. 21 illustrates one aspect of an aperture for determining, static areas of multimedia data.

FIG. 21 illustrates an aperture identifying certain pixels of each of the five fields that can be used for the spatio-temporal filtering, according to some aspects. The aperture includes, from left to right, 3×3 pixel groups of a Previous Previous Field (PP), a Previous Field (P), the Current Field (C), a Next Field (N), and a Next Next Field (NN). In some aspects, an area of the Current Field is considered static in the motion map if it meets the criteria described in the Equations 26-28, the pixel locations and corresponding fields being illustrated in FIG. 21:

$$|L_P - L_N| < T_1 \quad (26)$$

and $$\left(\left|\frac{L_{BPP} - L_B}{2}\right| + \left|\frac{L_{EPP} - L_E}{2}\right| < T_1 \text{ (forward static)} \quad (27)$$

or $$\left|\frac{L_{BNN} - L_B}{2}\right| + \left|\frac{L_{ENN} - L_E}{2}\right| < T_1 \text{ (backward static)}\right), \quad (28)$$

where $T_1$ is a threshold, $L_P$ is the Luminance of a pixel P located in the P Field, $L_N$ is the luminance of a pixel N located in the N Field, $L_B$ is the Luminance of a pixel B located in the Current Field, $L_E$ is the Luminance of a pixel E located in the Current Field, $L_{BPP}$ is the Luminance of a pixel $B_{PP}$ located in the PP Field, $L_{EPP}$ is the Luminance of a pixel $E_{PP}$ located in the PP Field, $L_{BNN}$ is the luminance of a pixel $B_{NN}$ located in the NN Field, and $L_{ENN}$ is the Luminance of a pixel $E_{NN}$ located in the NN Field.

Threshold $T_1$ can be predetermined and set at a particular value, determined by a process other than deinterlacing and provided (for example, as metadata for the video being deinterlaced) or it can be dynamically determined during deinterlacing.

The static area criteria described above in Equation 26, 27, and 28 use more fields than conventional deinterlacing techniques for at least two reasons. First, comparison between same-parity fields has lower alias and phase-mismatch than comparison between different-parity fields. However, the least time difference (hence correlation) between the field being processed and its most adjacent same-parity field neighbors is two fields, larger than that from its different-parity field neighbors. A combination of more reliable different-parity fields and lower-alias same-parity fields can improve the accuracy of the static area defection.

In addition, the five fields can be distributed symmetrically in the past and in the future relative to a pixel X in the Current Frame C, as shown in FIG. 21. The static area can be subdivided into three categories: forward static (static relative to the previous frame), backward static (static relative to the next frame), or bi-directional (if both the forward and the backward criteria are satisfied). This finer categorization of the static areas can improve performance especially at scene changes and object appearing/disappearing.

Slow-Motion Areas

Figure 22:
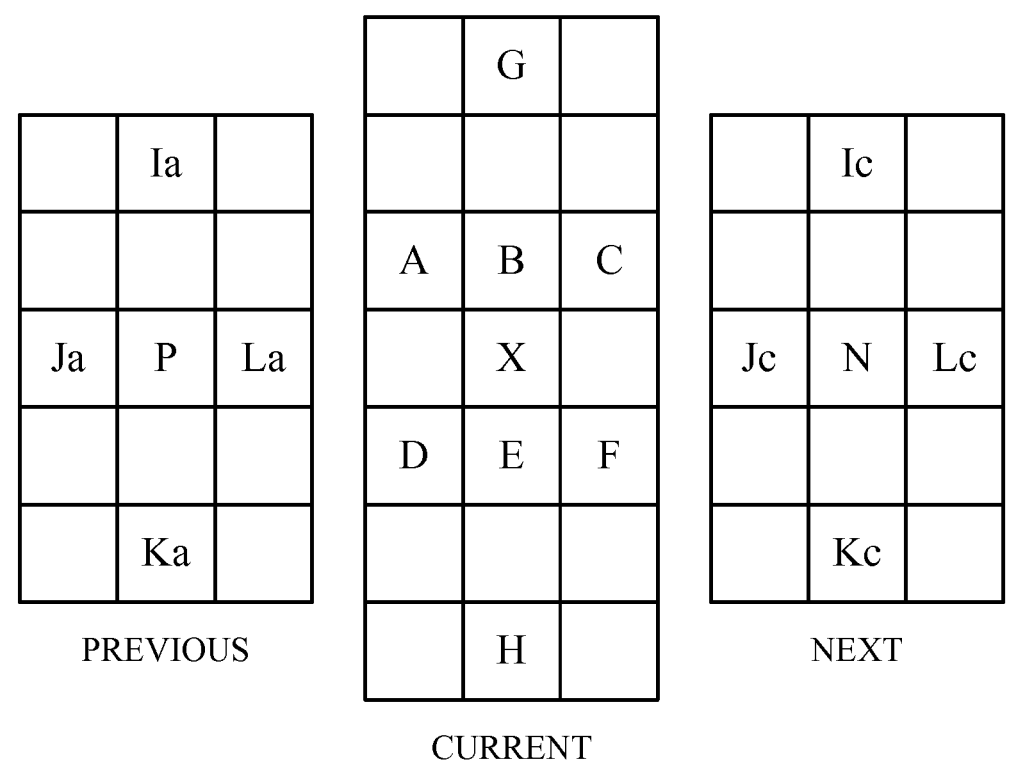

An area of the motion-map can be considered a slow-motions area in the motion-map if the luminance values of certain pixels do not meet the criteria to be designated a static area but meet criteria to be designated a slow-motion area. Equation 29 below defines criteria that can be used to determine a slow-motion area. Referring to FIG. 22, the locations of pixels Ia, Ic, Ja, Jc, Ka, Kc, La, Lc, P and N identified in Equation 29 are shown in an aperture centered around pixel X. The aperture includes a 3×7 pixel neighborhood of the Current Field (C) and 3×5 neighborhoods of the Next Field (N) a Previous Field (P). Pixel X is considered to be part of a slow-motion area if it does not meet the above-listed criteria for a static area and if pixels in the aperture meet the following criteria shown in Equation 29:

$$(|L_{Ia} - L_{Ic}| + |L_{Ja} - L_{Jc}| + |L_{Ja} - L_{Jc}| + |L_{Ka} - L_{Kc}| + |L_{La} - L_{Lc}| + |L_P - L_N|)/5 < T_2 \quad (29)$$

where $T_2$ is a threshold, and $L_{Ia}, L_{Ic}, L_{Ja}, L_{Jc}, L_{Ja}, L_{Jc}, L_{Ka}, L_{Kc}, L_{La}, L_{Lc}, L_P, L_N$ are luminance values for pixels Ia, Ic, Ja, Jc, Ka, Kc, La, Lc, P and N, respectively.

The threshold $T_2$ can also fee predetermined and set at a particular value, determined by a process other than deinterlacing and provided (for example, as metadata for the video being deinterlaced) or it can be dynamically determined during deinterlacing.

It should be noted that a filter can blur edges that are horizontal (e.g., more than 45° from vertically aligned) because of the angle of its edge detection capability. For example, the edge detection capability of the aperture (filter) illustrated in FIG. 22 is affected by the angle formed by pixel "A" and "F", or "C" and "D". Any edges more horizontal than such an angle that will not be interpolated optimally and hence staircase artifacts may appear at those edges. In some aspects, the slow-motion category can be divided into two sub-categories. "Horizontal Edge" and "otherwise" to account for this edge detection effect. The slow-motion pixel can be categorized as a Horizontal Edge if the criteria in Equation 30, shown below, is satisfied, and to a so-called "Otherwise" category if the criteria in Equation 30 is not satisfied, $$|(LA + LB + LC) - (LD + LE + LF)| < T_3 \quad (30)$$

where $T_3$ is a threshold, and LA, LB, LC, LD, LE, and LF are the luminance values of pixels A, B, C, D, E, and F.

Different interpolation methods can used for each of the Horizontal Edge and the Otherwise category.

Fast-Motion Areas

If the criteria for a static area and the criteria for the slow-motion area are not met, the pixel can be deemed to be in a fast-motion area.

Having categorized the pixels in a selected frame, process A (FIG. 26) then proceeds to block 2604 and generates a provisional deinterlaced frame based upon the motion intensity map. In this aspect, Wmed filter 2054 (FIG. 20) filters the selected field and the necessary adjacent fields(s) to provide a candidate full-frame image $F_0$ which can be defined as follows:

$$F_n(x, n) = \begin{cases} F(\bar{x}, n) & (y \bmod 2 = n \bmod 2) \\ \frac{1}{2}(F(\bar{x}, n-1) + F(\bar{x}, n+1)), & \text{(static backward and forward)} \\ F(\bar{x}, n-1) & \text{(static forward but not forward)} \\ F(\bar{x}, n+1) & \text{(static backward but not backward)} \\ med(A, B, C, D, E, F) & \text{(slow motion w/o horizontal edge)} \\ med\left(\alpha_0 \frac{A+F}{2}, \alpha_1 \frac{B+E}{2}, \alpha_2 \frac{C+D}{2}, \alpha_3 \frac{G+H}{2}\right). & \text{(slow motion w/ horizontal edge)} \\ \frac{B+E}{2}, & \text{(fast motion)} \end{cases}$$
(31)

where $\alpha_i (i=0, 1, 2, 3)$ are integer weights calculated as below:

$$\alpha_1 = \begin{cases} 2 & \text{if } \beta_1 = \min\{\beta_0, \beta_1, \beta_2, \beta_3\} \\ 1, & \text{otherwise} \end{cases}$$
(32)

$$\beta_0 = \frac{A+F}{|A-F|}, \beta_1 = \frac{B+E}{|B-E|}, \beta_2 = \frac{C+D}{|C-D|}, \beta_3 = \frac{G+H}{|G-H|}$$
(33)

The Wmed filtered provisional deinterlaced frame is provided for further processing in conjunction with motion estimation and motion compensation processing, as illustrated in the lower portion of FIG. 20.

As described above and shown in Equation 31, the static interpolation comprises inter-field interpolation and the slow-motion and fast-motion interpolation comprises intra-field interpolation. In certain aspects where temporal (e.g., inter-field) interpolation of same parity fields is not desired, temporal interpolation can be "disabled" by setting the threshold $T_1$ (Equations 4-6) to zero ($T_1=0$). Processing of the current field with temporal interpolation disabled results in categorizing no areas of the motion-level map as static, and the Wmed filter 2054 (FIG. 20) uses the three fields illustrated in the aperture in FIG. 22 which operate on a current field and the two adjacent non-parity fields.

Denoising

In certain aspects, a denoiser can be used to remove noise from the candidate Wmed frame before it is further processed using motion compensation information. A denoiser can remove noise that is present in the Wmed frame and retain the signal present regardless of the signal's frequency content. Various types of denoising filters can be used, including wavelet filters. Wavelets are a class of functions used to localize a given signal in both space and scaling domains. The fundamental idea behind wavelets is to analyze the signal at different scales or resolutions such that small changes in the wavelet representation produce a correspondingly small change in the original signal.

In some aspects, a denoising filter is based on an aspect of a (4, 2) bi-orthogonal cubic B-spline wavelet filter. One such filter can be defined by the following forward and inverse transforms:

$$h(z) = \frac{3}{4} + \frac{1}{2}(z + z^{-1}) + \frac{1}{8}(z + z^{-2}) \text{ (forward transform)}$$
(34)

and

-continued $$g(z) = \frac{5}{4} z^{-1} - \frac{5}{32}(1 + z^{-2}) - \frac{3}{8}(z + z^{-3}) - \frac{3}{32}(z^2 + z^{-4}) \text{ (inverse transform)}$$
(35)

Application of a denoising filter can increase the accuracy of motion compensation in a noisy environment. Noise in the video sequence is assumed to be additive white Gaussian. The estimated variance of the noise is denoted by $\sigma$. It can be estimated as the median absolute deviation of the highest-frequency subband coefficients divided by 0.6745. Implementations of such filters are described further in "Ideal spatial adaptation by wavelet shrinkage," D. L. Donoho and L. M. Johnstone, *Biometrika*, vol. 8, pp. 425-455, 1994, which is incorporated by reference herein in its entirety.

A wavelet shrinkage or a wavelet Wiener filter can be also be applied as the denoiser. Wavelet shrinkage denoising can involve shrinking in the wavelet transform domain, and typically comprises three steps: a linear forward wavelet transform, a nonlinear shrinkage denoising, and a linear inverse wavelet transform. The Wiener filter is a MSE-optimal linear filter which can be used to improve images degraded by additive noise and blurring. Such filters are generally known in the art and are described, for example, in "Ideal spatial adaptation by wavelet shrinkage," referenced above, and by S. P. Ghael A. M. Sayeed, and R. G. Baraniuk, "Improvement Wavelet denoising via empirical Wiener filtering," *Proceedings of SPIE, vol* 3169, pp. 389-399, San Diego, July 1997.

Motion Compensation

Figure 23:
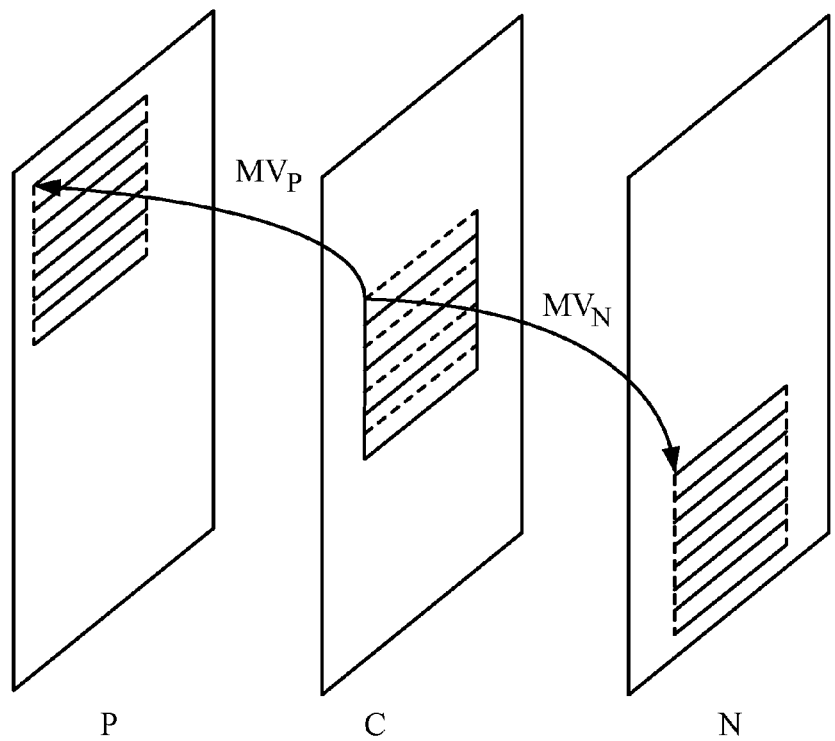
FIG. 23 is a diagram illustrating an aspect of motion estimation.

Referring to NG. 27, at block 2702 process performs bi-directional motion estimation, and then at block 104 uses motion estimates to perform motion compensation, which is illustrated in FIG. 20, and described in an illustrative aspect below. There is a one field "lag" between the Wined filter and the motion-compensation based deinterlacer. Motion compensation information for the "missing" data (the non-original rows of pixel data) of the Current Field "C" is being predicted from information in both the previous frame "P" and the next frame "N" as shown in FIG. 23. In the Current Field (FIG. 23) solid tines represent rows where original pixel data exist and dashed lines represent rows where Wined-interpolated pixel data exist. In certain aspects, motion compensation is performed in a 4-row by 8-column pixel neighborhood. However, this pixel neighborhood is an example for purposes of explanation, and it will be apparent to those skilled in the art that motion compensation may be performed in other aspects based on a pixel neighborhood comprising a different number rows and a different number of columns, the choice of which can be based on many factors including, for example, computational speed, available processing power, or characteristics of the multimedia data being deinterlaced. Because the Current Field only has half of the rows, the four rows to be matched actually correspond to an 8-pixel by 8-pixel area.

Referring to FIG. 20, the bi-directional ME/MC 2068 can Use sum of squared errors (SSE) can be used to measure the similarity between a predicting block and a predicted block for the Wmed current frame 2060 relative to the Wmed next frame 2058 and the deinterlaced current frame 2070. The generation of the motion compensated current frame 2066 then uses pixel information from the most similar matching blocks to fill in the missing data between the original pixel lines. In some aspects, the bi-directional ME/MC 2068 biases or gives more weight to the pixel information from the deinterlaced previous frame 2070 information because it was generated by motion compensation information and Wmed information, while the Wmed next frame 2058 is only deinterlaced by spatio-temporal filtering.

In some aspects, to improve matching performance in regions of fields that have similar-luma regions but different-chroma regions, a metric can be used that includes the contribution of pixel values of one or more luma group of pixels (e.g., one 4-row by 8-column luma block) and one or more chroma group of pixels (e.g., two 2-row by 4-column chroma blocks U and V). Such approaches effectively reduces mismatch at color sensitive regions.

Motion Vectors (MVs) have granularity of ½ pixels in the vertical dimension, and either ½ or ¼ pixels in the horizontal dimension. To obtain fractional-pixel samples, interpolation filters can be used. For example, some filters that can be used to obtain half-pixel samples include a bilinear filter (1, 1), an interpolation filter recommended by H.263/AVC: (1, −5, 20, 20, −5, 1), and a six-tap Hamming windowed sine function filter (3, −21, 147, 147, −21, 3). ¼-pixel samples can be generated from full and half pixel sample by applying a bilinear filter.

In some aspects, motion compensation can use various types of searching processes to match data (e.g., depicting an object) at a certain location of a current frame to corresponding data at a different location in another frame (e.g., a next frame or a previous frame), the difference in location within the respective frames indicating the object's motion. For example, the searching processes use a full motion search which may cover a larger search area or a fast motion search which can use fewer pixels, and/or the selected pixels used in the search pattern can have a particular shape, e.g., a diamond shape. For fast motion searches, the search areas can be centered around motion estimates, or motion candidates, which can be used as a starting point for searching the adjacent frames. In some aspects, MV candidates can be generated from external motion estimators and provided to the deinterlacer. Motion vectors of a macroblock from a corresponding neighborhood in a previously motion compensated adjacent frame can also be used as a motion estimate. In some aspects, MV candidates can be generated from searching a neighborhood of macroblocks (e.g., a 3-macroblock by 3-macroblock) of the corresponding previous and next frames.

Figure 24:
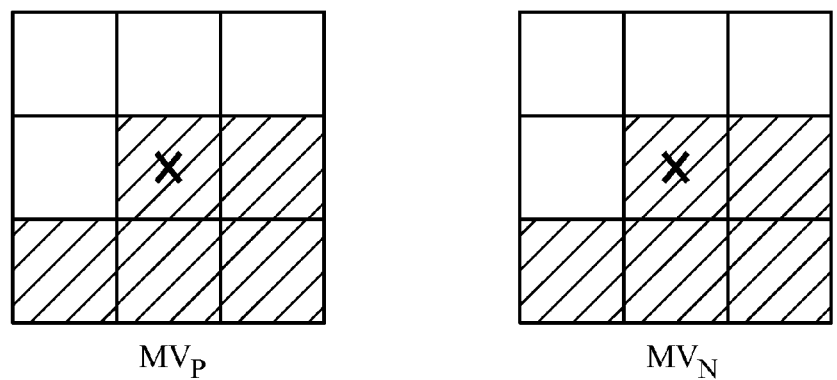
FIG. 24 illustrates two motion vector maps used in determining motion compensation.

FIG. 24 illustrates an example of two MV maps, $MV_P$ and $MV_N$, that could be generated during motion estimation/compensation by searching a neighborhood of the previous frame and the next frame, as show in FIG. 23. In both $MV_P$ and $MV_N$ the block to be processed to determine motion information is the center block denoted by "X." In both $MV_P$ and $MV_N$, there are nine MV candidates that can be used during motion estimation of the current block X being processed. In this example, four of the MV candidates exist in the same field from earlier performed motion searches and are depicted by the lighter-colored blocks in $MV_P$ and $MV_N$ (FIG. 24). Five other MV candidates, depicted by the darker-colored blocks, were copied from the motion information (or maps) of the previously processed frame.

After motion estimation/compensation is completed, two interpolation results may result for the missing rows (denoted by the dashed lines in FIG. 23): one interpolation result generated by the Wmed filter (Wmed Current Frame 2060 FIG. 20) and one interpolation result generated by motion estimation processing of the motion compensator (MC Current Frame 2066). A combiner 2062 typically merges the Wmed Current Frame 2060 and the MC Current Frame 2066 by using at least a portion of the Wmed Current Frame 2060 and the MC Current Frame 2066 to generate a Current Deinterlaced Frame 2064. However, under certain conditions, the combiner 2062 may generate a Current Deinterlaced frame using only one of the Current Frame 2060 or the MC Current Frame 2066. In one example, the combiner 2062 merges the Wmed Current Frame 2060 and the MC Current Frame 2066 to generate a deinterlaced output signal as shown in Equation 36:

$$F_o(x, n) = \begin{cases} F(\vec{x}, n), & (y \bmod 2 = n \bmod 2) \\ k_2 F_{Wmed}(\vec{x}, n) + (1 - k_2 F_{MC}(\vec{x} - \vec{D}, n - 1)), & \text{(otherwise)}. \end{cases} \quad (36)$$

where $F(\vec{x},n)$ is used for the luminance value in field $n_1$ at position $x=(x, y)^t$ with $^t$ for transpose. Using a clip function defined as $$\text{clip}(0,1,a)=0, \text{ if } (a<0); 1, \text{ if } (a>1); a, \text{ otherwise}$$

(37)

$k_1$ can be calculated as:

$$k_1 = \text{clip}(0, C_1 \sqrt{\text{Diff}}) \quad (38)$$

where $C_1$ is a robustness parameter, and Diff is the luma difference between the predicting frame pixel and the available pixel in the predicted frame (taken from the existing field). By appropriately choosing C1, it is possible to tune the relative importance of the mean square error. $k_2$ can be calculated as shown in Equation 39:

$$k_2 = 1 - \text{clip}\left(0, 1, (1-k_1)\frac{|F_{Wmed}(\vec{x}-\vec{y}_u, n) - F_{MC}(\vec{x}-\vec{y}_u-\vec{D}, n-1)| + \delta}{|F_{Wmed}(\vec{x}, n) - F_{MC}(\vec{x}-\vec{D}, n-1)| + \delta}\right) \quad (39)$$

where $\vec{x}=(x,y)$, $\vec{y}_u=(0,1)$, $\vec{D}$ is the motion vector, $\delta$ is a small constant to prevent division by zero. Deinterlacing using clipping functions for filtering is further described in "De-interlacing of video data," G. D. Haan and E. B. Bellers, *IEEE Transactions on Consumer Electronics*, Vol. 43, No. 3, pp. 819-825, 1997, which is incorporated herein in its entirety.

In some aspects, the combiner 2062 can be configured to try and maintain the following equation to achieve a high PSNR and robust results:

$$|F_O(\vec{x},n) - F_{Wmed}(\vec{x},n)| = |F_O(\vec{x}-\vec{y}_u,n) - F_{Wmed}(\vec{x}-\vec{y}_u,n)| \quad (40)$$

It is possible to decouple deinterlacing prediction schemes comprising inter-field interpolation from intra-field interpolation with a Wmed+MC deinterlacing scheme. In other words, the spatio-temporal Wmed filtering can be used mainly for intra-field interpolation purposes, while inter-field interpolation can be performed during motion compensation. This reduces the peak signal-to-noise ratio of the Wmed result, but the visual quality after motion compensation is applied is more pleasing, because bad pixels from inaccurate inter-field prediction mode decisions will be removed from the Wmed filtering process.

Chroma handling can be consistent with the collocated luma handling. In terms of motion map generation, the motion level of a chroma pixel is obtained by observing the motion level of its four collocated luma pixels. The operation can be based on voting (chroma motion level borrows the dominant luma motion level). However, we propose to use a conservative approach as follows. If any one of the four luma pixels has a fast motion level, the chroma motion level shall be fast-motion; other wise, if any one of the four luma pixels has a slow motion level, the chroma motion level shall be slow-motion; otherwise the chroma motion level is static. The conservative approach may not achieve the highest PSNR, but it avoids the risk of using INTER prediction wherever there is ambiguity in chroma motion level.

Multimedia data sequences were deinterlaced using the described Wmed algorithm described alone and the combined Wmed and motion compensated algorithm described herein. The same multimedia data sequences were also deinterlaced using a pixel blending (or averaging) algorithm and a "no-deinterlacing" case where the fields were merely combined without any interpolation or blending. The resulting frames were analyzed to determine the PSNR and is shown in the following table:

| PSNR (dB) sequence | no deinterlacing | blending | Wmed | Wmed + MC |
| --- | --- | --- | --- | --- |
| soccer | 8.955194 | 11.38215 | 19.26221 | 19.50528 |
| city | 11.64183 | 12.93981 | 15.03303 | 15.09859 |
| crew | 13.32435 | 15.66387 | 22.36501 | 22.58777 |

Even though titers is only marginal PSNR improvement by deinterlacing using the MC in addition to Wmed, the visual quality of the deinterlaced image produced by combining the Wmed and MC interpolation results is more visually pleasing to because as mentioned above, combining the Wmed results and the MC results suppresses alias and noise between even and odd fields.

In some resampling aspects, a poly-phase resampler is implemented for picture size resizing. In one example of downsampling, the ratio between the original and the resized picture can be p/g, where p and q are relatively prime integers. The total number of phases is p. The cutoff frequency of the poly-phase filter in some aspects is 0.6 for resizing factors around 0.5. The cutoff frequency does not exactly match the resizing ratio in order to boost the high-frequency response of the resized sequence. This inevitably allows some aliasing. However, it is well-known that human eyes prefer sharp but a little aliased pictures to blurry and alias-free pictures.

Figure 42:
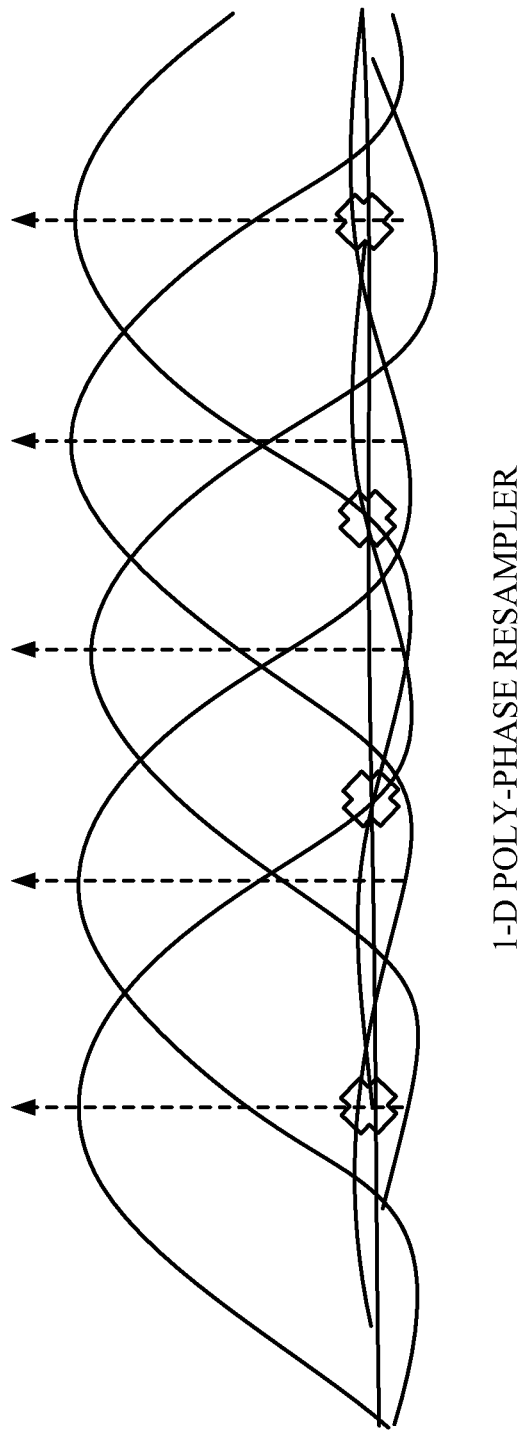
FIG. 42 illustrates an example of 1-D poly phase resampling.

FIG. 42 illustrates an example of poly-phase resampling, showing the phases if the resizing ration is ¾. The cutoff frequency illustrated in FIG. 42 is ¾ also. Original pixels are illustrated in the above FIG. 42 with vertical axes. A sine function is also drawn centered around the axes to represent the filter waveform. Because we choose the cutoff frequency to be exactly the same as the resampling ration, the zeros of the sine function overlap the position of the pixels after resizing, illustrated in FIG. 42 with crosses. To find a pixel value after resizing, the contribution can be summed up from the original pixels as shown in the following equation:

$$y(x) = \sum_{i=-\infty}^{\infty} u(i) \times \text{sinc}(\pi f_c(i-x)) \quad (41)$$

where $f_c$ is the cutoff frequency. The above 1-D poly-phase filter can be applied to both the horizontal dimension and the vertical dimension.

Another aspect of resampling (resizing) is accounting for overscan. In an NTSC television signal, an image has 486 scan lines, and in digital video could have 720 pixels on each scan line. However, not all of the entire image is visible on the television due to mismatches between the size and the screen format. The part of the image that is not visible is called overscan.

Figure 43:
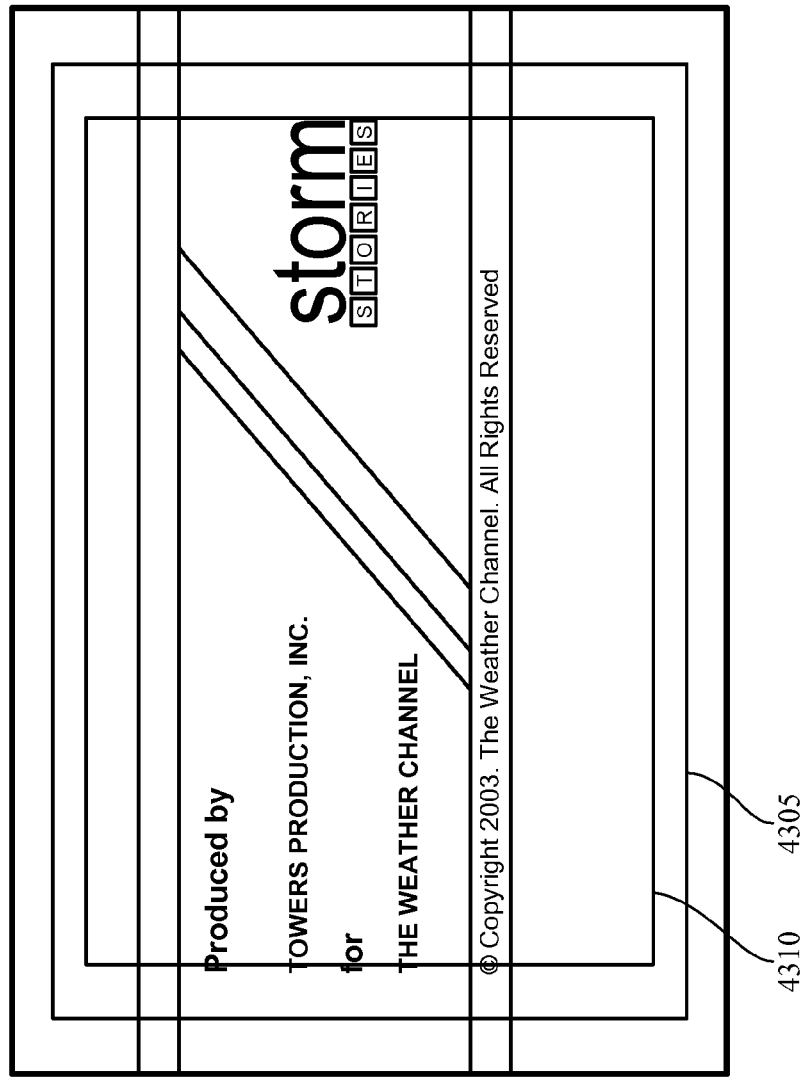
FIG. 43 is a graphic illustrating a safe action area and a safe title area of a frame of data.

To help broadcasters put useful information in the area visible by as many televisions as possible, the Society of Motion Picture & Television Engineers (SMPTE) defined specific sizes of the action frame called the safe action area and the safe title area. See SMPTE recommended practice RP 27.3-1989 on Specifications for Safe Action and Safe Title Areas Test Pattern for Television Systems. The safe action area is defined by the SMPTE as the area in which "all significant action must take place." The safe title area is defined as the area where "all the useful information can be confined to ensure visibility on the majority of home television receivers." For example, as illustrated in FIG. 43, the safe action area 4310 occupies the center 90% of the screen, giving a 5% border all around. The safe title area 4305 occupies the center 80% of the screen, giving a 10% border. FIG.

Figure 44:
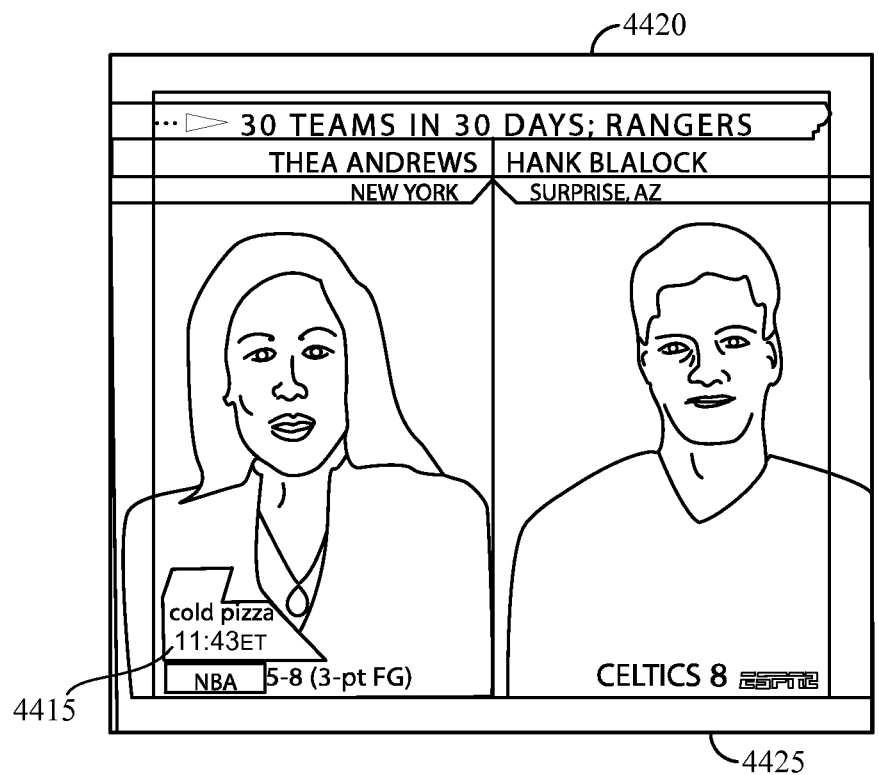
FIG. 44 is a graphic illustrating a safe action area of a frame of data.

Referring now to FIG. 44, because the safe title area is so small, to add more contents in the image, some broadcasts will include text in the safe action area, which is inside the white rectangular window 4415. Usually black borders may be seen in the overscan. For example, in FIG. 44, black borders appear at the upper side 4420 and lower side 4425 of the image. These black borders can be removed in the overscan, because H.264 video uses boundary extension in motion estimation. Extended black borders can increase the residual. Conservatively, we can cut the boundary by 2%, and then do the resizing. The filters for resizing can be generated accordingly. Truncation is performed to remove the overscan before poly-phase downsampling.

Deblocking/Deringing

Figure 39:
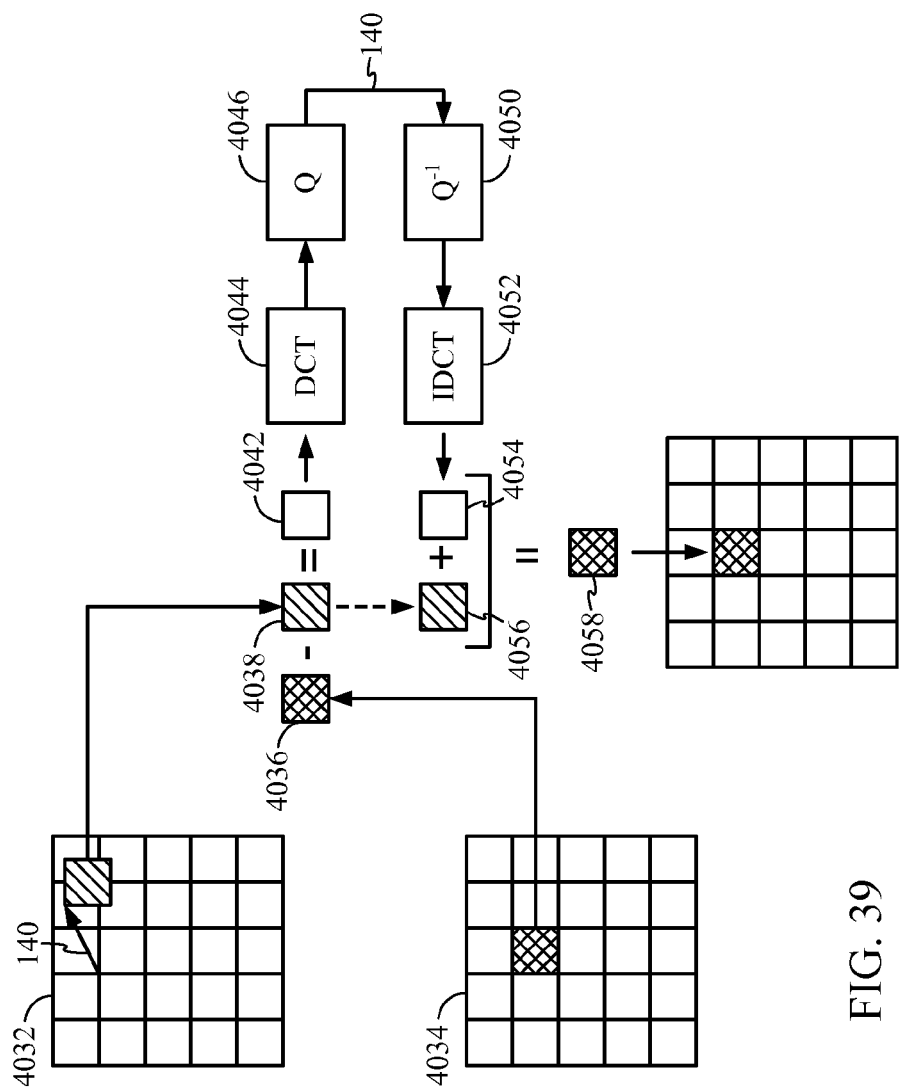
FIG. 39 is a block diagram illustrating encoding data and calculating residuals.

In one example of deblocking processing, a deblocking filter can be applied to all the 4×4 block edges of a frame, except edges at the boundary of the frame and any edges for which the deblocking filter process is disabled. This filtering process shall be performed on a macroblock basis after the completion of the frame construction process with all macroblocks in a frame processed in order of increasing macroblock addresses. For each macroblock, vertical edges are filtered first, from left to right, and then horizontal edges are filtered from top to bottom. The luma deblocking filter process is performed on four 16-sample edges and the deblocking filter process for each chroma component is performed on two 8-sample edges, for the horizontal direction and for the vertical direction, as shown in FIG. 39. Sample values above and to the left of the current macroblock that may have already been modified by the deblocking process operation on previous macroblocks shall be used as input to the deblocking filter process on the current macroblock and may be further modified during the filtering of the current macroblock. Sample values modified during filtering of vertical edges can be used as input for the filtering of the horizontal edges for the same macroblock. A deblocking process can be invoked for the luma and chroma components separately.

In an example of deringing processing, a 2-D filter can be adaptively applied to smooth out areas near edges. Edge pixels undergo little or no filtering in order to avoid blurring.

GOP Partitioner

Illustrative examples of processing is described below including bandwidth map generation, shot detection, and adaptive GOP partitioning, than can be included in the GOP partitioner.

Bandwidth Map Generation

Figure 29:
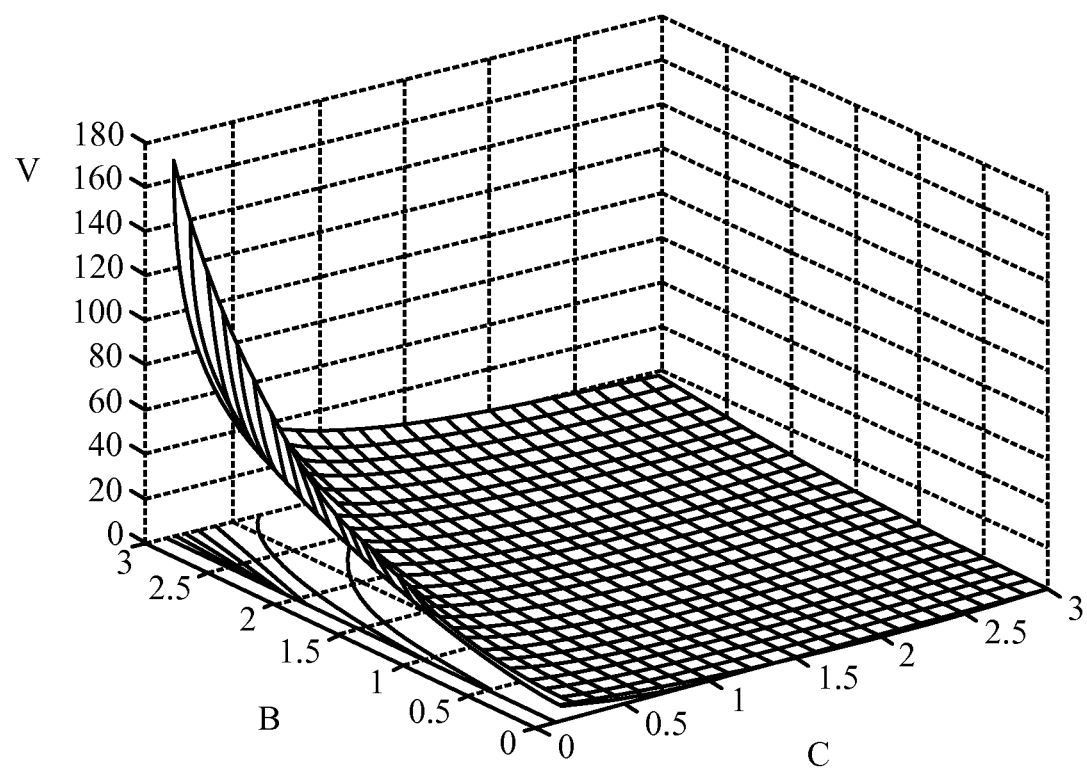
FIG. 29 illustrates the relationship between encoding complexity C and allocated bits B.

Human visual quality V can be a function of both encoding complexity C and allocated bits B (also referred to as bandwidth). FIG. 29 is a graph illustrating this relationship. It should be noted that the encoding complexity metric C considers spatial and temporal frequencies from the human vision point of view. For distortions more sensitive to human eyes, the complexity value is correspondingly higher. It can typically be assume that V is monotonically decreasing in C, and monotonically increasing in B.

To achieve constant visual quality, a bandwidth ($B_i$) is assigned to the $i^{th}$ object (frame or MB) to be encoded that satisfies the criteria expressed in the two equations immediately below:

$$B_i = B(C_i, V) \quad (42)$$

$$B = \sum_i B_i \quad (43)$$

In the two equations immediately above, $C_i$ is the encoding complexity of the $i^{th}$ object. B is the total available bandwidth, and V is the achieved visual quality for an object.

Human visual quality is difficult to formulate as an equation. Therefore, the above equation set is not precisely defined. However, if it is assumed that the 3-D model is continuous in all variables, bandwidth ratio $$\left(\frac{B_i}{B}\right)$$

can be treated as unchanged within the neighborhood of a (C, V) pair. The bandwidth ratio $\beta_i$ is defined in the equation shown below:

$$\beta_i = \frac{B_i}{B} \quad (44)$$

Bit allocation can then be defined as expressed in the following equations:

$$\beta_i = \beta(C_i) \quad (45)$$

$$1 = \sum_i \beta_i$$

for $$(C_i, V) \in \delta(C_0, V_0)$$

where $\delta$ indicates the "neighborhood."

The encoding complexity is affected by human visual sensitivity, both spatial and temporal. Girod's human vision model is an example of a model that can be used to define the spatial complexity. This model considers fee local spatial frequency and ambient lighting. The resulting metric is called $D_{csat}$. At a pre-processing point in the process, whether a picture is to be intra-coded or inter-coded is not known and bandwidth ratios for both are generated. Bits are allocated according to the ratio between $\beta_{INTRA}$ of different video objects. For intra-coded pictures, the bandwidth ratio is expressed in the following equation:

$$\beta_{INTRA} = \beta_{0INTRA} \log_{10}(1 + \alpha_{INTRA} Y^2 D_{csat}) \quad (46)$$

In the equation above, Y is the average luminance component of a macroblock, $\alpha_{INTRA}$ is a weighing factor for the luminance square and; $D_{csat}$ term following it, $\beta_{0INTRA}$ is a normalization factor to guarantee $$1 = \sum_i \beta_i.$$

For example, a value for $\alpha_{INTRA}=4$ achieves good visual quality. Content information (e.g., a content classification) can be used to set $\alpha_{INTRA}$ to a value that corresponds to a desired good visual quality level for the particular content of the video. In one example, if the video content comprises a "talking head" news broadcast, the visual quality level may be set lower because the information image or displayable portion of the video may be deemed of less importance than the audio portion, and less bits can be allocated to encode the data. In another example, if the video content comprises a sporting event, content information may be used to set $\alpha_{INTRA}$ to a value that corresponds to a higher visual quality level because the displayed images may be more important to a viewer, and accordingly more bits can be allocated to encode the data.

To understand this relationship, it should be noted that bandwidth is allocated logarithmically with encoding complexity. The luminance squared term $Y^2$ reflects the fact that coefficients with larger magnitude use more bits to encode. To prevent the logarithm from getting negative values, unity is added to the term in the parenthesis. Logarithms, with other bases can also be used.

The temporal complexity is determined by a measure of a frame difference metric, which measures the difference between two consecutive frames taking into account the amount of motion (e.g., motion vectors) along with a frame difference metric such as the sum of the absolute differences (SAD).

Bit allocation for inter-coded pictures can consider spatial as well as temporal complexity. This is expressed below:

$$\beta_{INTER} = \beta_{0INTER} \log_{10}(1 + \alpha_{INTER} \cdot SSD \cdot D_{csat} \exp(-\gamma \|MV_P + MV_N\|^2)) \quad (47)$$

In the above equation, $MV_P$ and $MV_N$ are the forward and the backward motion vectors for the current MB. It can be noted that $Y^2$ in the intra-coded bandwidth formula is replaced by sum of squared differences (SSD). To understand the role of $\|MV_P + MV_N\|^2$ in the above equation, note the next characteristics of human visual system: areas undergoing smooth, predictable motion (small $\|MV_P + MV_N\|^2$) attract attention and can foe tracked by the eye and typically cannot tolerate any more distortion than stationary regions. However, areas undergoing fast or unpredictable motion (large $\|MV_P + MV_N\|^2$) cannot be tracked and can tolerate significant quantization. Experiments show that $\alpha_{INTER} = 1$, $\gamma = 0.001$ achieves good visual quality.

Shot Detection

An illustrative example of shot detection is described below. Such components and process can be included m the GOP partitioner 412 (FIG. 4).

The motion compensator 23 can be configured to determine bi-directional motion information about frames in the video. The motion compensator 23 can also be configured to determine one or more difference metrics, for example, the sum of absolute differences (SAD) or the sum of absolute differences (SSD), and calculate other information including luminance information for one or more frames (e.g., macroblock. (MB) luminance averages or differences), a luminance histogram difference, and a frame difference metric, examples of which are described in reference to Equations 1-3. The shot classifier can be configured to classify frames in the video into two or more categories of "shots" using information determined by the motion compensator. The encoder is configured to adaptively encode the plurality of frames based on the shot classifications. The motion compensator, shot classifier, and encoder are described below in reference to Equations 1-10.

Figure 28:
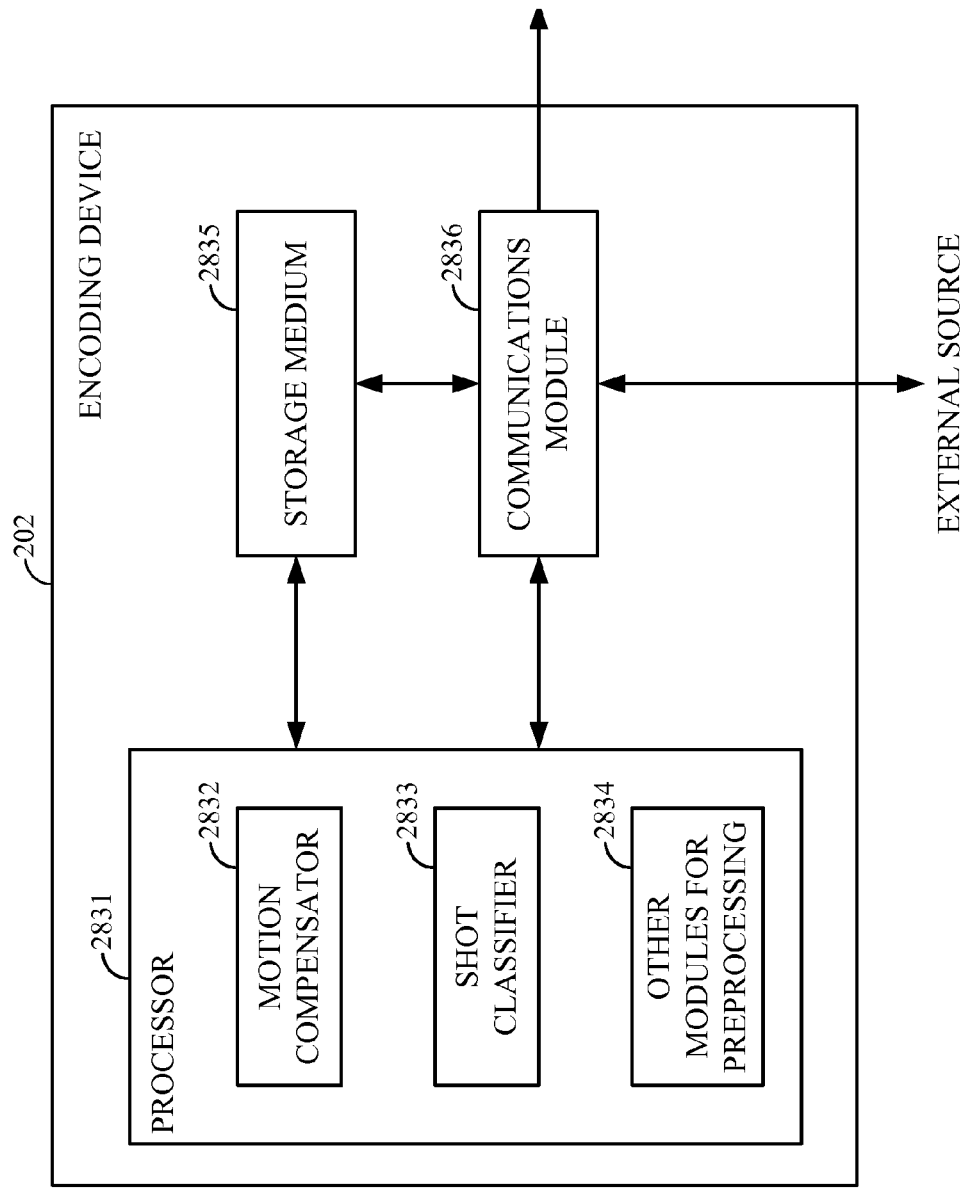
FIG. 28 is a block diagram of a preprocessor comprising a processor configured for shot detection and other preprocessing operations according to some aspects.

FIG. 28 is a block diagram of a preprocessor 202 comprising a processor 2831 configured for shot detection and other preprocessing operations according to some aspects. A digital video source can be provided by a source external to the preprocessor 202 as shown in FIG. 4 and communicated to a communications module 2836 in the preprocessor 202. The preprocessor 202 contains a storage medium 2825 which communicates with the processor 2831, both of which communicate with the communications module 2836. The processor 2831 includes a motion compensator 2032, a shot classifier 2833, and other modules for preprocessing 2034, which can operate to generate motion information, classify shots in frames of the video data, and perform other preprocessing tests as described herein. The motion compensator, shot classier, and other modules can contain processes similar to corresponding modules in FIG. 4, and can process video to determine information described below. In particular, the processor 2831 can have a configuration to obtain metrics indicative of a difference between adjacent frames of a plurality of video frames, the metrics comprising bi-directional motion information and luminance information, determine shot changes in the plurality of video frames based on said metrics, and adaptively encode the plurality of frames based on the shot changes. In some aspects, the metrics can be calculated by a device or process external to the processor 2831, which can also be external to the preprocessor 202, and communicated to the processor 2831, either directly or indirectly via another device or memory. The metrics can also be calculated by the processor 2831, for example, by the motion compensator 2832.

The preprocessor 202 provides video and metadata for further processing, encoding, and transmission to other devices, for example, terminals 6 (FIG. 1). The encoded video can be, in some aspects, scalable multi-layered encoded video which can comprise a base layer and an enhancement layer. Scalable layer encoding is further described in co-pending U.S. patent application Ser. No. 11/373,604 entitled "Scalable Video Coding With Two Layer Encoding And Single Layer Decoding" owned by the assignee hereof, and which is incorporated by reference in its entirety herein.

The various illustrative logical blocks, components, modules, and circuits described in connection with FIG. 28, and other examples and figures disclosed herein may be implemented or performed, in some aspects, with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor such as the one shown in FIG. 28 may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Video encoding usually operates on a structured group of pictures (GOP). A GOP normally starts with an intra-coded frame (I-frame), followed by a series of P (predictive) or B (bi-directional) frames. Typically, an I-frame can store all the data to display the frame, a B-frame relies on data in the preceding and following frames (e.g., only containing data changed from the preceding frame or is different from data in the next frame), and a P-frame contains data that has changed from the preceding frame.

In common usage, I-frames are interspersed with P-frames and B-frames in encoded video. In terms of size (e.g., number of bits used to encode the frame), I-frames are typically much larger than P-frames, which in turn are larger than B-frames. For efficient encoding, transmission and decoding processing, the length of a GOP should be long enough to reduce the efficient loss from big I-frames, and short enough to fight mismatch between encoder and decoder, or channel impairment. In addition, macro blocks (MB) in P frames can be intra coded for the same reason.

Scene change detection can be used for a video encoder to determine a proper GOP length and insert I-frames based on the GOP length, instead of inserting an I-frame at a fixed interval. In a practical streaming video system, the communication channel is usually impaired by bit errors or packet losses. Where to place I frames or I MBs may significantly impact decoded video quality and viewing experience. One encoding scheme is to use intra-coded frames for pictures or portions of pictures that have significant change from collocated previous pictures or picture portions. Normally these regions cannot be predicted effectively and efficiently with motion estimation, and encoding can be done more efficiently if such regions are exempted from inter-frame coding techniques (e.g., encoding using B-frames and P-frames). In the context of channel impairment, those regions are likely to suffer from error propagation, which can be reduced or eliminated (or nearly so) by intra-frame encoding.

Portions of the GOP video can be classified into two or more categories, where each region can have different intra-frame encoding criteria that may depend on the particular implementation. As an example, the video can be classified into three categories: abrupt scene changes, cross-fading and other slow scene changes, and camera flashlights. Abrupt scene changes includes frames that are significantly different from the previous frame, usually caused by a camera operation. Since the content of these frames is different from that of the previous frame, the abrupt scene change frames should be encoded as I frames. Cross-fading and other slow scene changes includes slow switching of scenes, usually caused by computer processing of camera shots. Gradual blending of two different scenes may look more pleasing to human eyes, but poses a challenge to video coding. Motion compensation cannot reduce the bitrate of those frames effectively, and more intra MBs can be updated for these frames.

Camera flashlights, or camera flash events, occur when the content of a frame includes camera flashes. Such flashes are relatively short in duration (e.g., one frame) and extremely bright such that the pixels in a frame portraying the flashes exhibit unusually high luminance relative to a corresponding area on an adjacent frame. Camera flashlights shift the luminance of a picture suddenly and swiftly. Usually the duration of a camera flashlight is shorter than the temporal masking duration of the human vision system (HVS), which is typically defined to be 44 ms. Human eyes are not sensitive to the quality of these short bursts of brightness and therefore they can be encoded coarsely. Because the flashlight frames cannot be handled effectively with motion compensation and they are bad prediction candidate for future frames, coarse encoding of these frames does not reduce the encoding efficiency of future frames. Scenes classified as flashlights should not be used to predict other frames because of the "artificial" high luminance, and other frames cannot effectively be used to predict these frames for the same reason. Once identified, these frames can be taken out because they can require a relatively high amount of processing. One option is to remove the camera flashlight frames and encode a DC coefficient in their place; such a solution is simple, computationally fast and saves many bits.

When any of the above frames are detected, a shot event is declared. Shot detection is not only useful to improve encoding quality, it can also aid in identifying video content searching and indexing. One aspect of a scene detection process is described hereinbelow.

Figure 30:
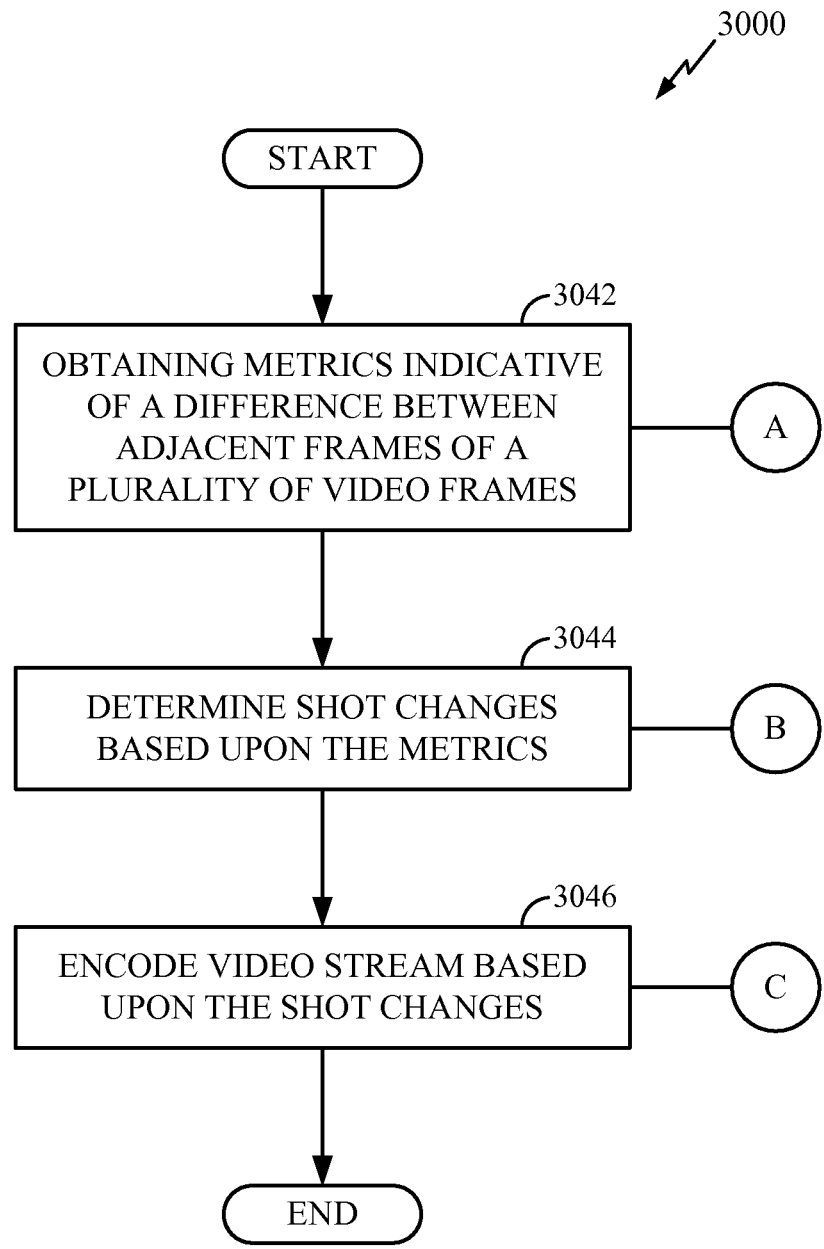
FIG. 30 is a flow diagram that illustrates a process that operates on a group of pictures and can be used in some aspects to encode video based on shot detection in video frames.

FIG. 30 illustrates a process 3000 that operates on a GOP and can be used in some aspects to encode video based on shot detection in video frames, where portions of the process 3000 (or sub-processes) are described and illustrated with reference to FIGS. 30-40. The processor 2831 can be configured to incorporate process 3000. After process 3000 starts, it proceeds to block 3042 where metrics (information) are obtained for the video frames, the metrics including information indicative of a difference between adjacent frames. The metrics includes bidirectional motion information and luminance-based information that is subsequently to determine changes that occurred between adjacent frames which can be used for shot classification. Such metrics can be obtained from another device or process, or calculated by, for example, processor 2831. Illustrative examples of metrics generation are described in reference to process A in FIG. 31.

Process 3000 then proceeds to block 3044 where shot changes in the video are determined based on the metrics. A video frame can be classified into two or more categories of what type of shot is contained in the frame, for example, an abrupt scene change, a slowly changing scene, or a scene containing high luminance values (camera flashes). Certain implementations encoding may necessitate other categories. An illustrative example of shot classification is described in reference to process B in FIG. 32, and in more detail with reference to processes D, E, and F in FIGS. 34-36, respectively.

Figure 33:
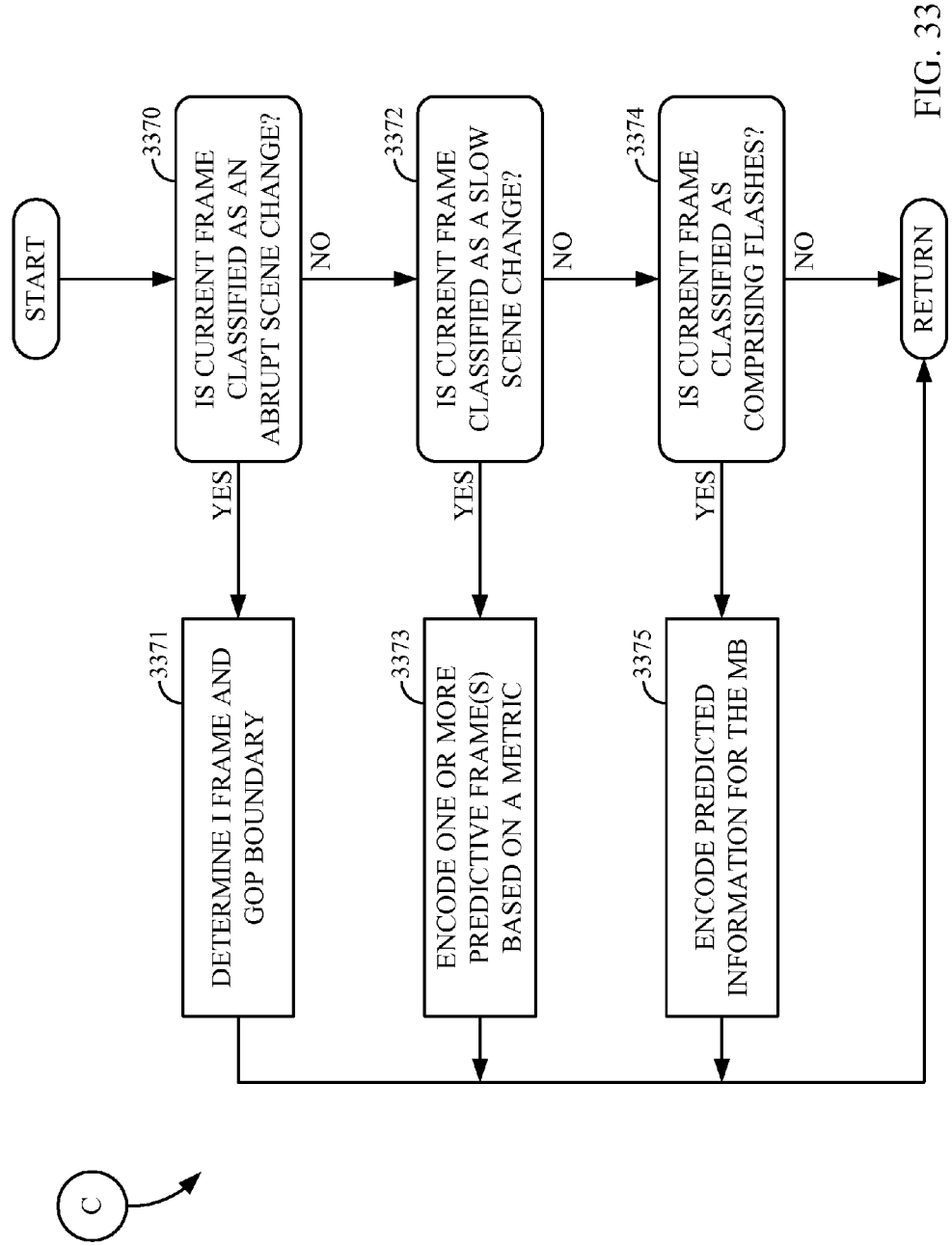
FIG. 33 is a flow diagram illustrating a process for assigning frame compression schemes to video frames based on shot detection results.

Once a frame is classified, process 3000 proceeds to block 3046 where the frame can be encoded, or designated for encoding, using the shot classification results. Such results can influence whether to encode the frame with an intra-coded frame or a predictive frame (e.g., P-frame or B-frame). Process C in FIG. 33 shows an example of an encoding scheme using the shot results.

Figure 31:
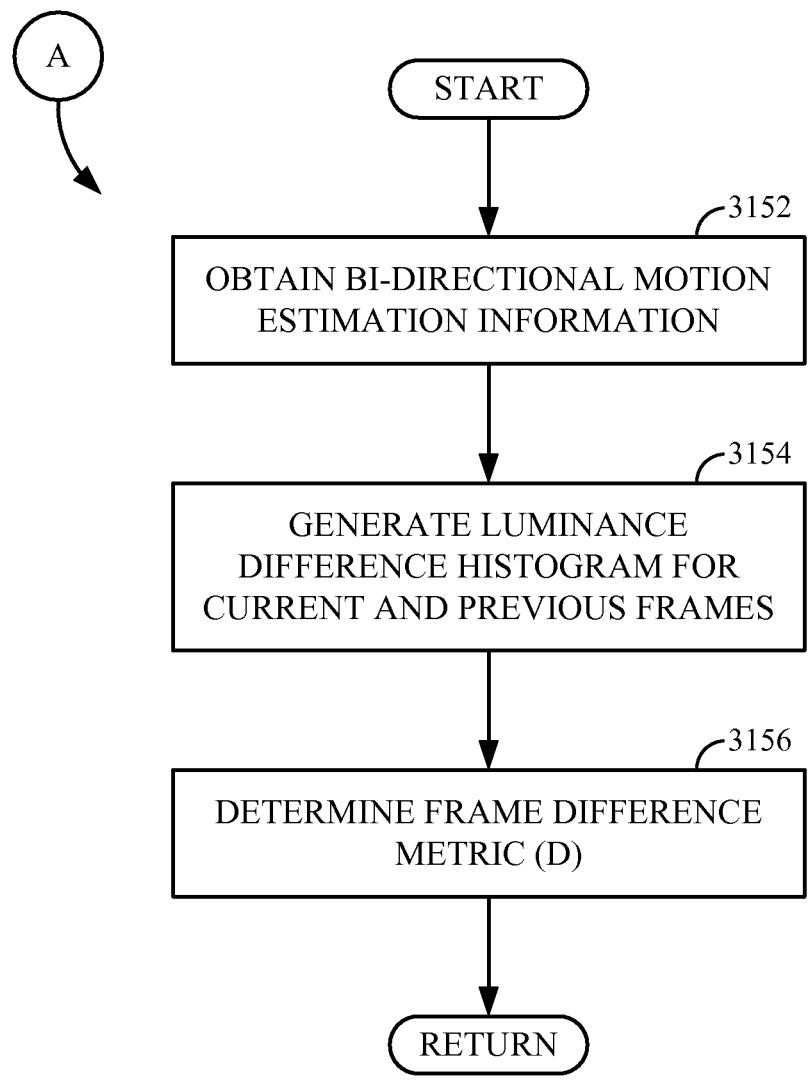
FIG. 31 is a flow diagram illustrating a process for shot detection.

FIG. 31 illustrates an example of a process for obtaining metrics of the video. FIG. 31 illustrates certain steps that occur in block 3042 of FIG. 30. Referring still to FIG. 31, in block 3152, process A obtains or determines bi-directional motion estimation and compensation information of the video. The motion compensator 2832 of FIG. 28 can be configured to perform bi-directional motion estimation on the frames and determine motion compensation information that can be used for subsequent shot classification. Process A then proceeds to block 3154 where it generates luminance information including a luminance difference histogram for a current or selected frame and one or more adjacent frames. Lastly, process A then continues to block 3156 where a metric is calculated that indicative of the shot contained in the frame. One such metric is a frame difference metric which is shown in two examples in Equations 4 and 10. Illustrative examples of determining motion information, luminance information, and a frame difference metric are described below.

Motion Compensation

Figure 37:
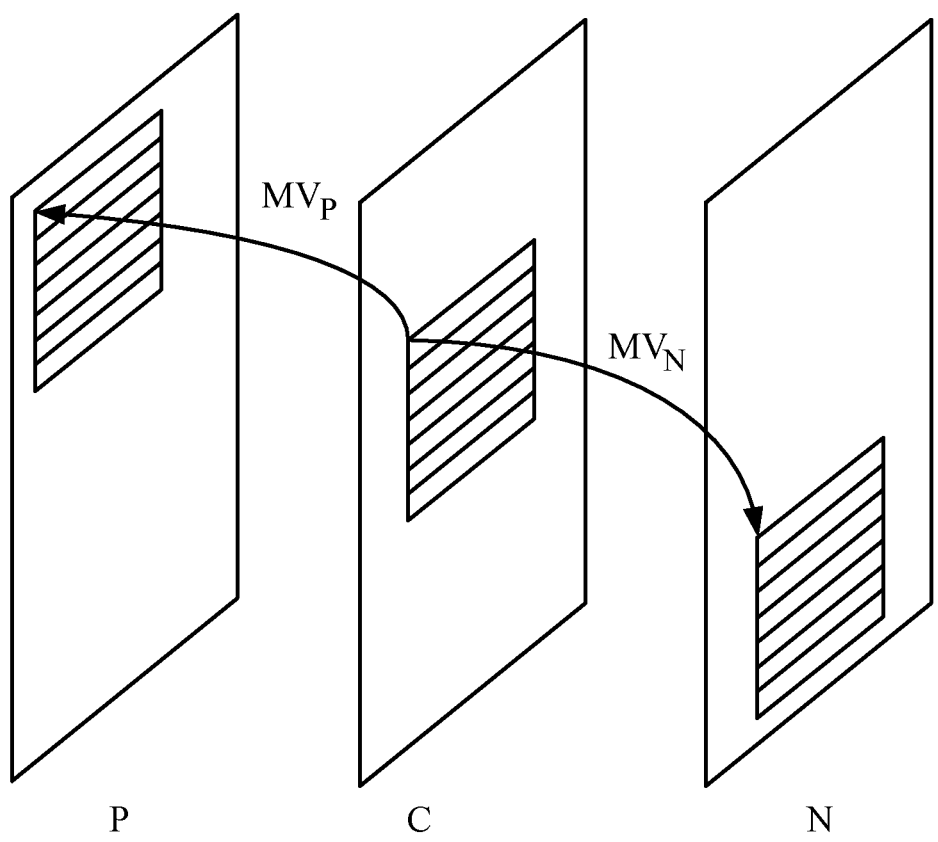
FIG. 37 illustrates motion compensation vectors between a current frame and a previous frame $MV_P$ and a current frame and a next frame $MV_N$.
Figure 38:
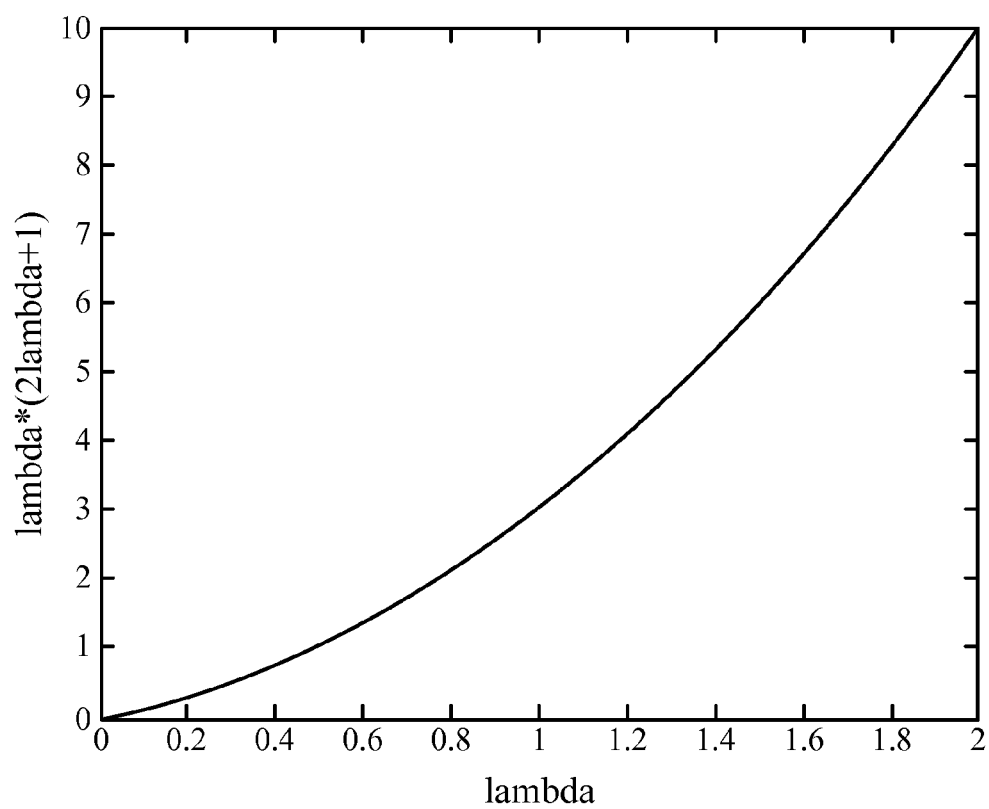
FIG. 38 is a graph illustrating a relationship for a variable used in determining a frame difference metric.

To perform bi-directional motion estimation/compensation, a video sequence can be preprocessed with a bidirectional motion compensator that matches every 8×8 block of the current frame with blocks in two of the frames most adjacent neighboring frames, one in the past, and one in the future. The motion compensator produces motion vectors and difference metrics for every block. FIG. 37 illustrates this concept, showing ah example of matching pixels of a current frame C to a past frame P and a future (or next) frame N, and depicts motion vectors to the matched pixels (past motion vector $MV_P$ and future motion vector $MV_N$. A brief description of an illustrative aspect of bi-directional motion vector generation and related encoding follows below.

Figure 40:
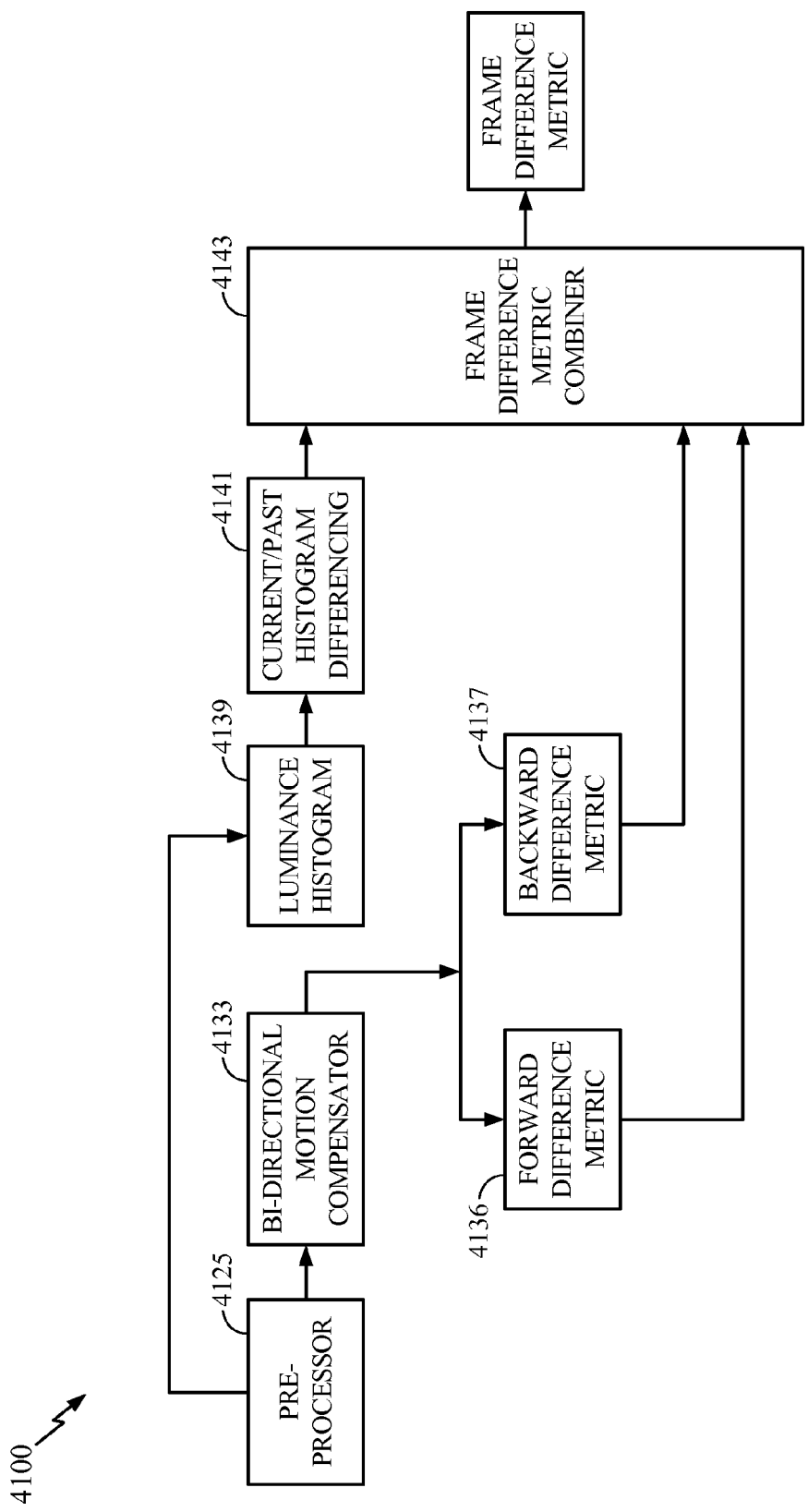
FIG. 40 is a block diagram illustrating determining a frame difference metric.

FIG. 40 illustrates an example of a motion vector determination process and predictive frame encoding in, for example, MPEG-4. The process described in FIG. 40 is a more detailed illustration of an example process that can take place in block 3152 of FIG. 31. In FIG. 40, current picture 4034 is made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb).

In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components. Macroblock 4036 of current picture 4034 is predicted from reference picture 4032 at a different time point than current picture 4034. A search is made in reference picture 4032 to locate best matching macroblock 4038 that is closest, in terms of Y, Cr and Cb values to current macroblock 4036 being encoded. The location of best matching macroblock 138 in reference picture 4032 is encoded in motion vector 4040. Reference picture 4032 can be an I-frame or P-frame that a decoder will have reconstructed prior to the construction of current picture 4034. Best matching macroblock 4038 is subtracted from current macroblock 40 (a difference for each of the Y, Cr and Cb components is calculated) resulting in residual error 4042. Residual error 4042 is encoded with 2D Discrete Cosine Transform (DCT) 4044 and then quantized 4046. Quantization 4046 can be performed to provide spatial compression by, for example, allotting fewer bits to the high frequency coefficients while allotting more bits to the low frequency coefficients. The quantized coefficients of residual error 4042, along with motion vector 4040 and reference picture 4034 identifying information, are encoded information representing current macroblock 4036. The encoded information can be stored in memory for future use or operated on for purposes of, for example, error correction or image enhancement, or transmitted over network 140.

The encoded quantized coefficients of residual error 4042, along with encoded motion vector 4040 can be used to reconstruct current macroblock 4036 in the encoder for use as part of a reference frame for subsequent motion estimation and compensation. The encoder can emulate the procedures of a decoder for this P-frame reconstruction. The emulation of the decoder will result in both the encoder and decoder working with the same reference picture. The reconstruction process, whether done in an encoder, for further inter-coding, or in a decoder, is presented here. Reconstruction of a P-frame can be started after the reference frame (or a portion of a picture or frame that is being referenced) is reconstructed. The encoded quantized coefficients are dequantized 4050 and then 2D Inverse DCT, or IDCT, 4052 is performed resulting in decoded or reconstructed residual error 4054. Encoded motion vector 4040 is decoded and used to locate the already reconstructed best matching macroblock 4056 in die already reconstructed reference picture 4032. Reconstructed residual error 4054 is then added to reconstructed best matching macroblock 4056 to form reconstructed macroblock 4058. Reconstructed macroblock 4058 can be stored in memory, displayed independently or in a picture with other reconstructed macroblocks, or processed further for image enhancement.

Encoding using B-frames (or any section coded wife bi-directional prediction) can exploit temporal redundancy between a region in a current picture and a best matching prediction region in a previous picture and a best matching prediction region in a subsequent picture. The subsequent best matching prediction region and the previous best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors.

Luminance Histogram Difference

The motion compensator can produce a difference metric for every block. The difference metric can be a sum of square difference (SSD) or a sum of absolute difference (SAD). Without loss of generality, here SAD is used as an example.

For every frame, a SAD ratio is calculated as below:

$$\gamma = \frac{\varepsilon + SAD_P}{\varepsilon + SAD_N} \quad (48)$$

where $SAD_P$ and $SAD_N$ are the sum of absolute differences of the forward and the backward difference metric, respectively. It should be noted that the denominator contains a small positive number e to prevent the "divide-by-zero" error. The nominator also contains an ϵ to balance the effect of the unity in the denominator. For example, if the previous frame, the current frame, and the next frame are identical, motion search should yield $SAD_P=SAD_N=0$. In this case, the above calculation generators $\gamma=1$ instead of 0 or infinity.

A luminance histogram can be calculated for every frame. Typically the multimedia images have a luminance depth (e.g., number of "bins") of eight bits. The luminance depth used for calculating the luminance histogram according to some aspects can be set to 16 to obtain the histogram. In other aspects, the luminance depth can be set to an appropriate number which may depend upon the type of data being processed, the computational power available, or other predetermined criteria. In some aspects, the luminance depth can be set dynamically based on a calculated or received metric, such as the content of the data.

Equation 49 illustrates one example of calculating a luminance histogram difference (lambda):

$$\lambda = \frac{\sum_{i=1}^{16} |N_{Pi} - N_{Ci}|}{N} \quad (49)$$

where $N_{Pi}$ is the number of blocks in the $i^{th}$ bin for the previous frame, and $N_{Ci}$ is the number of blocks in the $i^{th}$ bin for the current frame, and N is the total number of blocks in a frame. If the luminance histogram difference of the previous and the current frame are completely dissimilar (or disjoint), then $\lambda=2$.

A frame difference metric D, discussed in reference to block 56 of FIG. 5, can be calculated, as shown in Equation 50:

$$D = \frac{\gamma_C}{\gamma_P} + A\lambda(2\lambda + 1) \quad (50)$$

where A is a constant chosen by application, and $$\gamma_C = \frac{\varepsilon + SAD_P}{\varepsilon + SAD_N},$$

and $$\gamma_P = \frac{\varepsilon + SAD_{PP}}{\varepsilon + SAD_C}.$$

Figure 32:
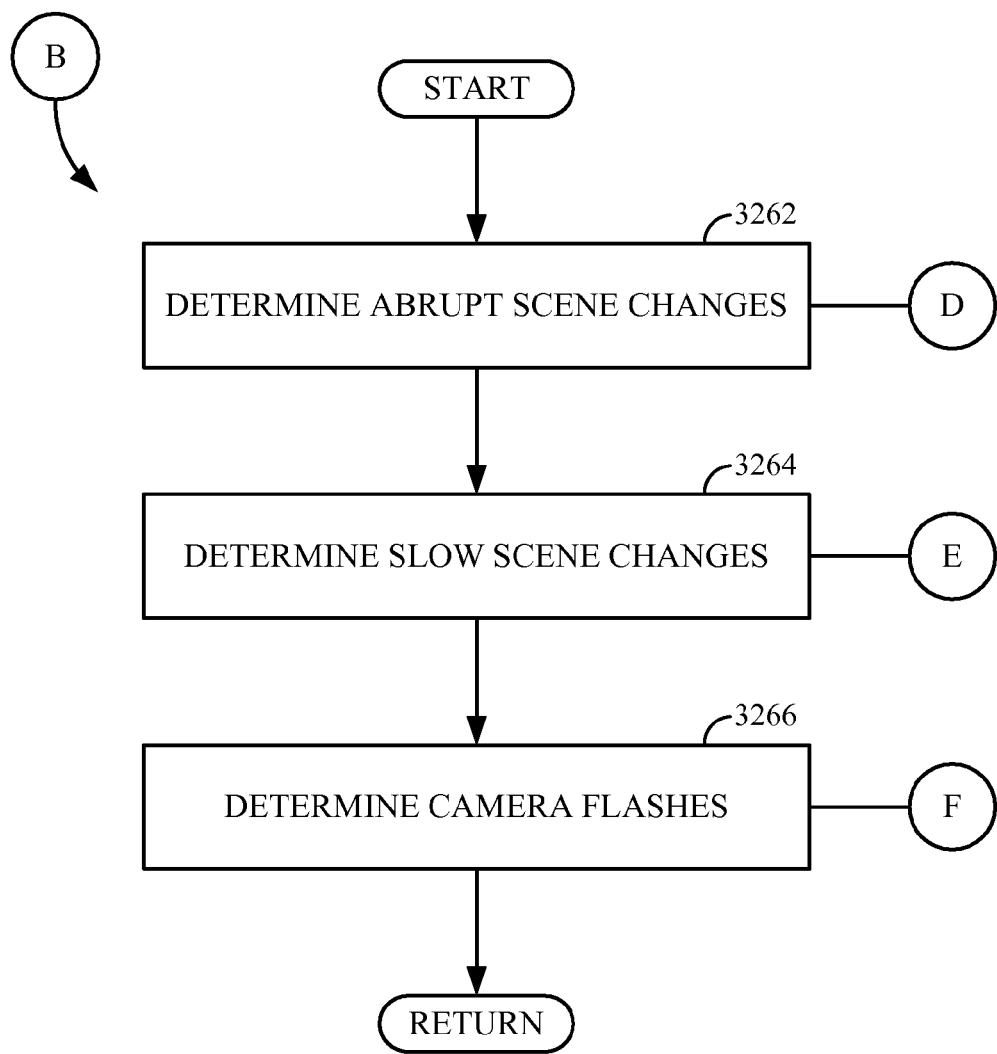
FIG. 32 is a flow diagram illustrating a process for determining different classifications of shots in video.
Figure 34:
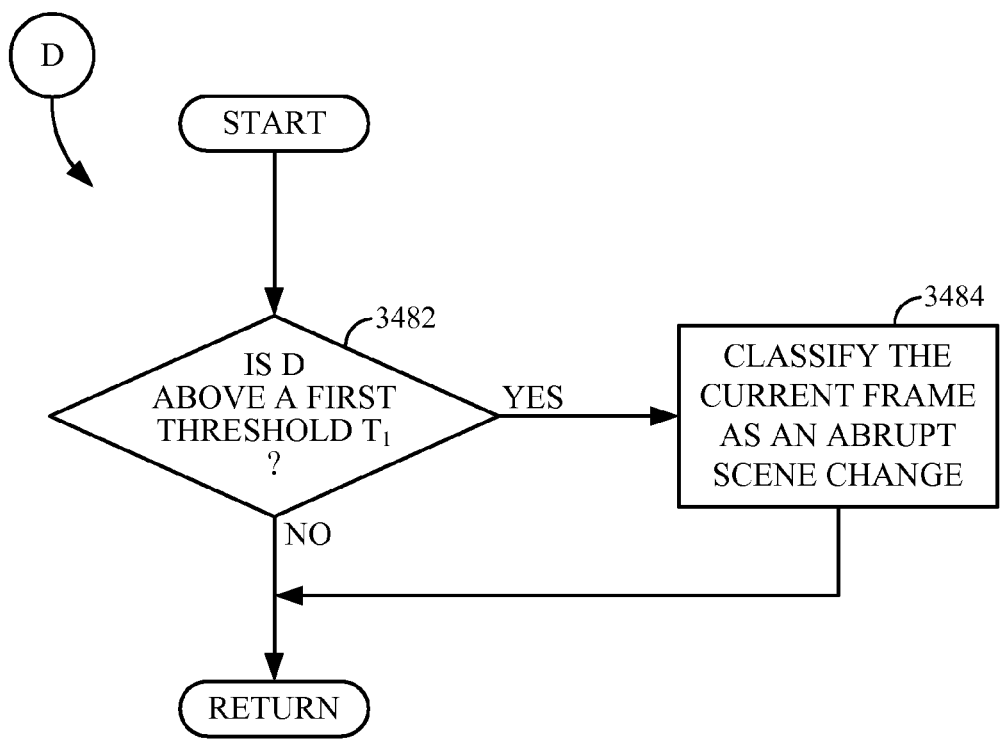
FIG. 34 is a flow diagram illustrating a process for determining abrupt scene changes.
Figure 35:
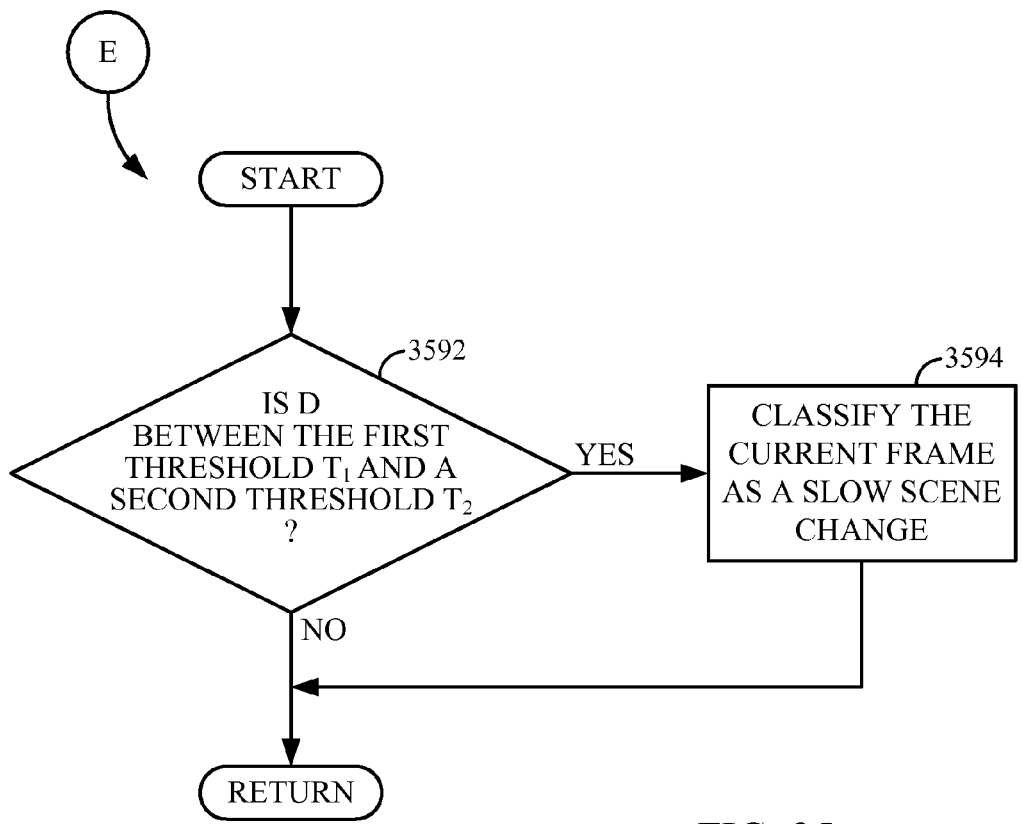
FIG. 35 is a flow diagram illustrating a process for determining slowly-changing scenes.
Figure 36:
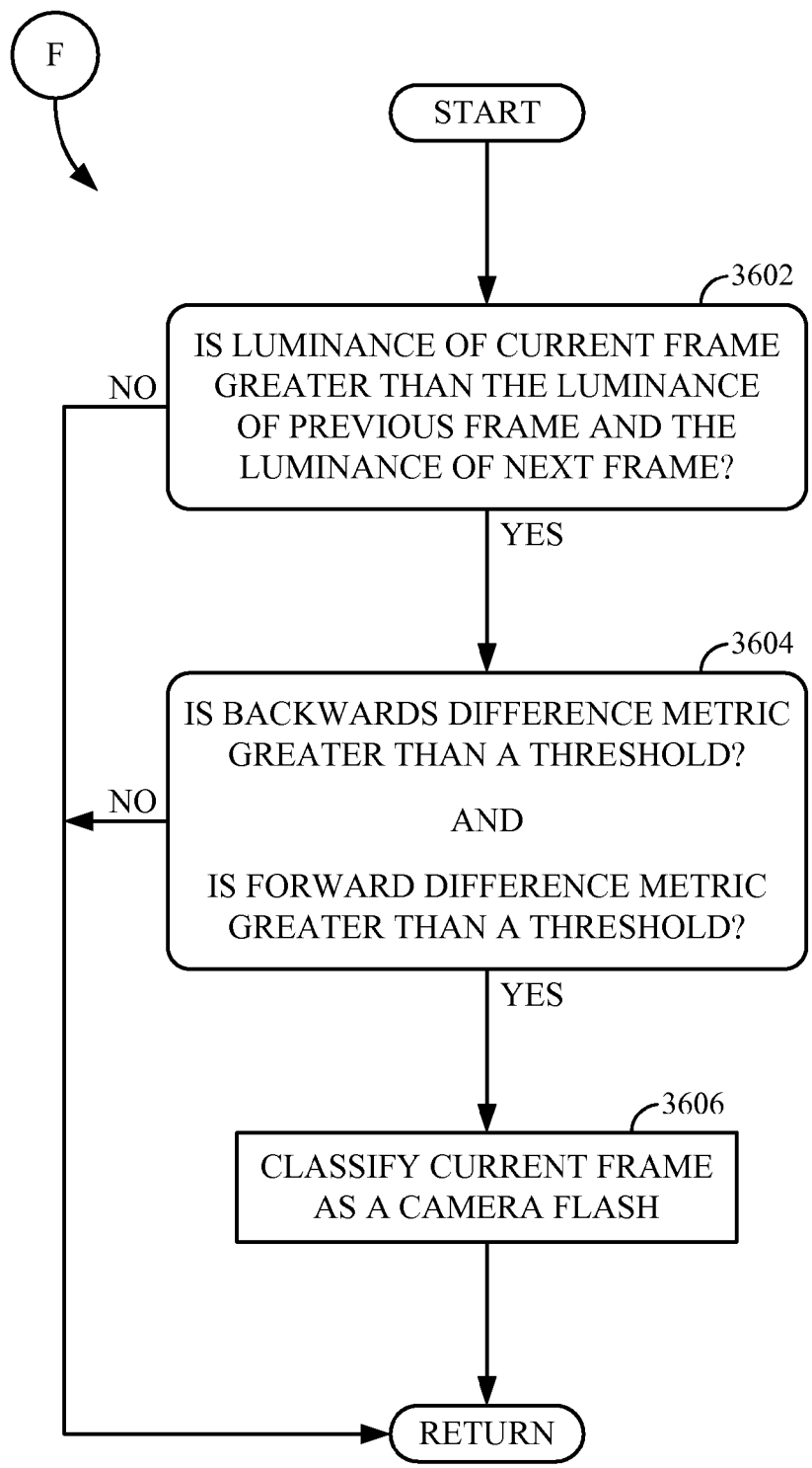
FIG. 36 is a flow diagram illustrating a process for determining scenes containing camera flashes.

FIG. 32 illustrates an example of a process B which determines three categories of shot (or scene) changes using metrics obtained or determined for the video. FIG. 32 illustrates certain steps occurring in one aspect of block 3044 of FIG. 30. Again referring to FIG. 32, in block 3262, process B first determines if the frame meets criteria to be designated an abrupt scene change. Process D in FIG. 34 illustrates an example of this determination. Process B then proceeds to block 3264 where it determines of the frame is part of a slowly changing scene. Process C in FIG. 35 illustrates an example of determining a slow changing scene. Finally, at block 3366 process B determines if the frame contains camera flashes, in other words, large luminance values differing from the previous frame. Process F in FIG. 36 illustrates an example of determining a frame containing camera flashes. An illustrative example of these processes are described below.

Abrupt Scene Change

FIG. 34 is a flow diagram illustrating a process of determining abrupt scene changes. FIG. 34 further elaborates certain steps that can occur in some aspects of block 3262 of FIG. 32. At block 3482 checks if the frame difference metric D meets the criterion shown in Equation 51:

$$D = \frac{\gamma_C}{\gamma_P} + A\lambda(2\lambda + 1) \geq T_1 \quad (51)$$

where A is a constant chosen by application, and $T_1$ is a threshold. If the criteria is met, at block 3484 process D designates the frame as an abrupt scene change and, in this example, no further shot classification is necessary.

In one example simulation shows, setting A=1, and $T_1$=5 achieve good detection performance. If the current frame is an abrupt scene change frame, then $\gamma_C$ should be large and $\gamma_P$ should be small. The ratio $$\frac{\gamma_C}{\gamma_P}$$

can be used instead of $\gamma_C$ alone so that the metric is normalized to the activity level of the context.

It should be noted that the above criterion uses the luminance histogram difference lambda (λ) in a non-linear way. FIG. 39 illustrates λ*(2λ+1) is a convex function. When λ is small (e.g., close to zero), it is barely preemphasis. The larger λ becomes, the more emphasis is conducted by the function. With this pre-emphasis, for any λ larger than 1.4, an abrupt scene change is detected if the threshold $T_1$ is set to be 5.

Cross-Fading and Slow Scene Changes

FIG. 35 further illustrates further details of some aspects that can occur in block 3264 of FIG. 32. Referring to FIG. 35, at block 3592 process E determines if the frame is part of a series of frames depicting a slow scene change. Process E determines that the current frame is a cross-fading or other slow scene change if the frame difference metric D is less than the first threshold value $T_1$ and greater or equal to a second threshold value $T_2$ as illustrated in Equation 52:

$$T_2 \leq D < T_1 \quad (52)$$

for a certain number of continuous frames, where $T_1$ is the same threshold used above and $T_2$ is another threshold value. Typically, the exact value of $T_1$ and $T_2$ are determined by normal experimentation because of the difference in implementations that are possible. If the criteria is met, at block 94 process E classifies the frame as part of a slow changing scene shot classification for the selected frame ends.

Camera Flashlight Events

Process F shown in FIG. 36 is an example of a process that can determine if the current frame comprises camera flashlights. In this illustrative aspect camera, the luminance histogram statistics are used to determine if the current frame comprises camera flashlights. Process F determines camera flash events are in the selected frame by first determining if the luminance of a current frame is greater than the luminance of the previous frame and the luminance of the next frame, shown at block 3602. If not, the frame is not a camera flash event; but if so it may be. At block 3604, Process F determines whether the backwards difference metric is greater than a threshold $T_3$, and if the forwards difference metric is greater than a threshold $T_4$; if both these conditions are satisfied, at block 3606 process F classifies the current frame as having camera flashlights. In one example, at block 3602, process F determines if the average luminance of the current frame minus the average luminance of the previous frame is equal of exceeds a threshold $T_3$, and process F determines if the average luminance of minus the average luminance of the next frame is greater than or equal to the threshold $T_3$, as shown in Equations 53 and 54:

$$\overline{Y}_C - \overline{Y}_P \geq T_3 \quad (53)$$

$$\overline{Y}_C - \overline{Y}_N \geq T_3 \quad (54)$$

If the criterion is not met, the current frame is not classified as comprising camera flashlights and process F returns. If the criterion is met, process F proceeds to block 3604 where it determines if a backwards difference metric $SAD_P$ and a forward difference metric $SAD_N$ are greater than a certain threshold T4, as illustrated in Equations 55 and 56 below:

$$SAD_P \geq T_4 \quad (55)$$

$$SAD_N \geq T_4 \quad (56)$$

where $\overline{Y}_C$ is the average luminance of the current frame, $\overline{Y}_P$ is the average luminance of the previous frame, $\overline{Y}_N$ is the average luminance of the next frame, and $SAD_P$ and $SAD_N$ are the forward and backward difference metrics associated with the current frame. If the criterion is not met, process F returns.

Values of $T_3$ are typically determined by normal experimentation as the implementation of the described processes can result in differences in operating parameters including threshold values. SAD values are included in the determination because camera flashes typically take only one frame, and due to the luminance, difference, this frame cannot be predicted welt using motion compensation from both the forward and the backward direction.

In some aspects, one or more of the threshold values $T_1$, $T_2$, $T_3$, and $T_4$ are predetermined and such values are incorporated into the shot classifier in the encoding device. Typically, these threshold values are selected through testing of a particular implementation of shot detection. In some aspects, one or more of the threshold values $T_1$, $T_2$, $T_3$, and $T_4$ can be set during processing (e.g., dynamically) based on using information (e.g., metadata) supplied to die shot classifier or based on information calculated by the shot classifier itself.

Referring now to FIG. 33 which shows a process C for determining encoding parameters for the video, or for encoding the video, based on the shot classification of the selected frame. At block 3370 process C determines if the selected frame was classified as an abrupt scene change. If so, at block 3371 the current frame is classified as an abrupt scene change, and the frame can be encoded as an I-frame and a GOP boundary can be determined. If not, process C proceeds to block 3372; if the current frame is classified as a portion of a slowly changing scene, at block 3373 the current frame, and other frames in the slow changing scene can be encoded as a predictive frame (e.g., P-frame or B-frame). Process C then proceeds to block 3374 where it checks if the current frame was classified as a flashlight scene comprising camera flashes. If so, at block 3375 the frame can be identified for special processing, for example, removal, replication of a previous frame or encoding a particular coefficient for the frame. If not, no classification of the current frame was made and the selected frame can be encoded in accordance with other criteria, encoded as an I-frame, or dropped. Process C can be implemented in an encoder.

In the above-described aspect, the amount of difference between the frame to be compressed and its adjacent two frames is indicated by a frame difference metric D. If a significant amount of a one-way luminance change is detected, it signifies a cross-fade effect in the frame. The more prominent the cross-fade is, the more gain may be achieved by using B frames. In some aspects, a modified frame difference metric is used as shown in Equation 57 below:

$$D_1 = \begin{cases} \left(1 - \alpha + 2\alpha \frac{|d_P - d_N|}{d_P + d_N}\right) \times D, & \text{if } Y_P - \Delta \geq Y_C \geq Y_N + \Delta \text{ or} \\ & Y_P + \Delta \leq Y_C \leq Y_N - \Delta, \\ D, & \text{otherwise,} \end{cases} \quad (57)$$

where $d_P = |Y_C - Y_P|$ and $d_N = |Y_C - Y_N|$ are the luma difference between the current frame and the previous frame, and the luma difference between the current frame and the next frame, respectively, Δ represents a constant feat can be determined in normal experimentation as it can depend on the implementation, and α is a weighting variable having a value between 0 and 1.

The modified frame difference metric $D_1$ is only different from the original frame difference metric D if a consistent trend of luma shift is observed and the shift strength is large enough. $D_1$ is equal to or less than D. If the change of luma is steady ($d_P$-$d_N$), the modified frame difference metric $D_1$ is lower than the original frame difference metric D with the lowest ratio of (1-α).

Table 1 below shows performance improvement by adding abrupt scene change detection. The total number of I-frames in both the non-scene-change (NSC) and the scene-change (SC) Cases are approximately the same. In the NSC case, I-frames are distributed uniformly among the whole sequence, while in the SC case, I-frames are only assigned to abrupt scene change frames.

It can be seen that typically 0.2-0.3 dB improvement can be achieve PSNR-wise. Simulation results show that the shot detector is very accurate in determining the shot events above-mentioned. Simulation of five clips with normal cross-fade effect shows that at Δ=5.5 and α=0.4, a PSNR gain of 0.226031 dB is achieved at the same bitrate.

TABLE 1

Simulation Results Of Abrupt Scene Change Detection

| Sequence | Metric | | |
|---|---|---|---|
| | Bitrate (kbps) | Avg. QP | PSNR (dB) |
| Animation NSC | 226.2403 | 31.1696 | 35.6426 |
| Animation SC | 232.8023 | 29.8171 | 36.4513 |
| Music NSC | 246.6394 | 32.8524 | 35.9337 |
| Music SC | 250.0994 | 32.3209 | 36.1202 |
| Headline NSC | 216.9493 | 29.8304 | 38.9804 |
| Headline News SC | 220.2512 | 28.9011 | 39.3151 |
| Basketball NSC | 256.8726 | 33.1429 | 33.5262 |
| Basketball SC | 254.9242 | 32.4341 | 33.8635 |

Adaptive GOP Structure

An illustrative example of adaptive GOP structure operations are described below. Such operations can be included in the GOP partitioner 412 of FIG. 412. MPEG2, an older video compression standard, does not require that the GOP have a regular structure, though one can be imposed. The MPEG2 sequence always begins with ah I frame, i.e., one which has been encoded without reference to previous pictures. The MPEG2 GOP format is usually prearranged at the encoder by fixing the spacing in the GOP of the P or predictive pictures that follow the I frame. P frames are pictures that have been in part predicted from previous I or P pictures. The frames between the starting I frame, and the succeeding P frames are encoded as B frames. A "B" frame (B stands for bi-directional) can use the previous and next I or P pictures either individually or simultaneously as reference. The number of bits used to encode an I-frame on the average exceeds the number of bits used to encode a P-frame; likewise the number of bits used to encode a P-frame on the average exceeds that of a B-frame. A skipped frame, if it is used, may use no bits for its representation.

One benefit of using P-frames and B-frames, and in more recent compression algorithms, the skipping of frames is that it is possible to reduce video transmission sizes. When temporal redundancy is high—e.g., when there is little change from picture to picture—use of P, B, or skipped pictures efficiently represents the video stream, because I or P pictures decoded earlier are used later as references to decode other P or B pictures.

A group of pictures partitioner adaptively encodes frames to minimize temporal redundancy. Differences between frames are quantified and a decision to represent the picture by a I, P, B, or skipped frame is automatically made after suitable tests are performed on the quantified differences. The processing in a GOP partitioner and is aided by other operations of die preprocessor 202, which provides filtering for noise removal.

Adaptive encoding process has advantages not available in a "fixed" encoding process. A fixed process ignores the possibility that little change in content has taken place; however, an adaptive procedure allows far more B frames to be inserted between each I and P, or two P frames, thereby reducing the number of bits used to adequately represent the sequence of frames. Conversely, e.g., in a fixed encoding process, when the change in video content is significant, the efficiency of P frames is greatly reduced because the difference between the predicted and the reference frames is too large. Under these conditions, matching objects may fail out of the motion search regions, or the similarity between matching objects is reduced due to distortion caused by changes in camera angle. An adaptive encoding process may beneficially be used to Optionally determine when P frames should be encoded.

In the system disclosed herein, the types of conditions described above are automatically sensed. The adaptive encoding process described herein is flexible and is made to adapt to these changes in content. The adaptive encoding process evaluates a frame difference metric, which can be thought of as measure of distance between frames, with the same additive properties of distance. In concept, given frames $F_1$, $F_2$, and $F_3$ having the inter-frame distances $d_{12}$ and $d_{23}$, the distance between $F_1$ and $F_3$ is taken as being at least $d_{12}+d_{23}$. Frame assignments are made on the basis of this distance-like metric and other measures.

The GOP partitioner 412 operates by assigning picture types to frames as they are received. The picture type indicates the method of prediction that may be used to code each block:

I-pictures are coded without reference to other pictures. Since they stand alone they provide access points in the data stream where decoding can begin. An I encoding type is assigned to a frame if the "distance" to its predecessor frame exceeds a scene change threshold.

P-pictures can use the previous I or P pictures for motion compensated prediction. They use blocks in the previous fields or frames that may be displaced from the block being predicted as a basis for encoding. After the reference block is subtracted from the block being considered, the residual block is encoded, typically using the discrete cosine transform for the elimination of spatial redundancy. A P encoding types is assigned to a frame if the "distance" between it and the last frame assigned to be a P frame exceeds a second threshold, which is typically less than the first.

B-frame pictures can use the previous and next P- or I-pictures for motion compensation as described above. A block in a B picture can be forward, backward or bi-directionally predicted; or it could be intra-coded without reference to other frames. In H.264 a reference block can be a linear combination of as many as 32 blocks from as many frames. If the frame cannot be assigned to be an I or P type, it is assigned to be a B type, if the "distance" from it to its immediate predecessor is greater than a third threshold, which typically is less than the second threshold. If the frame cannot be assigned to become a B-frame encoded, it is assigned to "skip frame" status. This frame can be skipped because it is virtually a copy of a previous frame.

Evaluating a metric that quantifies the difference between adjacent frames in the display order is the first part of this processing that takes place in GOP partitioner 412. This metric is the distance referred to above; with it, every frame is evaluated for its proper type. Thus, the spacing between the I and adjacent P, or two successive P frames, can be variable. Computing the metric begins by processing the video frames with a block-based motion compensator, a block being the basic unit of video compression, composed usually of 16×16 pixels, though other block sizes such as 8×8, 4×4 and 8×16 are possible. For frames consisting of two deinterlaced fields that are present at the output, the motion compensation is done on a field basis, the search for the reference blocks taking place in fields rather than frames. For a block in the first field of the current frame a forward reference block is found in fields of the frame that follows it; likewise a backward reference block found in fields of the frame that immediately precedes the current field. The current blocks are assembled into a compensated field. The process continues with the second field of the frame. The two compensated fields are combined to form a forward and a backward compensated frame.

For frames created in the inverse telecine 406, the search for reference blocks may be on a frame basis only, since only reconstructed film frames are generated. Two reference blocks and two differences, forward and backward, are found, leading also to a forward and backward compensated frame. In summary, the motion compensator produces motion vectors and difference metrics for every block. Note that the differences in the metric are evaluated between a block in the field or frame being considered and a block that best matches it, either in a preceding field or frame or a field or frame that immediately follows it, depending on whether a forward or backward difference is being evaluated. Only luminance values enter into this calculation.

The motion compensation step thus generates two sets of differences. These are between blocks of current values of luminance and the luminance values in reference blocks taken from frames that are immediately ahead and immediately behind the current one in time. The absolute value of each forward and each backward difference is determined for each pixel in a block and each is separately summed over the entire frame. Both fields are included in the two summations when the deinterlaced NTSC fields that comprise a frame are processed. In this way, $SAD_P$, and $SAD_N$, the summed absolute values of the forward and backward differences are found.

For every frame a SAD ratio is calculated using the relationship, $$\gamma = \frac{\varepsilon + SAD_P}{\varepsilon + SAD_N} \quad (58)$$

where $SAD_P$ and $SAD_N$ are the summed absolute values of the forward and backward differences respectively. A small positive number is added to the numerator $\epsilon$ to prevent the "divide-by-zero" error. A similar $\epsilon$ term is added to the denominator, further reducing the sensitivity of $\gamma$ when either $SAD_P$ or $SAD_N$ is close to zero.

In an alternate aspect, the difference can be the SSD, the sum of squared differences, and SAD, the sum of absolute differences, or the SATD, in which the blocks of pixel values are transformed by applying the two dimensional Discrete Cosine Transform to them before differences in block elements are taken. The sums are evaluated over the area of active video, though a smaller area may be used in other aspects.

The luminance histogram of every frame as received (non-motion compensated) is also computed. The histogram operates on the DC coefficient, i.e., the (0,0) coefficient, in the 16×16 array of coefficients that is the result of applying the two dimensional Discrete Cosine Transform to the block of luminance values if it were available. Equivalently the average value of the 256 values of luminance in the 16×16 block may be used in the histogram. For images whose luminance depth is eight bits, the number of bins is set at 16. The next metric evaluates the histogram difference $$\lambda = \frac{1}{N}\sum_{i=1}^{16} |N_{Pi} - N_{Ci}| \quad (59)$$

In the above, $N_{Pi}$ is the number of blocks from the previous frame in the $i^{th}$ bin, and $N_{Ci}$ is the number of blocks from the current frame that belong in the $i^{th}$ bin, N is the total number of blocks in a frame.

These intermediate results are assembled to form the current frame difference metric as $$M = \frac{\gamma_C}{\gamma_P} + \lambda(2\lambda + 1), \quad (60)$$

where $\gamma_C$ is the SAD ratio based on the current frame and $\gamma_P$ is the SAD ratio based on the previous frame. If a scene has smooth motion and its luma histogram barely change, then M≈1. If the current frame displays an abrupt scene change, then $\gamma_C$ will be large and $\gamma_P$ should be small. The ratio $$\frac{\gamma_C}{\gamma_P}$$

instead of $\gamma_C$ alone is used so that the metric is normalized to the activity level of the contest.

Dataflow 4100 in FIG. 40 illustrates certain components that may be used to compute the frame difference metric. Preprocessor 4125 delivers interlaced fields in the case of video having a NTSC source, and frames of film images when the source of the video is the result of inverse telecine to the bi-directional motion compensator 4133. The bi-directional motion compensator 4133 operates on a field (or frame in the case of a cinematic source of video) by breaking it into blocks of 16×16 pixels and comparing each block to all 16×16 blocks in a defined area of a field of the previous frame. The block which provides the best match is selected and subtracted from the current block. The absolute values of the differences is taken and the result summed over the 256 pixels that comprise the current block. When this is done for all current blocks of the field, and then for both fields the quantity $SAD_N$, the backward difference metric has been computed by a backward difference module 4137. A similar procedure may be performed by a forward difference module 4136. The forward difference module 4136 uses the frame which is immediately ahead of the current one in time as a source of reference blocks to develop the $SAD_P$, the forward difference metric. The same estimation process, albeit done using the recovered film frames, takes place when the input frames are formed in the inverse telecine. The histograms that can be used to complete the computation of the frame difference metric may be formed in histogram difference module 4141. Each 16×16 block is assigned to a bin based on the average value of its luminance. This information is formed by adding all 256 pixel luminance values in a block together, normalizing it by 256 if desired, and incrementing the count of the bin into which the average value would have been placed. The calculation is done once for each pre-motion compensated frame, the histogram for the current frame becoming the histogram for the previous frame when a new current frame arrives. The two histograms are differenced and normalized by the number of blocks in histogram difference module 4141 to form λ, defined by Equation 59. These results are combined in frame difference combiner 4143, which uses the intermediate results found in histogram difference module 4139, forward and backward difference modules 4136 and 4136 to evaluate the current frame difference defined in Equation 60.

The system of flowchart 4100 and components or steps thereof, can be implemented by hardware, software, firmware, middleware, microcode, or any combination thereof. Each functional component of flowchart 4100, including the preprocessor 4135, the bidirectional motion compensator 4133, the toward and backward difference metric modules 4136 and 4137, the histogram, difference module 4141, and the frame difference metric combiner 4143, may be realized as a standalone component, incorporated as hardware, firmware, middleware in a component of another device, or be implemented in microcode or software that is executed on the processor, or a combination thereof. When implemented in software, firmware, middleware or microcode, the program code or code segments that perform the desired tasks may be stored in a machine readable medium such as a storage medium. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Figure 41:
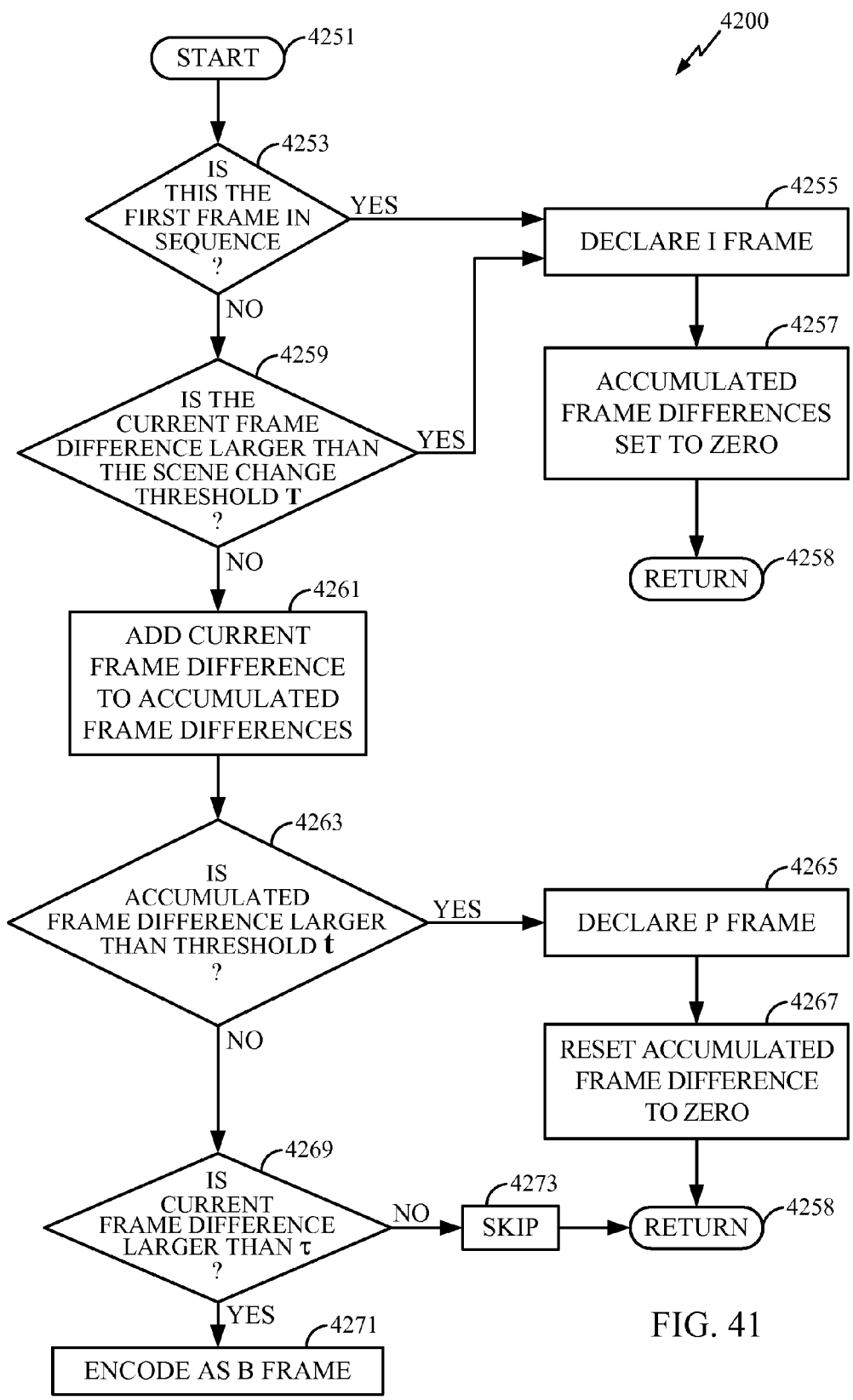
FIG. 41 is a flow diagram illustrating the procedure where compression types are assigned to frames.

The received and processed data can be stored in a storage medium which can include, for example, a chip configured storage medium (e.g., ROM, RAM) or a disc-type storage medium (e.g., magnetic or optical) connected to a processor. In some aspects, the combiner 4143 can contain part or all of the storage medium. Flowchart 4200 in FIG. 41 illustrates a process of assigning compression types to frames. In one aspect M, the current frame difference defined in Equation 3, is the basis for all decisions made with respect to frame assignments. As decision block 4253 indicates, if a frame under consideration is the first in a sequence, the decision path marked YES is followed to block 4255, thereby declaring the frame to be an I frame. The accumulated frame differences is set to zero in block 4257, and the process returns (in block 4258) to the start block 4253. If the frame being considered is not the first frame in a sequence, the path marked NO is followed from block 4253 where the decision was made, and in test block 4259 the current frame difference is tested against the scene change threshold. If the current frame difference is larger than that threshold, the decision path marked YES is followed to block 4255, again leading to the assignment of an I-frame. If the current frame difference is less than the scene change threshold, the NO path is followed to block 4261 where the current frame difference is added the accumulated frame difference.

Continuing through the flowchart at decision block 4263, the accumulated frame difference is compared with threshold t, which is in general less than the scene change threshold. If the accumulated frame difference is larger than t, control transfers to block 4265, and the frame is assigned to be a P frame; the accumulated frame difference is then reset to zero in step 4267. If the accumulated frame difference is less than t, control transfers from block 4263 to block 4269. There the current frame difference is compared with τ, which is less than t. If the current frame difference is smaller than τ, the frame is assigned to be skipped in block 4273; if the current frame difference is larger than τ, the frame is assigned to be a β frame.

In an alternate aspect another frame encoding complexity indicator M* is defined as $$M^* = M \times \min(1, \alpha \max(0, SAD_P - s) \times \max(0, MV_P - m)), \quad (61)$$

where α is a scaler, $SAD_P$ is the SAD with forward motion compensation, $MV_P$ is the sum of lengths measured in pixels of the motion vectors from the forward motion compensation, and s and m are two threshold numbers that render the frame encoding complexity indicator to zero if $SAD_P$ is lower than s or $MV_P$ is lower than m. M* would be used in place of the current frame difference in flowchart 4200 of FIG. 41. As can be seen, M* is different from M only if the forward motion compensation shows a low level of movement. In this case, M is smaller than M.

It is noted that the shot detection and encoding aspects described herein may be described as a process which is depicted as a flowchart, a flow diagram, a structure diagram, or a block diagram. Although the flowcharts shown in the figures may describe operations as a sequential process, many operations can be performed in parallel or concurrently. In addition, the order of operations may be re-arranged. A process is typically terminated when its operations are completed. A process may correspond to a method, a function, a procedure, a subroutine, a subprogram, etc. When a process corresponds to a function, its termination corresponds to a return of the function to the calling function or the main function.

It should also be apparent to those skilled in the art that one or more elements of a device disclosed herein may be rearranged without affecting the operation of the device. Similarly, one or more elements of a device disclosed herein may be combined without affecting the operation of the device. Those of ordinary skill in the art would understand that information and multimedia data may be represented using any of a variety of different technologies and techniques. Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

For example, the steps of a method or algorithm described in connection with the shot detection and encoding examples and Figures disclosed herein may be embodied directly in hardware, in a software module executed by a processor, or in a combination of the two. The methods and algorithms are particularly applicable to communication technology including wireless transmissions of video to cell phones, computers, laptop computers, PDA's and all types of personal and business communication devices, software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the aspects is intended to be illustrative, and not to limit the scope of the claims.

What is claimed is:

1. A method of processing multimedia data, comprising:
receiving digital interlaced video frames; and
converting the digital interlaced video frames to digital progressive video frames by deinterlacing the digital interlaced video frames, wherein the deinterlacing comprises:
generating spatial information for the digital interlaced video frames and motion information for at least one of the digital interlaced video frames; and
generating the digital progressive video frames using the spatial information and the motion information,
wherein pixel information corresponding to a first frame generated using both the spatial and motion information is weighted over pixel information corresponding to a second frame immediately succeeding the first frame and generated without the motion information.

2. The method of claim 1, wherein the deinterlacing further comprises:
generating bi-directional motion information for the digital interlaced video frames; and
generating the digital progressive video frames based on the digital interlaced video frames using the bi-directional motion information.

3. The method of claim 1, wherein the converting the digital interlaced video frames comprises inverse telecining 3/2 pulldown video frames.

4. The method of claim 1, further comprising resizing the digital progressive video frames.

5. The method of claim 1, further comprising filtering the digital progressive video frames with a denoising filter.

6. The method of claim 1, further comprising:
generating metadata based on the converted digital progressive video frames;
determining an encoding parameter based on the metadata; and
encoding the digital progressive video frames in accordance with the encoding parameter.

7. An apparatus for processing multimedia data, comprising:
a receiver configured to receive digital interlaced video frames; and
a deinterlacer configured to convert the digital interlaced video frames to digital progressive video frames by deinterlacing the digital interlaced video frames, wherein the deinterlacing comprises generating spatial information for the digital interlaced video frames and motion information for at least one of the digital interlaced video frames, and generating the digital progressive video frames using the spatial information and the motion information, wherein pixel information corresponding to a first frame generated using both the spatial and motion information is weighted over pixel information corresponding to a second frame immediately succeeding the first frame and generated without the motion information.

8. The apparatus of claim 7, further comprising an encoder configured to receive the digital progressive video frames and encode the digital progressive video in accordance with compression information generated by a partitioner configured to generate metadata associated with the digital progressive video frames.

9. The apparatus of claim 7, further comprising a denoising filter for denoising the digital progressive video frames.

10. The apparatus of claim 7, wherein the deinterlacer comprises an inverse teleciner.

11. The apparatus of claim 7, further comprising a resampler configured to resize a progressive video frame of the digital progressive video frames.

12. The apparatus of claim 7, wherein the deinterlacer is further configured to:
generate bi-directional motion information for the digital interlaced video frames; and
generate the digital progressive video frames based on the digital interlaced video frames using the bi-directional motion information.

13. The apparatus of claim 7, further comprising a partitioner configured to generate metadata associated with the digital progressive video frames and provide the digital progressive video frames and the metadata to an encoder for use in encoding the digital progressive video frames, wherein the metadata comprises compression information.

14. An apparatus for processing multimedia data, comprising:
means for receiving digital interlaced video frames; and
means for converting the digital interlaced video to digital progressive video frames by deinterlacing the digital interlaced video frames, wherein the deinterlacing comprises generating spatial information for the digital interlaced video frames and motion information for at least one of the digital interlaced video frames, and generating the digital progressive video frames using the spatial information and the motion information,
wherein pixel information corresponding to a first frame generated using both the spatial and motion information is weighted over pixel information corresponding to a second frame immediately succeeding the first frame and generated without the motion information.

15. The apparatus of claim 14, wherein the means for converting comprises an inverse teleciner.

16. The apparatus of claim 14, further comprising means for resampling to resize a progressive frame.

17. The apparatus of claim 14, further comprising means for encoding the digital progressive video frames using provided metadata associated with the digital progressive video frames.

18. The apparatus of claim 14, further comprising means for denoising the digital progressive video frames.

19. The apparatus of claim 14, wherein the converting means is configured to:
generate bi-directional motion information for the digital interlaced video frames; and
generate the digital progressive video frames based on the interlaced video frames using the bi-directional motion information.

20. The apparatus of claim 14, further comprising:
means for generating metadata associated with the digital progressive video frames; and
means for providing the digital progressive video frames and at least a portion of the metadata to an encoder for use in encoding the digital progressive video frames, wherein an encoding parameter is determined based on the at least a portion of the metadata.

21. A non-transitory machine readable medium embodying instructions that, when executed by a processor, allow the processor to perform a method that processes multimedia data, the method comprising:
receiving digital interlaced video frames; and
converting the digital interlaced video frames to digital progressive video frames by deinterlacing the digital interlaced video frames, wherein the deinterlacing comprises generating spatial information for the digital interlaced video frames and motion information for at least one of the digital interlaced video frames, and generating the digital progressive video frames using the spatial information and the motion information,
wherein pixel information corresponding to a first frame generated using both the spatial and motion information is weighted over pixel information corresponding to a second frame immediately succeeding the first frame and generated without the motion information.

22. The computer readable medium of claim 21, wherein the method further comprises:
generating metadata associated with the digital progressive video frames;
providing the digital progressive video frames and at least a portion of the metadata to an encoder for use in encoding the digital progressive video frames;
determining an encoding parameter based on the metadata; and
encoding the digital progressive video frames in accordance with the encoding parameter.

23. An apparatus, comprising:
one or more processors; and
a memory storing instructions, which when executed by the one or more processors, is configured to cause the one or more processors to:
receive digital interlaced video frames; and
convert the digital interlaced video frames to digital progressive video frames by deinterlacing the digital interlaced video frames, wherein the deinterlacing comprises generating spatial information for the digital interlaced video frames and motion information for at least one of the digital interlaced video frames, and generating the digital progressive video frames using the spatial information and the motion information,
wherein pixel information corresponding to a first frame generated using both the spatial and motion information is weighted over pixel information corresponding to a second frame immediately succeeding the first frame and generated without the motion information.

24. The apparatus of claim 23, wherein the memory storing instructions when executed by the one or more processors, is further configured to cause the one or more processors to:
generate metadata associated with the digital progressive video frames; and
provide the digital progressive video frames and at least a portion of the metadata to an encoder for use in encoding the digital progressive video frames, wherein the digital progressive video is encoded based at least in part on the metadata.

* * * * *